(12) United States Patent
Moore et al.

(10) Patent No.: US 7,409,644 B2
(45) Date of Patent: *Aug. 5, 2008

(54) FILE SYSTEM SHELL

(75) Inventors: Jason F. Moore, Redmond, WA (US); Nathaniel H. Ballou, Kirkland, WA (US); Richard M. Banks, Egham (GB); Tyler K. Beam, Redmond, WA (US); Davd G. De Vorchik, Seattle, WA (US); Chris J. Guzak, Kirkland, WA (US); Judson Craig Hally, Sammamish, WA (US); James Brian Kurtz, Seattle, WA (US); Patrice L. Miner, Kirkland, WA (US); David J. Sheldon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 801 days.

This patent is subject to a terminal disclaimer.

(21) Appl. No.: 10/440,431

(22) Filed: May 16, 2003

(65) Prior Publication Data
US 2004/0230599 A1    Nov. 18, 2004

(51) Int. Cl.
G06F 3/048    (2006.01)
(52) U.S. Cl. ...................... 715/774; 715/853
(58) Field of Classification Search ............... 345/744; 715/744, 774, 853
See application file for complete search history.

(56) References Cited

U.S. PATENT DOCUMENTS 5,241,671 A    8/1993  Reed et al.
5,333,315 A    7/1994  Saether et al.

(Continued)

FOREIGN PATENT DOCUMENTS

CN    1421800    11/2001

(Continued)

OTHER PUBLICATIONS

Microsoft, "Microsoft Windows XP Professional Product Documentation" section: (1) To Change how you view items in a folder, (2) View files and folders overview, (3) To associate a file with a program, (4) To Change or remvoe a program.*

(Continued)

Primary Examiner—Weilun Lo
Assistant Examiner—David Phantana-angkool
(74) Attorney, Agent, or Firm—Banner & Witcoff, Ltd.

(57) ABSTRACT

A file system shell is provided. One aspect of the shell provides virtual folders which expose regular files and folders to users in different views based on their metadata instead of the actual physical underlying file system structure on the disk. Users are able to work with the virtual folders through direct manipulation (e.g., clicking and dragging, copying, pasting, etc.). Filters are provided for narrowing down sets of items. Quick links are provided which can be clicked on to generate useful views of the sets of items. Libraries are provided which consist of large groups of usable types of items that can be associated together, along with functions and tools related to the items. A virtual address bar is provided which comprises a plurality of segments, each segment corresponding to a filter for selecting content. A shell browser is provided with which users can readily identify an item based on the metadata associated with that item. An object previewer in a shell browser is provided which is configured to display a plurality of items representing multiple item types.

102 Claims, 68 Drawing Sheets

U.S. PATENT DOCUMENTS

| | | |
|---|---|---|
| 5,388,196 A | 2/1995 | Pajak et al. |
| 5,461,710 A | 10/1995 | Bloomfield et al. |
| 5,499,364 A | 3/1996 | Klein et al. |
| 5,504,852 A | 4/1996 | Thompson-Rohrlich |
| 5,513,306 A | 4/1996 | Mills et al. |
| 5,559,948 A | 9/1996 | Bloomfield et al. |
| 5,598,524 A | 1/1997 | Johnston, Jr. et al. |
| 5,630,042 A | 5/1997 | McIntosh et al. |
| 5,680,563 A | 10/1997 | Edelman |
| 5,696,486 A | 12/1997 | Poliquin et al. |
| 5,757,925 A | 5/1998 | Faybishenko |
| 5,790,121 A | 8/1998 | Sklar et al. |
| 5,802,516 A | 9/1998 | Shwarts et al. |
| 5,831,606 A | 11/1998 | Nakajima et al. |
| 5,835,094 A | 11/1998 | Ermel et al. |
| 5,838,317 A | 11/1998 | Bolnick et al. |
| 5,838,322 A | 11/1998 | Nakajima et al. |
| 5,867,163 A | 2/1999 | Kurtenbach |
| 5,875,446 A | 2/1999 | Brown et al. |
| 5,878,410 A | 3/1999 | Zbikowski et al. |
| 5,899,995 A | 5/1999 | Millier et al. |
| 5,923,328 A | 7/1999 | Griesmer |
| 5,929,854 A | 7/1999 | Ross |
| 5,933,139 A | 8/1999 | Feigner et al. |
| 5,935,210 A | 8/1999 | Stark |
| 5,987,454 A | 11/1999 | Hobbs |
| 5,987,506 A | 11/1999 | Carter et al. |
| 6,003,040 A | 12/1999 | Mital et al. |
| 6,008,806 A | 12/1999 | Nakajima et al. |
| 6,014,137 A | 1/2000 | Burns |
| 6,021,262 A | 2/2000 | Cote et al. |
| 6,023,708 A | 2/2000 | Mendez et al. |
| 6,025,843 A | 2/2000 | Sklar |
| 6,037,944 A | 3/2000 | Hugh |
| 6,061,692 A | 5/2000 | Thomas et al. |
| 6,061,695 A | 5/2000 | Slivka et al. |
| 6,078,924 A | 6/2000 | Ainsbury et al. |
| 6,097,389 A * | 8/2000 | Morris et al. ............... 715/804 |
| 6,144,968 A | 11/2000 | Zellweger |
| 6,147,601 A | 11/2000 | Sandelman et al. |
| 6,181,342 B1 | 1/2001 | Niblack |
| 6,202,061 B1 | 3/2001 | Khosla et al. |
| 6,237,011 B1 | 5/2001 | Ferguson et al. |
| 6,240,421 B1 | 5/2001 | Stolarz |
| 6,243,094 B1 | 6/2001 | Sklar |
| 6,243,724 B1 | 6/2001 | Mander et al. |
| 6,246,411 B1 | 6/2001 | Strauss |
| 6,256,031 B1 | 7/2001 | Meijer et al. |
| 6,275,829 B1 | 8/2001 | Angiulo et al. |
| 6,308,173 B1 | 10/2001 | Glasser et al. |
| 6,317,142 B1 | 11/2001 | Decoste et al. |
| 6,324,551 B1 | 11/2001 | Lamping et al. |
| 6,339,767 B1 | 1/2002 | Rivette et al. |
| 6,341,280 B1 | 1/2002 | Glass et al. |
| 6,363,377 B1 | 3/2002 | Kravets et al. |
| 6,363,400 B1 | 3/2002 | Chtchetkine et al. |
| 6,401,097 B1 | 6/2002 | McCotter et al. |
| 6,411,311 B1 | 6/2002 | Rich et al. |
| 6,430,575 B1 | 8/2002 | Dourish et al. |
| 6,437,807 B1 | 8/2002 | Berquist et al. |
| 6,448,985 B1 | 9/2002 | McNally |
| 6,453,311 B1 | 9/2002 | Powers, III |
| 6,453,319 B1 | 9/2002 | Mattis et al. |
| 6,466,238 B1 | 10/2002 | Berry et al. |
| 6,466,932 B1 | 10/2002 | Dennis et al. |
| 6,480,835 B1 | 11/2002 | Light |
| 6,505,233 B1 | 1/2003 | Hanson et al. |
| 6,513,038 B1 | 1/2003 | Hasegawa et al. |
| 6,526,399 B1 | 2/2003 | Coulson et al. |
| 6,535,229 B1 | 3/2003 | Kraft |
| 6,535,230 B1 | 3/2003 | Celik |
| 6,539,399 B1 | 3/2003 | Hazama et al. |
| 6,549,217 B1 | 4/2003 | De Greef et al. |
| 6,549,916 B1 | 4/2003 | Sedlar |
| 6,563,514 B1 | 5/2003 | Samar |
| 6,573,906 B1 | 6/2003 | Harding et al. |
| 6,573,907 B1 | 6/2003 | Madrane |
| 6,583,799 B1 | 6/2003 | Manolis et al. |
| 6,590,585 B1 | 7/2003 | Suzuki et al. |
| 6,606,105 B1 * | 8/2003 | Quartetti ..................... 715/853 |
| 6,613,101 B2 | 9/2003 | Salomon et al. |
| 6,628,309 B1 | 9/2003 | Dodson et al. |
| 6,636,238 B1 | 10/2003 | Amir et al. |
| 6,636,250 B1 | 10/2003 | Gasser |
| 6,662,198 B2 | 12/2003 | Satyanarayanan et al. |
| 6,684,222 B1 | 1/2004 | Cornelius et al. |
| 6,735,623 B1 | 5/2004 | Prust |
| 6,738,770 B2 | 5/2004 | Gorman |
| 6,745,206 B2 | 6/2004 | Mandler et al. |
| 6,754,829 B1 | 6/2004 | Butt et al. |
| 6,762,776 B2 | 7/2004 | Huapaya |
| 6,762,777 B2 | 7/2004 | Carroll |
| 6,763,458 B1 | 7/2004 | Watanabe et al. |
| 6,768,999 B2 | 7/2004 | Prager et al. |
| 6,784,900 B1 | 8/2004 | Dobronsky et al. |
| 6,795,094 B1 | 9/2004 | Watanabe et al. |
| 6,801,919 B2 | 10/2004 | Hunt et al. |
| 6,803,926 B1 | 10/2004 | Lamb et al. |
| 6,816,863 B2 | 11/2004 | Bates et al. |
| 6,823,344 B1 | 11/2004 | Isensee et al. |
| 6,847,959 B1 | 1/2005 | Arrouye et al. |
| 6,853,391 B2 | 2/2005 | Bates et al. |
| 6,865,568 B2 | 3/2005 | Chau |
| 6,871,348 B1 | 3/2005 | Cooper |
| 6,876,996 B2 | 4/2005 | Czajkowski et al. |
| 6,880,132 B2 | 4/2005 | Uemura |
| 6,883,009 B2 * | 4/2005 | Yoo ........................ 707/104.1 |
| 6,883,146 B2 * | 4/2005 | Prabhu et al. ................ 715/854 |
| 6,906,722 B2 | 6/2005 | Hrebejk et al. |
| 6,922,709 B2 | 7/2005 | Goodman |
| 6,938,207 B1 | 8/2005 | Haynes |
| 6,944,647 B2 | 9/2005 | Shah et al. |
| 6,947,959 B1 * | 9/2005 | Gill ........................ 715/501.1 |
| 6,950,818 B2 | 9/2005 | Dennis et al. |
| 6,952,724 B2 | 10/2005 | Prust |
| 6,980,993 B2 | 12/2005 | Horvitz et al. |
| 7,010,755 B2 | 3/2006 | Anderson et al. |
| 7,051,291 B2 | 5/2006 | Sciammarella et al. |
| 7,068,291 B1 | 6/2006 | Roberts et al. |
| 7,139,811 B2 | 11/2006 | Lev Ran et al. |
| 7,203,948 B2 | 4/2007 | Mukundan et al. |
| 7,240,292 B2 * | 7/2007 | Hally et al. .................. 715/778 |
| 2001/0034771 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 | 12/2001 | Kaplan et al. |
| 2001/0056508 A1 | 12/2001 | Arneson et al. |
| 2002/0019935 A1 | 2/2002 | Andrew et al. |
| 2002/0033844 A1 | 3/2002 | Levy et al. |
| 2002/0046232 A1 | 4/2002 | Adams et al. |
| 2002/0046299 A1 | 4/2002 | Lefeber et al. |
| 2002/0049717 A1 | 4/2002 | Routtenberg et al. |
| 2002/0052885 A1 | 5/2002 | Levy |
| 2002/0054167 A1 | 5/2002 | Hugh |
| 2002/0059199 A1 | 5/2002 | Harvey |
| 2002/0062310 A1 | 5/2002 | Marmor et al. |
| 2002/0075310 A1 | 6/2002 | Prabhu et al. |
| 2002/0075312 A1 | 6/2002 | Amadio et al. |
| 2002/0075330 A1 | 6/2002 | Rosenzweig et al. |
| 2002/0087740 A1 | 7/2002 | Castanho et al. |
| 2002/0087969 A1 | 7/2002 | Brunheroto et al. |
| 2002/0089540 A1 | 7/2002 | Geier et al. |
| 2002/0091679 A1 | 7/2002 | Wright |

| | | |
|---|---|---|
| 2002/0091697 A1 | 7/2002 | Huang et al. |
| 2002/0091739 A1 | 7/2002 | Ferlitsch et al. |
| 2002/0095416 A1 | 7/2002 | Schwols |
| 2002/0097278 A1 | 7/2002 | Mandler et al. |
| 2002/0103998 A1 | 8/2002 | DeBruine |
| 2002/0104069 A1 | 8/2002 | Gouge et al. |
| 2002/0107973 A1 | 8/2002 | Lennon et al. |
| 2002/0111942 A1 | 8/2002 | Campbell et al. |
| 2002/0113821 A1 | 8/2002 | Hrebejk et al. |
| 2002/0120505 A1 | 8/2002 | Henkin et al. |
| 2002/0120757 A1 | 8/2002 | Sutherland et al. |
| 2002/0129033 A1 | 9/2002 | Hoxie et al. |
| 2002/0138552 A1 | 9/2002 | DeBruine et al. |
| 2002/0138582 A1 | 9/2002 | Chandra et al. |
| 2002/0138744 A1 | 9/2002 | Schleicher et al. |
| 2002/0152262 A1 | 10/2002 | Arkin et al. |
| 2002/0152267 A1 | 10/2002 | Lennon |
| 2002/0156895 A1 | 10/2002 | Brown |
| 2002/0161800 A1 | 10/2002 | Eld et al. |
| 2002/0163572 A1 | 11/2002 | Center et al. |
| 2002/0169678 A1 | 11/2002 | Chao et al. |
| 2002/0184357 A1 | 12/2002 | Traversat et al. |
| 2002/0188605 A1 | 12/2002 | Adya et al. |
| 2002/0188735 A1 | 12/2002 | Needham et al. |
| 2002/0194252 A1 | 12/2002 | Powers, III |
| 2002/0196276 A1 | 12/2002 | Corl et al. |
| 2002/0199061 A1 | 12/2002 | Friedman et al. |
| 2003/0009484 A1 | 1/2003 | Hamanaka et al. |
| 2003/0014415 A1 * | 1/2003 | Weiss et al. ............... 707/10 |
| 2003/0018657 A1 | 1/2003 | Monday |
| 2003/0018712 A1 | 1/2003 | Harrow et al. |
| 2003/0028610 A1 | 2/2003 | Pearson |
| 2003/0041178 A1 | 2/2003 | Brouk et al. |
| 2003/0046260 A1 | 3/2003 | Satyanarayanan et al. |
| 2003/0069893 A1 | 4/2003 | Kanai et al. |
| 2003/0069908 A1 | 4/2003 | Anthony et al. |
| 2003/0074356 A1 | 4/2003 | Kaier et al. |
| 2003/0078918 A1 | 4/2003 | Souvignier et al. |
| 2003/0093321 A1 | 5/2003 | Bodmer et al. |
| 2003/0093531 A1 | 5/2003 | Yeung et al. |
| 2003/0093580 A1 | 5/2003 | Thomas et al. |
| 2003/0101200 A1 | 5/2003 | Koyama et al. |
| 2003/0105745 A1 | 6/2003 | Davidson et al. |
| 2003/0110188 A1 | 6/2003 | Howard et al. |
| 2003/0115218 A1 | 6/2003 | Bobbitt et al. |
| 2003/0117403 A1 | 6/2003 | Park et al. |
| 2003/0117422 A1 | 6/2003 | Hiyama et al. |
| 2003/0120928 A1 | 6/2003 | Cato et al. |
| 2003/0120952 A1 | 6/2003 | Tarbotton et al. |
| 2003/0122873 A1 | 7/2003 | Dieberger et al. |
| 2003/0126136 A1 | 7/2003 | Omoigui |
| 2003/0126212 A1 | 7/2003 | Morris et al. |
| 2003/0135495 A1 | 7/2003 | Vagnozzi |
| 2003/0135517 A1 | 7/2003 | Kauffman |
| 2003/0135659 A1 | 7/2003 | Bellotti et al. |
| 2003/0140115 A1 | 7/2003 | Mehra |
| 2003/0154185 A1 | 8/2003 | Suzuki et al. |
| 2003/0158855 A1 | 8/2003 | Farnham et al. |
| 2003/0177422 A1 | 9/2003 | Taraoukhine et al. |
| 2003/0184587 A1 | 10/2003 | Ording et al. |
| 2003/0210281 A1 | 11/2003 | Ellis et al. |
| 2003/0212680 A1 | 11/2003 | Bates et al. |
| 2003/0212710 A1 | 11/2003 | Guy |
| 2003/0222915 A1 | 12/2003 | Marion et al. |
| 2003/0225796 A1 | 12/2003 | Matsubara |
| 2003/0227487 A1 | 12/2003 | Hugh |
| 2003/0233419 A1 | 12/2003 | Beringer |
| 2004/0001106 A1 | 1/2004 | Deutscher et al. |
| 2004/0002993 A1 | 1/2004 | Toussaint et al. |
| 2004/0003247 A1 | 1/2004 | Fraser et al. |
| 2004/0008226 A1 | 1/2004 | Manolis et al. |
| 2004/0019584 A1 | 1/2004 | Greening et al. |
| 2004/0019655 A1 | 1/2004 | Uemura et al. |
| 2004/0030731 A1 | 2/2004 | Iftode et al. |
| 2004/0044696 A1 | 3/2004 | Frost |
| 2004/0044776 A1 | 3/2004 | Larkin |
| 2004/0054674 A1 | 3/2004 | Carpenter et al. |
| 2004/0056896 A1 | 3/2004 | Doblmayr et al. |
| 2004/0068525 A1 | 4/2004 | Aboulhosn et al. |
| 2004/0070612 A1 | 4/2004 | Sinclair et al. |
| 2004/0083433 A1 | 4/2004 | Takeya |
| 2004/0085581 A1 | 5/2004 | Tonkin |
| 2004/0088374 A1 | 5/2004 | Webb et al. |
| 2004/0091175 A1 | 5/2004 | Beyrouti |
| 2004/0098370 A1 | 5/2004 | Garland et al. |
| 2004/0098379 A1 | 5/2004 | Huang |
| 2004/0098742 A1 | 5/2004 | Hsieh et al. |
| 2004/0103280 A1 | 5/2004 | Balfanz et al. |
| 2004/0117358 A1 | 6/2004 | Von Kaenel et al. |
| 2004/0133572 A1 | 7/2004 | Bailey et al. |
| 2004/0133588 A1 | 7/2004 | Kiessig et al. |
| 2004/0148434 A1 | 7/2004 | Matsubara et al. |
| 2004/0153451 A1 | 8/2004 | Phillips et al. |
| 2004/0153968 A1 | 8/2004 | Ching et al. |
| 2004/0167942 A1 | 8/2004 | Oshinsky et al. |
| 2004/0177116 A1 | 9/2004 | McConn et al. |
| 2004/0177148 A1 | 9/2004 | Tsimelzon, Jr. |
| 2004/0177319 A1 | 9/2004 | Horn |
| 2004/0183824 A1 | 9/2004 | Benson et al. |
| 2004/0189704 A1 | 9/2004 | Walsh et al. |
| 2004/0189707 A1 | 9/2004 | Moore et al. |
| 2004/0193594 A1 | 9/2004 | Moore et al. |
| 2004/0193600 A1 | 9/2004 | Kaasten et al. |
| 2004/0193621 A1 | 9/2004 | Moore et al. |
| 2004/0193672 A1 | 9/2004 | Samji et al. |
| 2004/0193673 A1 | 9/2004 | Samji et al. |
| 2004/0199507 A1 | 10/2004 | Tawa |
| 2004/0205168 A1 | 10/2004 | Asher |
| 2004/0205625 A1 | 10/2004 | Banatwala et al. |
| 2004/0205633 A1 | 10/2004 | Martinez et al. |
| 2004/0205698 A1 | 10/2004 | Schliesmann et al. |
| 2004/0215600 A1 | 10/2004 | Aridor et al. |
| 2004/0220899 A1 | 11/2004 | Barney et al. |
| 2004/0223057 A1 | 11/2004 | Oura et al. |
| 2004/0225650 A1 | 11/2004 | Cooper et al. |
| 2004/0230572 A1 | 11/2004 | Omoigui |
| 2004/0230599 A1 | 11/2004 | Moore et al. |
| 2004/0230917 A1 | 11/2004 | Bales et al. |
| 2004/0249902 A1 | 12/2004 | Tadayon et al. |
| 2005/0004928 A1 | 1/2005 | Hamer et al. |
| 2005/0010860 A1 | 1/2005 | Weiss et al. |
| 2005/0015405 A1 | 1/2005 | Plastina et al. |
| 2005/0027757 A1 | 2/2005 | Kiessig et al. |
| 2005/0050470 A1 | 3/2005 | Hudson et al. |
| 2005/0055306 A1 | 3/2005 | Miller et al. |
| 2005/0080807 A1 | 4/2005 | Beilinson et al. |
| 2005/0097477 A1 | 5/2005 | Camara et al. |
| 2005/0114672 A1 | 5/2005 | Duncan et al. |
| 2005/0120242 A1 | 6/2005 | Mayer et al. |
| 2005/0131903 A1 | 6/2005 | Margolus et al. |
| 2005/0149481 A1 | 7/2005 | Hesselink et al. |
| 2005/0166159 A1 | 7/2005 | Mondry et al. |
| 2005/0171947 A1 | 8/2005 | Gautestad |
| 2005/0192953 A1 | 9/2005 | Neale et al. |
| 2005/0192966 A1 | 9/2005 | Hilbert et al. |
| 2005/0243993 A1 | 11/2005 | McKinzie et al. |
| 2005/0246331 A1 | 11/2005 | De Vorchik et al. |
| 2005/0246643 A1 | 11/2005 | Gusmorino et al. |
| 2005/0246664 A1 | 11/2005 | Michelman et al. |
| 2005/0256909 A1 | 11/2005 | Aboulhosn et al. |
| 2005/0257169 A1 | 11/2005 | Tu |
| 2005/0283476 A1 | 12/2005 | Kaasten et al. |
| 2006/0004692 A1 | 1/2006 | Kaasten et al. |
| 2006/0020586 A1 | 1/2006 | Prompt et al. |
| 2006/0036568 A1 | 2/2006 | Moore et al. |
| 2006/0080308 A1 | 4/2006 | Carpentier et al. |

| | | | |
|---|---|---|---|
| 2006/0129627 | A1 | 6/2006 | Phillips et al. |
| 2006/0173873 | A1 | 8/2006 | Prompt et al. |
| 2006/0200466 | A1 | 9/2006 | Kaasten et al. |
| 2006/0200832 | A1 | 9/2006 | Dutton |
| 2006/0218122 | A1 | 9/2006 | Poston et al. |
| 2007/0168885 | A1* | 7/2007 | Muller et al. ............... 715/853 |
| 2007/0186183 | A1* | 8/2007 | Hudson ...................... 715/810 |

FOREIGN PATENT DOCUMENTS

| | | |
|---|---|---|
| GB | 2329492 | 3/1999 |
| WO | 9938092 | 7/1999 |
| WO | 01/63919 A1 | 8/2001 |
| WO | WO 0225420 | 3/2002 |
| WO | WO 2004107151 | 9/2004 |

OTHER PUBLICATIONS

McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 1-3; Ch. 8: A Tour of the My Pictures Folder-printed p. 1-8, Ch. 11: Sights and Sounds: Music and Other Multimedia-printed p. 1-3.*
Stanek R., William; "Microsoft Windows XP Professional Administrator's Pocket Consultant", Sep. 25, 2001; Microsoft Press, Chapter 9, printed p. 1-8.*
Microsoft Press Pass, "Windows XP is Here!", New York, Oct. 25, 2001.
Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unknown.
McFedries, Paul, "The Complete Idot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia-printed pp. 1-3.
Stanek R. William, "Microsoft Windows XP Professional Administrator's Pocket Consultant", Sep. 25, 2001; Microsoft Press, Chapter 9, printed pp. 1-8.
Shah, Sarju, "Windows XP Preview", FiringSquad, May 4, 2001, online, printed pp. 1-5; Figure: Hi-Res Image Viewer.
European Search Report for 03007909.9-2211 dated Jun. 30, 2006.
D. Esposito, "More Windows 2000 UI Goodies: Extending Explorer Views by Customizing Hypertext Templet Files", MSDN Magazine, <http://msdn.microsoft.com/msdnmag/issues/0600/w2kui2/default.aspx?print=true?, first date of publication unknown but no later than Jun. 2000, 15 pages.
Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.
Australian Search Report for SG 200301764-7 dated Mar. 30, 2006.
D. Esposito, Visual C++ Windows Shell Programming, Dec. 1, 1998, Apress, ISBN 1861001843, pp. 463-469.
P. DiLascia, "More Fun with MFC:DIBs, Palettes, Subclassing, and a Gamut of Goodies, Part III", Microsoft Systems Journal, Jun. 1997, 20 pages.
Australian Written Opinion for SG 200301764-7 dated Mar. 30, 2006.
Windows Commander, <http://web.archive.org/web/20030207145141/www.ghisler.com/featurel.htm> (Feb. 7, 2003) and <http://web.archive.org/web/20021017022627/www.ghisler.com/addons.htm> (Oct. 17, 2002), 7 pages.
Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.
Wikipedia, File Allocation Table, 2006, <http://en.wikipedia.org/wiki/File_Allocation_Table>.
Cohen, et al., "A Case for Associative Peer to Peer Overlays"—ACM SIGCOMM Computer Communications Review, vol. 33, No. 1, Jan. 2003, pp. 95-100.
Lui, et al., "Interoperability of Peer-to-Peer File Sharing Protocols"—ACM SIGecom Exchanges, vol. 3, No. 3, Aug. 2002, pp. 25-33.
Adobe, Inc., et al., "Adobe Photoshop CS Classroom in a Book," Dec. 1, 2003, pp. 1-29.
Adobe Inc., et al., "Adobe Photoshop 7.0", 2001; pp. 1-9.
Heinlein, et al., "Integration of Message Passing and Shared Memory in the Standford Flash Multiprocessor, Architectural Support for Programming Languages and Operating Systems," pp. 38-50, published 1994.
Louis, et al., "Context Learning Can Improve User Interaction Information Reuse and Integration," Proceedings of the 2004 IEEE International Conference on, pp. 115-120, Nov. 8-10, 2004.
Microsoft Windows XP Version 2002 (Screen Dumps, Figs. 1-16).
Simpson, Alan, Windows 95 Uncut, 1995, IDG Books Worldwide, Inc., pp. 104-107.
Feng, et al., "Schemata Transformation of Object-Oriented Conseptual Models to XML", Computer systems Science & Engineering, vol. 18, No. 1, Jan. 2003.
Joseph, M., "The UML for Data Modellers," Elektron, Apr. 2004, pp. 72-73.
Wang, G., et al., "Extending XML Schema with Nonmonotonic Inheritance," in M.A. Jesufeld and O. Paster (eds.), ER 2003 Workshops, Lecture Notes in Computer Science 2814:402-407, 2003.
A.T. McCray, et al., Extending the Role of Metadata in a Digital Library System, May 19, 1999, IEEE, pp. 190-199.
Alexa T. McCray, et al., Principles for Digital Library Development, May 2001, ACM, pp. 49-53.
Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.
"About Managing Messages With Rules", Microsoft® Outlook® 2003 Help file, 3 pp.
"Trillian/Trillian Pro IM Clients" Products Description, ©1999-2004 Cerulean Studios, <http://www.ceruleanstudios.com> [retrieved Apr. 30, 2004].
International Search Report of WO2004/097638 A1 (McKee, et al.) dated Nov. 11, 2004.
Examples of dialogs user interfaces; date of first publication prior to Mar. 31, 2005; 8 pages.
"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.
New User Interface Possiblities in Longhorn (CLI 304); downloaded from <http://msdn.microsoft.com/longhorn/pdcmaterials/pdctalksavalon/>; date of first publication prior to Mar. 31, 2005; 45 pages.
Windows Forms: Exploiting Windows Longhorn Features from Within Your Application (CLI 391); downloaded from http://msdn.microsoft.cam/longhorn/pcdcmaterials/pdctalksavalon/>; date of first publication prior to Mar. 31, 2005; 27 pages.
MessageBox function; downloaded from <http://msdn.microsoft.com>; date of first publication prior to Mar. 31, 2005; 4 pages.
Creating and Installing Theme Files; downloaded from <http://msdn.microsoft.com>; date of first publication prior to Feb. 21, 2005; 4 pages.
"MessageBox Function"; downloaded from <http://msdn.microsoft.com>; date of first publication prior to Mar. 31, 2005; 4 pages.
"Creating and Installing Theme Files", downloaded from <http://msdn.microsoft.com>; date of first publication prior to Feb. 21, 2005; 4 pages.
"About Dialog Boxes", downloaded from <http://msdn.microsoft.com>; date of first publication prior to Feb. 21, 2005; 10 pages.
"Property Sheets and Inspectors"; downloaded from <http://msdn.microsoft.com>; date of first publication prior to Feb. 21, 2005; 6 pages.
"Propsheetpage"; downloaded from <http://msdn.microsoft.com>; date of first publication prior to Feb. 21, 2005; 3 pages.

"DialogProc Function"; downloaded from <http://msdn.microsoft.com>; date of first publication pior to Feb. 21, 2005; 2 pages.
"Creating Wizards"; downloaded from <http://msdn.microsoft.com>; date of first publication prior to Mar. 31, 2005; 17 pages.
"Property Sheets"; downloaded from <http://msdn.microsoft.com>; date of first publication prior to Mar. 31, 2005; 7 pages.
"Property Sheet Reference"; downloaded from <http://msdn.microsoft.com>; date of first publication prior to Mar. 31, 2005; 5 pages.
"Drawitemstruct Structure"; downloaded from <http://msdn.microsoft.com>; date of first publication prior to Feb. 25, 2005; 3 pages.
"Using Buttons"; downloaded from <http://msdn.microsoft.com>; date of first publication prior to Feb. 25, 2005; 5 pages.
Button Messages; downloaded from <http://msdn.microsoft.com>; date of first publication prior to Feb. 25, 2005; 4 pages.
"Button Styles"; downloaded from <http://msdn.microsoft.com>; date of first publication prior to Feb. 25, 2005; 2 pages.
"CreateWindow Function"; downloaded from <http://msdn.microsoft.com>; date of first publication prior to Feb. 25, 2005; 5 pages.
"Using Dialog Boxes"; downloaded from <http://msdn.microsoft.com>; date of first publication prior to Mar. 31, 2005; 8 pages.
"CreatePropertySheetPage Function"; downloaded from <http://msdn.microsoft.com>; date of first publication prior to Mar. 31, 2005; 1 page.
"DestroyPropertysheetPage Function"; downloaded from <http://msdn.microsoft.com>; date of first publication prior to Mar. 31, 2005; 1 page.
"PropertySheet Function"; downloaded from <http://msdn.microsoft.com>; date of first publication prior to Mar. 31, 2005; 2 pages.
"PropSheetPageProc Function"; downloaded from <http://msdn.microsoft.com>; date of first publication prior to Mar. 31, 2005; 2 pages.
"PropSheetProc Function"; downloaded from <http://msdn.microsoft.com>; date of first publication prior to Mar. 31, 2005; 2 pages.
"PSN_Killactive Notification"; downloaded from <http://msdn.microsoft.com>; date of first publication prior to Mar. 31, 2005; 1 page.
"PSN_Querycancel Notification"; downloaded from <http://msdn.microsoft.com>; date of first publication prior to Mar. 31, 2005; 1 page.
"PSN_Reset Notification"; downloaded from <http://msdn.microsoft.com>; date of first publication prior to Mar. 31, 2005; 1 page.
"PSN_Setactive Notification"; downloaded from <http://msdn.microsoft.com>; date of first publication prior to Mar. 31, 2005; 1 page.
"PSN_Translateaccelerator Notification"; downloaded from <http://msdn.microsoft.com>; date of first publication prior to Mar. 31, 2005; 1 page.
"PSN_Wizback Notification"; downloaded from <http://msdn.microsoft.com>; date of first publication prior to Mar. 31, 2005; 3 pages.
"PSN_Wizfinish Notification"; downloaded from <http://msdn.microsoft.com>; date of first publication prior to Mar. 31, 2005; 1 page.
"PSN_Wiznext Notification"; downloaded from <http://msdn.microsoft.com>; date of first publication prior to Mar. 31, 2005; 3 pages.
"PSM_Addpage Message"; downloaded from <http://msdn.microsoft.com>; date of first publication prior to Mar. 31, 2005; 2 pages.
"PSM_Idtoindex Message"; downloaded from <http://msdn.microsoft.com>; date of first publication prior to Mar. 31, 2005; 1 page.
"PSM_Indextohwnd Message"; downloaded from <http://msdn.microsoft.com>; date of first publication prior to Mar. 31, 2005; 1 page.
"PSM_Indextoid Message"; downloaded from <http://msdn.microsoft.com>; date of first publication prior to Mar. 31, 2005; 1 page.
"PSM_Indextopage Message"; downloaded from <http://msdn.microsoft.com>; date of first publication prior to Mar. 31, 2005; 1 page.
"PSM_Pagetoindex Message"; downloaded from <http://msdn.microsoft.com>; date of first publication prior to Mar. 31, 2005; 1 page.
"PSM_Pressbutton Message"; downloaded from <http://msdn.microsoft.com>; date of first publication prior to Mar. 31, 2005; 1 page.
"PSM_Querysiblings Message"; downloaded from <http://msdn.microsoft.com>; date of first publication prior to Mar. 31, 2005; 1 page.
"PSM_Setcursel Message"; downloaded from <http://msdn.microsoft.com>; date of first publication prior to Mar. 31, 2005; 1 page.
"PSM_Setcurselid Message"; downloaded from <http://msdn.microsoft.com>; date of first publication prior to Mar. 31, 2005; 1 page.
"PSM_Setfinishtext Message"; downloaded from <http://msdn.microsoft.com>; date of first publication prior to Mar. 31, 2005; 1 page.
"PSM_Setheadertitle Message"; downloaded from <http://msdn.microsoft.com>; date of first publication prior to Mar. 31, 2005; 1 page.
"PSM_SetWizbuttons Message"; downloaded from <http://msdn.microsoft.com>; date of first publication prior to Mar. 31, 2005; 2 pages.
"Propsheetheader Structure"; downloaded from <http://msdn.microsoft.com>; date of first publication prior to Mar. 31, 2005; 5 pages.
"Propsheetpage Structure"; downloaded from <http://msdn.microsoft.com>; date of first publication prior to Mar. 31, 2005; 4 pages.
"Pshnotify Structure"; downloaded from <http://msdn.microsoft.com>; date of first publication prior to Mar. 31, 2005; 1 page.
"BCM_Getidealsize Message"; downloaded from <http://msdn.microsoft.com>; date of first publication prior to Mar. 31, 2005; 1 page.
"PSM_Settitle Message"; downloaded from <http://msdn.microsoft.com>; date of first publication prior to Mar. 31, 2005; 1 page.
Blair. C., and G.E. Monahan, "Optimal Sequential File Search: A Reduced-State Dynamic Programming Approach," *European Journal of Operational Research 86*(2):358-365, 1995.
Cöster, R., and M. Svensson, "Inverted File Search Algorithms for Collaborative Filtering," *Proceedings of the 25th Annual International Retrieval*, Tampere, Finland, Aug. 11-15, 2002.
Gifford, D.K., et al., "Semantic File Systems," *Proceedings of the 13th ACM Symposium on Operating Systems Principles*, Pacific Grove, Calif., Sep. 1991, pp. 16-25.
Manber, U., and S. Wu, "Glimpse: A Tool to Search Through Entire File Systems," *Proceedings of USENIX Winter 1994 Conference*, San Francisco, Calif., Jan. 17-21, 1994.
Piernas, J., et al., "DualFS: A New Journaling File System Without Meta-Data Duplication," *Conference Proceedings of the 2002 International Conference on Supercomputing*, New York, Jun. 22-26, 2002, pp. 137-146.
R. Rao, et al., "Rich Interaction in the Digital Library," *Communications of the ACM 38*(4):29-39, 1995.
Seltzer, M., et al., "Journaling Versus Soft Updates: Asynchronous Meta-data Protection in File Systems," *Proceedings of the 2000 USENIX Technical Conference*, San Diego, Calif., Jun. 18-23, 200, pp. 71-84.
H. Weinreich, et al., "The Look of the Link—Concepts for the User Interface of Extended Hyperlinks," *Proceedings of the Twelfth ACM Conference on Hypertext and Hypermedia*, Hypertext '01, Aarhus, Denmark, Aug. 2001, pp. 19-28.
Written Opinion of Singapore Application No. 200403220-7 dated May 18, 2006.

Kuchinsky, et al., "FotoFile: A Consumer Multimedia Organization and Retrieval System", May 1999, ACM, pp. 496-503.

Written Opinion of SG 200301764-7 dated Jan. 11, 2007.

Windows Commander (website), <URL:http://www.ghisler.com>, accessed using http://www.archive.org/web/web.php, in particular, http://web.archive.org/web/20030207145141/www.ghisler.com/featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.

Bott, et al., "Microsoft Windows XP Inside Out", Microsoft Press, 2001, Chapter 11, 39 pages.

International Search Report and Written Opinion of PCT/US04/25931 dated Apr. 3, 2007.

Langer, Maria, Mac OS X: Visual QuickStart Guide; Apr. 2001, Peachpit Press, Mac OS X Disk Organization (pp. 1-3), Views (pp. 1-11), Outlines (1-3).

Ray, Jay, Mac OS X Unleashed, Nov. 2001, Sams, Chapter 4. The Finder: Working with Files and Applications (pp. 1-15), Getting File Information (pp. 1-7).

Bott, et al., Book titled "Special Edition Using Windows 98, Second Edition", Dec. 21, 1999, second edition, pp. 1-7.

Supplementary European Search Report for EP 04780390 dated Jun. 18, 2007.

Lee, J., "An End-User Perspective on File-Sharing Systems," Communications of the ACM 46(2):49-53, Feb. 2003.

Ohtani, A., et al., "A File Sharing Method For Storing Area Network and Its Performance Verification," NEC Res. & Development. 44(1):85-90, Jan. 2003.

Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241

Kwon G., and K.D. Ryu, "An Efficieant Peer-to-Peer File Sharing Exploiting Hierarchy and Asymmetry," Proceedings of the 2003 Symposium on Applications and the Internet, Orlando, Fla., Jan. 27-31, 2003, pp. 226-233.

Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.

Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.

Reinauer, R., "UNIX System V.# Remote File Sharing Capabilities and Administration," Unisphere 8(6):64-68, Sep. 1988.

Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal Framework for Managing Metadata in the Distributed Dragon Slayer System, Proceedings of the 26th Euromicro Conference (Euromicro'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.

Bipin C. Desal, et al., Resource Discovery: Modeling, Cataloguing and Searching, Seventh International Workshop on Database and Expert Systems Applications (DEXA'96), Surich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, Et al., Color and Texture Descriptiors, IEEE Transactions on Circuits and Systems for Video Technology, Jun. 2001, pp. 703-715, vol. 11, No. 6, IEEE Computer Society, 2001, ISBN 1051-8215..

"Predefined Properties" http://help.sap.comlsaphelp—ep50sp5/helpdata/en/la/9a4a3b80l2ec40aa7456bc87a94259/comtent.htm, unknown date.

"Info Vision Infonnation Management System" http://66.1 02. 7.1 04/search?q=cache:m IXV6K6sQOQJ :www.amlib.netlproducts/infovision.htm+customised+multi+property+file+navigation &hl=en, unknown date.

"Previewwing Files in the Common Dialog" http://www .elitevb.comlcontentiO 1,0084,0 II, unknown date.

"TdcFolderListView component" http://www.appcontrols.comlmanualsldiskcontrols/index.htm1?tdcfolderlistview.htm, unknown date.

"Previewing Files" http://developer.apple.apple.comldocumentation/QuickTimeIINMAC/QT/iqMovieToolbox.1a.htm, unknown date.

"Text File Previewer 2.0 Beta" http://www .freedownloadscenter.comlUtilitiesIText- ViewersIText- File ]reviewer.html, unknown date.

"Your Next OS: Windows 2006?" http://www.pcworld.comlnewsiarticle/O,aid,II3'631,OO.asp, unknown date.

"GetOpenFileName Function," downloaded from <http://msdn.microsoft.com>; date of first publication prior to Mar. 28, 2005; 2 pages.

"GetSaveFileName Function," downloaded from <http://msdn.microsoft.com>; date of first publication prior to Mar. 28, 2005; 2 pages.

"Using Common Dialog Boxes," downloaded from <http://msdn.microsoft.com>; date of first publication prior to Mar. 28, 2005; 8 pages.

"How to Use a common Dialog File Open Dialog with Win32 API," downloaded from <http://support.microsoft.com>; date of first publication prior to Mar. 28, 2005; 3 pp.

"Creating an Enhanced Metafile," downloaded from <http://msdn.microsoft.com>; date of first publication prior to Mar. 28, 2005; 2 pages.

"Common Dialog Box Library," downloaded from <http://msdn.microsoft.com>; date of first publication prior to Mar. 28, 2005; 8 pages.

"Openfilename Structure," downloaded from <http://msdn.microsoft.com>; date of first publication prior to Mar. 28, 2005; 7 pages.

"Open and Save as Dialog Boxes," downloaded from <http://msdn.microsoft.com>; date of first publication prior to Mar. 28, 2005; 9 pages.

"Customizing common dialog boxes," downloaded from <http://msdn.microsoft.com>; date of first publication prior to Apr. 20, 2005; 4 pages.

G.D. Venolia, et al., Supporting Email Workflow, Microsoft Research Technical Report MSR-TR-2001-88. Revised Dec. 2001 (Origional Sep. 2001). Microsoft Corporation, Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image User's Manual, Version 9.0. pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

* cited by examiner

*Fig. 34.*

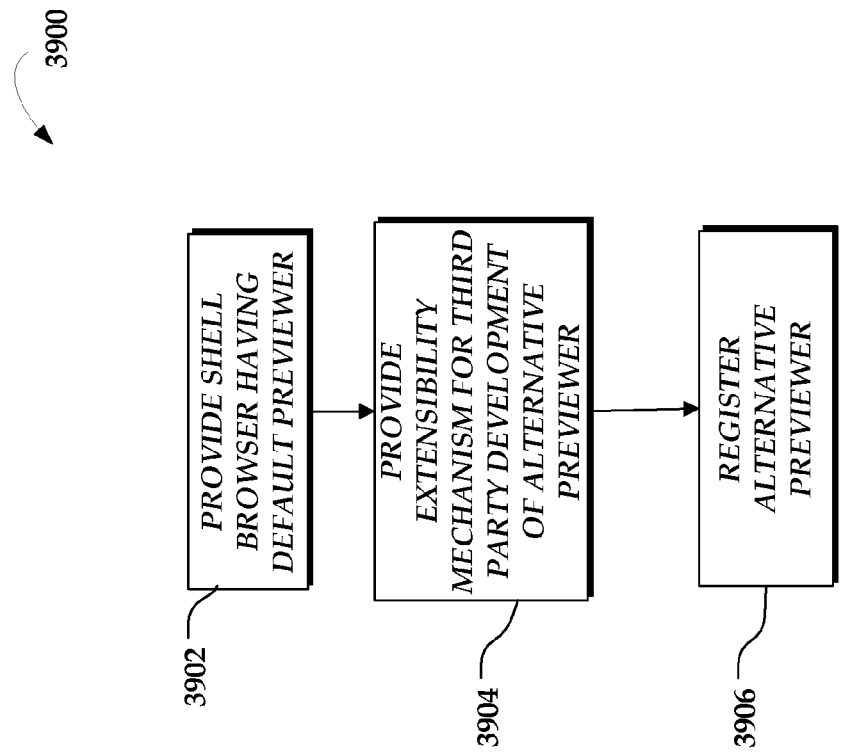

FILE SYSTEM SHELL

CROSS-REFERENCE(S) TO RELATED APPLICATION(S)

This application is related to U.S. applications attorney docket Nos. MSFT-1-20362, MSFT-1-20460, MSFT-1-20699, MSFT-1-20700, and MSFT-1-20790, and U.S. application Ser. Nos. 10/395,533 and 10/395,560, each of which is hereby incorporated by reference in its entirety.

FIELD OF THE INVENTION

The present invention relates to file systems, and more particularly, to a file system shell.

BACKGROUND OF THE INVENTION

Present computer file systems have a number of undesirable limitations. One limitation is that users are generally unable to control the structure that they are shown. In other words, when folders are organized, a user must choose a structure, and that structure is then difficult to change. As a specific example, for a "music" folder, a user may choose to organize the music files in an artist/album format, wherein all of the album folders for each artist are grouped into that particular artist's folder, and all of the songs on a particular album are grouped into that album's folder. The artist/album format is not conducive to playing a type of music (e.g., playing two jazz songs from two different artists), or for playing a selection of albums from different artists.

As another issue, a user may have a large number of files which are difficult to organize. Some users implement a rigid sense of placement for the files, and thus create strict hierarchies for them. The management of such files become increasingly complex and difficult as the number of available documents grows, making search and retrieval also difficult. This problem is further exacerbated when additional files are utilized from other locations, such as shared files, etc.

Users also have to deal with files being in different locations, such as on different devices, on other PCs, or online. For example, users can select to listen to their music on the computer (as may be accessible to a music program) or can go online and listen to music from Web sites, however there is a strict division between these two sources. Music coming from different locations is organized differently, and not kept in the same fashion or place. As another example, files stored on a corporate network may inherently be separated from files a user has on a current machine.

Users also have to keep track not only of what file data is stored, but where it is stored. For example, for music files, users are forced to keep copies on various systems and to try to track which music files are located where. This can make files difficult to locate, even when they are locally stored.

It is also sometimes difficult to find and return to files that a user has. A user may find it difficult to recall where and how they stored certain files. Given a set of folders and even a group of similar files, users often find it difficult to quickly find the one that they are looking for. For files stored in a difficult place to find, it is that much more complex to locate. In addition, once users have enough files in a folder, it becomes more difficult to parse the folder quickly, especially if the contents are similar.

It is also sometimes difficult for users to find or return to files on a network. Sharing and publishing files is often hard to do, and it may often be even more difficult to retrieve such a file from someone who makes it available. Users typically have to memorize or map the various sites and names that they need for finding files on a network.

Name spaces may vary, which can cause confusion to the user as to what is "correct." This is particularly true on a network where there are different naming conventions, limitations, and so on. For example, certain operating systems may require short names with no spaces in order for them to be visible.

Programs also often save files to their own directory or other name spaces, which can make it difficult for users to find their way back to the files. Programs often have default directories and places they save documents. A user often has to search through their hard disk and make guesses about where a file is stored.

Related items are also often stored in separate places. Related files that a user has may be stored on different parts of the hard disk, etc. This problem becomes more common with the developments of digital media services that have multiple content types (e.g., pictures, music, video).

Another issue with file systems is related to the address bar. As users navigate within a file system on a computer, a conventional graphical interface control, referred to as an address bar, shows the users where they are in the file system hierarchy. The conventional address bar shows the current location in terms of the file system's hierarchical structure of folders, subfolders, and files. Altering the user's location displayed in the conventional address bar is typically performed in one of two manners. The first is to manually edit the address in the address bar. Manually editing the address in the address bar permits a user to relocate to any number of locations in the file system hierarchy, but requires the user to have specific information regarding the organization of the file system on the computer, i.e., a specific file system location. The second method involves using external navigation tools which, when manipulated, update the address bar to reflect the new address or location. While bypassing the manual edit of the address in the address bar, manipulating external navigation tools still requires the user to have specific information concerning the organization of the file system and traverse the hierarchical structure. However, conventional address bars cannot reference files or data stored among multiple file system locations, such as folders or drives, due to a one-to-one relationship between the address in the address bar and a specific location in the file system hierarchy.

The prior art lacks an address bar that allows users to specify addresses that display files stored among multiple file system locations. The prior art further lacks an address bar that also permits users to easily modify the address of the address bar without manually editing the address, or requiring specific knowledge concerning the organization of the underlying file system. Also lacking in the prior art is an address bar that presents alternative selections of files to the user from which the user may select to navigate to those selections of files. Such an address bar could also selectively present a conventional address bar interface to the user enabling the user to interact with the address bar according to previous experience according to user preferences.

Another issue with file systems is related to the identification of items stored on a computer. The need to readily identify items stored in a computing environment such as a personal computer (PC) is dramatically increasing as more individuals utilize computers in their daily routines and as the type of stored information varies between pictures, music, documents, etc. Documents and media are typically stored on computers in a hierarchical fashion and are organized with files of information or media stored within folders. File system browsers enable users to navigate through the file system and locate and open files and folders. For example, Microsoft Corporation's WINDOWS® EXPLORER™ is an operating system utility which enables users to browse the file system.

Many users find it difficult to correctly identify a file based on the information currently available in conventional file system browsers. Of course the contents of a file can be verified by opening it with an application program, but this method of browsing files is extremely inefficient. The ability to view metadata about a file within a file system browser can greatly assist a user in identifying a particular file without having to open it. In Microsoft Corporation's WINDOWS® 9X operating systems, for example, a user can view object metadata by accessing the property sheet for a particular object. A property sheet presents the user with a list of the attributes or settings of an object in the form of a tabbed, index-card-like selection of property pages, each of which features standard dialog-style controls for customizing parameters. However, using the property sheet to locate an item can be slow and cumbersome, and some users find it difficult to locate the relevant metadata in a property sheet. Similarly, the use of infotips to locate an item can be slow and cumbersome because a user must hover the mouse over each file in order to view the limited metadata displayed in an infotip.

Conventional file system browsers do not allow users to enter and edit metadata relating to files and folders, which would significantly enhance a user's ability to later locate a file. To date, the ability of users to enter and edit metadata has been limited to special purpose software programs. For example, media players for electronic music files present users with the ability to edit metadata associated with music albums and artists. Another example of such programs includes application programs for electronic picture files. However, the utility of media players and other such programs is limited to the particular type of file supported by the program, as opposed to a general purpose file system browser which supports multiple file types.

Microsoft Corporation's WINDOWS® XP operating system includes an image browser for use in the My Pictures folder. The My Pictures folder is endowed with special features which enable users to view pictures as photos, not just as document icons. My Picture's image browsing features include the ability to view thumbnail-size and large versions of photos, rotate photos that are sideways, and create a slide show. A user can also view a photo's details, such as its dimensions, the date and time it was taken, and the name of the camera that took it. The preview control area in the My Picture's folder contains an enlarged preview image of a user-selected image, iterator buttons to assist a user in iterating through a series of pictures and controls for rotating pictures in a clockwise or counterclockwise direction. While the image browsing features in WINDOWS® XP have advanced the state of the art by alleviating the need to invoke an application program to view and manipulate pictures, users still cannot enter and edit metadata associated with the pictures.

Accordingly, there is a need for an improved user experience within a shell or file system browser which enables users to readily locate an item based on the metadata associated with that item. There is also a need for a system and method which allow users to enter and edit metadata associated with items of various types within a shell browser without the need to invoke an application program. There is also a need for a file system or shell browser which offers users improved file content recognition features so that users can readily locate their files. A need also exists for an improved graphical user interface for a shell browser which allows for the selection of a previewer for a particular file type from a plurality of available previewers. There is also a need for an extensible shell browser which would allow software developers to provide additional information and functionality to users on a file type basis. There is also a need to provide a similar UI experience across different collections of items.

SUMMARY OF THE INVENTION

In accordance with one aspect of the invention, a system and method utilizing virtual folders is provided. The virtual folders expose regular files and folders (also known as directories) to users in different views based on their metadata instead of the actual physical underlying file system structure on the disk. Thus, the system is able to take a property that is stored in the database and represent it as a container that is like a folder. Since users are already familiar with working with folders, by presenting the virtual folders in a similar manner, users can adapt to the new system more quickly.

In accordance with another aspect of the invention, the virtual folders are provided according to a method that is utilized in a computer system having a display and a memory for storing the items. In accordance with the method, a metadata property is selected. The system then searches for items that have the selected metadata property, and a virtual folder display object is provided that represents the collection of items that have the metadata property.

In accordance with another aspect of the invention, the system includes a folder processor that obtains queries from a user and a relational database for storing information about the items. The folder processor first obtains a query from a user and passes the query to the relational database. The relational database provides results back to the folder processor, and based on the results from the relational database, the folder processor provides the results to the user as virtual folders. In one embodiment, the results that are provided back to the folder processor include database rows and columns. The database rows and columns are converted by the folder processor into an enumerator structure, which is then used to populate the display with the resulting virtual folders.

In accordance with another aspect of the invention, users are able to work with the virtual folders through direct manipulation. In other words, the mechanisms that are provided for manipulating the virtual folders are similar to those that are currently used for manipulating conventional physical folders (e.g., clicking and dragging, copying, pasting, etc.).

In accordance with another aspect of the invention, the method for performing the direct manipulation of the virtual folders is provided in a computer system having a display and a memory for storing the items. In accordance with the method, groups of items are represented as virtual folders. Defined actions are provided that can be performed for direct manipulation of the virtual folders, wherein when a defined action is performed, the virtual folder is manipulated as directed by the defined action. An example of a defined action would be clicking and dragging a virtual folder. In one embodiment, the action of clicking and dragging a first virtual folder to a second virtual folder performs the function of copying the items from the first virtual folder to the second virtual folder. The copying of items to a virtual folder may involve adding or otherwise altering selected metadata properties that are associated with the items.

In accordance with another aspect of the invention, filters are provided for manipulating the virtual folders. The filters are essentially tools for narrowing down a set of items. In one embodiment, the filters are dynamically generated based on the properties of the separate items. For example, for a set of items, the filter mechanism may review the properties, and if the items generally have "authors" as a property, the filter can provide a list of the authors. Then by clicking on a particular author, the items that don't have the author disappear. This allows the user to narrow the contents.

In accordance with another aspect of the invention, a method for filtering items is provided in a computer system having a display and a memory for storing items with metadata properties. Display objects are provided on the display that each represent one or more items. The metadata properties of the items that are represented by the display objects are evaluated. A filter term is provided on the display that corresponds to a metadata property that is shared by a plurality of the items, wherein the selection of the filter term causes the items that are represented on the display to be reduced to those items that share the specified metadata property.

In accordance with another aspect of the invention, a plurality of items are represented on the display, and a filter term is dynamically generated based on the metadata properties of the items. When the filter term is selected, it reduces the items that are represented on the display to those that have the metadata property that corresponds to the filter term.

In accordance with another aspect of the invention, a plurality of items are represented on the display, and a filter area is provided in which a user can enter a filter term. When a filter term is entered by the user, the items that are represented on the display are reduced to those that contain the filter term. As the user types the filter term, additional items may be filtered as each new character is added to the filter term.

In accordance with another aspect of the invention, a back button is provided which may be used to back through a filtering process. For example, after a user has entered a filter term, the user may wish to return to the set of items that were represented on the display before the filter term was applied. The back button allows the user to back up to the desired point in the filter navigation.

In accordance with another aspect of the invention, quick links are provided. In one embodiment, quick links are a set of predefined links (e.g., located on the left side of the display) that can be clicked on to generate useful views of the sets of items. These can be predefined by the program, or set by a user. For example, clicking on "all authors" could return a view stacked by authors. "All documents" may return a flat view of all the documents across all of the storage areas. Users can also create their own quick links. For example, a user might filter down to all of the documents that they modified in January 2003, and then could save that as a quick link.

In accordance with another aspect of the invention, a method for providing quick links is implemented in a computer system having a display and a memory for storing items. In accordance with the method, a user first navigates to a view of a desired collection of items. A quick link that corresponds to the desired collection of items is saved and is provided with a name. The name of the quick link is presented on the display such that by clicking on the quick link a user can return to the view of the desired collection of items.

In accordance with another aspect of the invention, libraries are provided. Libraries consist of large groups of usable types of files that can be associated together. For example, photos may be one library, music may be another, and documents may be another. The libraries provide tools and activities that are related to the particular types of items. For example, in the photo library, there are tools and filters that relate to manipulating photos, such as for creating slide shows or sharing pictures.

In accordance with another aspect of the invention, a method for creating libraries is provided in a computer system with a display and a memory for storing items. The method begins by creating a library to contain items with one or more specified metadata properties. Then, items with the one or more specified metadata properties are automatically grouped into the library. Tools are also provided for manipulating the items of the library.

In accordance with another aspect of the invention, a wide scope of files or items may be available. In other words, the system is able to represent files/items from multiple physical locations (e.g., different hard drives, different computers, different network locations, etc.) so that to a user all the items appear to be from one location. For example, a user can be presented with all of their music files on a single screen, and manipulate the files all from one view, even though the files may be physically stored on different hard drives, different computers, or different network locations.

In accordance with another aspect of the invention, a scope is utilized in a method for displaying items in a computer system having a display. The method involves defining a scope of the physical memory locations from which items are to be drawn, the scope comprising the present computer memory and at least one other physical location. Once a query is received, in response to the query items are drawn from the physical locations as defined in the scope, and the items that are drawn from the query are then presented in a view on the display. In one embodiment, the at least one other physical location may be another computer, a location on a network, or an external storage device. In one embodiment, the view on the display can be switched to a physical folder view which indicates the physical locations where the items are physically stored.

In accordance with another aspect of the invention, non-file items may be represented in the virtual folders. In other words, files that are stored in memory are located in a physical store. The virtual folders can be made to include items that are not currently represented in the physical store. Examples of non-file items are e-mails, and contacts.

In accordance with another aspect of the invention, a method for presenting non-file items is implemented in a computer system with a display and a memory for storing items. The method includes providing a database that allows both non-file items and file items to be searched by a query. Once a query is received, both non-file items and file items that match the query are drawn, and the items that match the query are then presented on the display. In one embodiment, a relational database is provided that includes selected information about file items, and which may hold certain non-file items in their entireties.

In accordance with another aspect of the invention, a virtual address bar for selecting content stored on a computer file system is provided. A virtual address bar comprises a plurality of segments. Each segment corresponds to a filter for selecting content stored on the computer file system. Collectively, the corresponding filters of each segment in the virtual address bar represent a virtual address for selecting content stored on a computer file system.

Each segment is an interactive segment that can respond to user interactions to modify the virtual address of the virtual address bar. Selecting a segment in the virtual address bar causes those segments subsequent to the selected segment to be removed from the virtual address bar. Alternatively selecting a segment in the virtual address bar causes a list of selectable peer filters to be displayed to the user. The peer filters are peers to the alternatively selected segment's corresponding filter. Selecting one of the peer filters causes the alternatively selected segment to replace its corresponding filter with the selected peer filter. Additionally, those segments subsequent to the alternatively selected filter segment are removed from the virtual address bar.

Segments may be added to the virtual address bar according to external user actions. Segments are added at the end of the segments in the virtual address bar. Any segments that conflict with an added segment are removed. An existing segment in the virtual address bar conflicts with the added segment when the existing segment is mutually exclusive to the added segment. An existing segment in the virtual address bar also conflicts with the added segment when the existing segment is broader or narrower in scope than the added segment.

In accordance with another aspect of the invention, a shell browser is provided which includes a window and an edit control. The window displays a group of items and also displays metadata values associated with one or more of the displayed items. The edit control permits user modification of at least a portion of the metadata values displayed in the window.

In accordance with another aspect of the invention, a graphical user interface is embodied on a computer-readable medium and is executable on a computer. The graphical user interface includes a first screen area which displays a set of items in a shell browser and a second screen area which displays metadata associated with one or more of the displayed items. The graphical user interface also presents the user with means within the shell browser for modifying the displayed metadata.

In accordance with a further aspect of the invention, computer-implemented methods are provided for enabling a user to modify metadata within a shell browser. One such method includes displaying a plurality of items, receiving a first input from the user representing a selection of at least one displayed item, displaying metadata associated with the selected item(s) and providing an edit control for user modification of the displayed metadata. Another such method includes displaying a welcome pane and metadata associated with the welcome pane and providing an edit control for user modification of the displayed metadata.

In accordance with another aspect of the invention, a data structure containing metadata associated with one or more items is displayed in a shell browser. The data structure, which is stored on one or more computer-readable media, includes a field containing user modifiable metadata associated with the one or more displayed items, and the user modifiable metadata contained in the data structure is also displayed in the shell browser.

In accordance with another aspect of the invention, a shell browser is provided which includes a default previewer and an extensibility mechanism. The default previewer provides a standard level of functionality for multiple item types. The extensibility mechanism enables functionality beyond the standard level provided by the default previewer for one or more of the item types.

In accordance with another aspect of the invention, a shell browser is provided which includes a first previewer and a second previewer. The first previewer provides a standard level of functionality for multiple item types, and the second previewer provides an alternative or extended level of functionality for one or more of the multiple item types. The shell browser is configured to selectively deploy either the first previewer or the second previewer for the one or more item types.

In accordance with another aspect of the present invention, a graphical user interface for a shell browser which supports multiple item types is provided. The graphical user interface includes a first screen area for displaying a set of items in the shell browser and means for selecting a previewer for the displayed items from a plurality of available previewers.

In accordance with another aspect of the invention, a computer-implemented method is provided for selecting a previewer in a shell browser which supports multiple item types. The method includes providing a plurality of previewers in the shell browser for a particular item type and selecting one of the previewers for the particular item type. The method then associates the selected previewer with the particular item type.

In accordance with another aspect of the invention, a computer-implemented method is provided for enabling the use of third party previewers in a shell browser which supports multiple item types. The method includes providing a shell browser having a default previewer for the multiple item types and providing an extensibility mechanism which enables a third party to develop an alternative previewer for at least one of the multiple item types.

In accordance with another aspect of the invention, a data structure is provided which contains information indicative of a plurality of previewers in a shell browser. The data structure, which is stored on one or more computer-readable media, includes a first field containing information indicative of a default previewer which supports multiple item types. A second field contains information indicative of an alternative previewer for a first item type, and a third field contains information indicative of whether to invoke the default previewer or the alternative previewer when items of the first item type are displayed in the shell browser.

In accordance with another aspect of the invention, different types of items are grouped into libraries for which a similar set of basic UI features are provided. In other words, a similar set of basic UI features is provided for different types of libraries, such as a document library, a photo library, and a music library. This set of basic UI features may include features such as filtering, creating new categories, editing the metadata of the items, altering the pivots, etc. The similar set of basic UI features for the libraries allows a user to process and organize different types of items using attributes and features they are already familiar with.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 34 is a diagram illustrative of a screen display in which "Author 1" has been selected from the list of FIG. 33 and all of the Author 1's documents are shown;

FIG. 51 B is a block diagram of an exemplary graphical user interface for a shell browser having one or more edit controls in accordance with an embodiment of the present invention;

FIG. 65 is a flow diagram illustrating a method for enabling the use of third party previewers in a shell browser in accordance with an embodiment of the present invention.

DETAILED DESCRIPTION OF THE PREFERRED EMBODIMENT

The present invention is directed to a file system shell which incorporates a number of desirable features. In essence, the shell provides users with the ability to view and manipulate files and other items that are stored on a computer. The following description first provides a summary of the features that are shown in the FIGS. 1-66, and then provides a detailed discussion.

Figure 19:
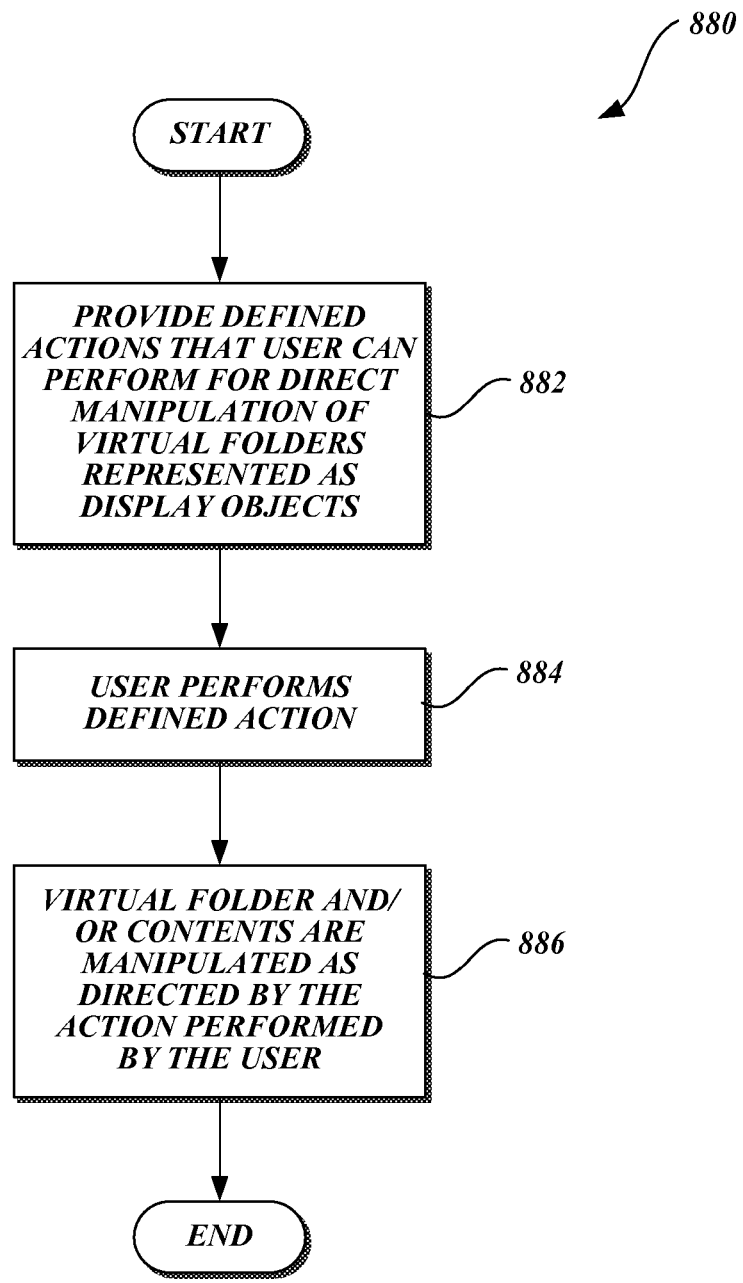
FIG. 19 is a flow diagram illustrative of a routine by which a user can directly manipulate virtual folders.
Figure 20:
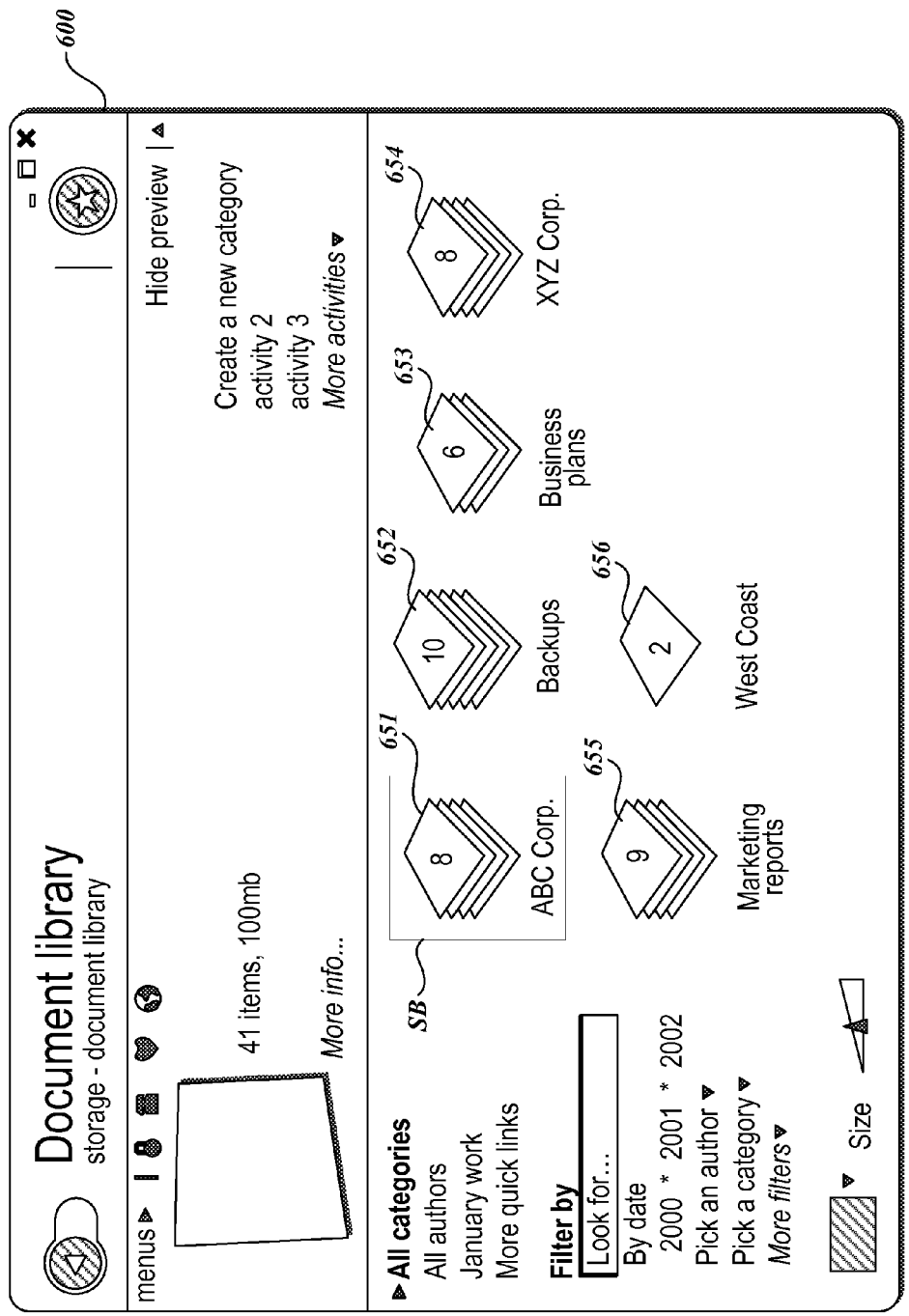
FIG. 20 is a diagram illustrative of a screen display in which a new "West Coast" stack has been added to the stacks of FIG. 10.
Figure 21:
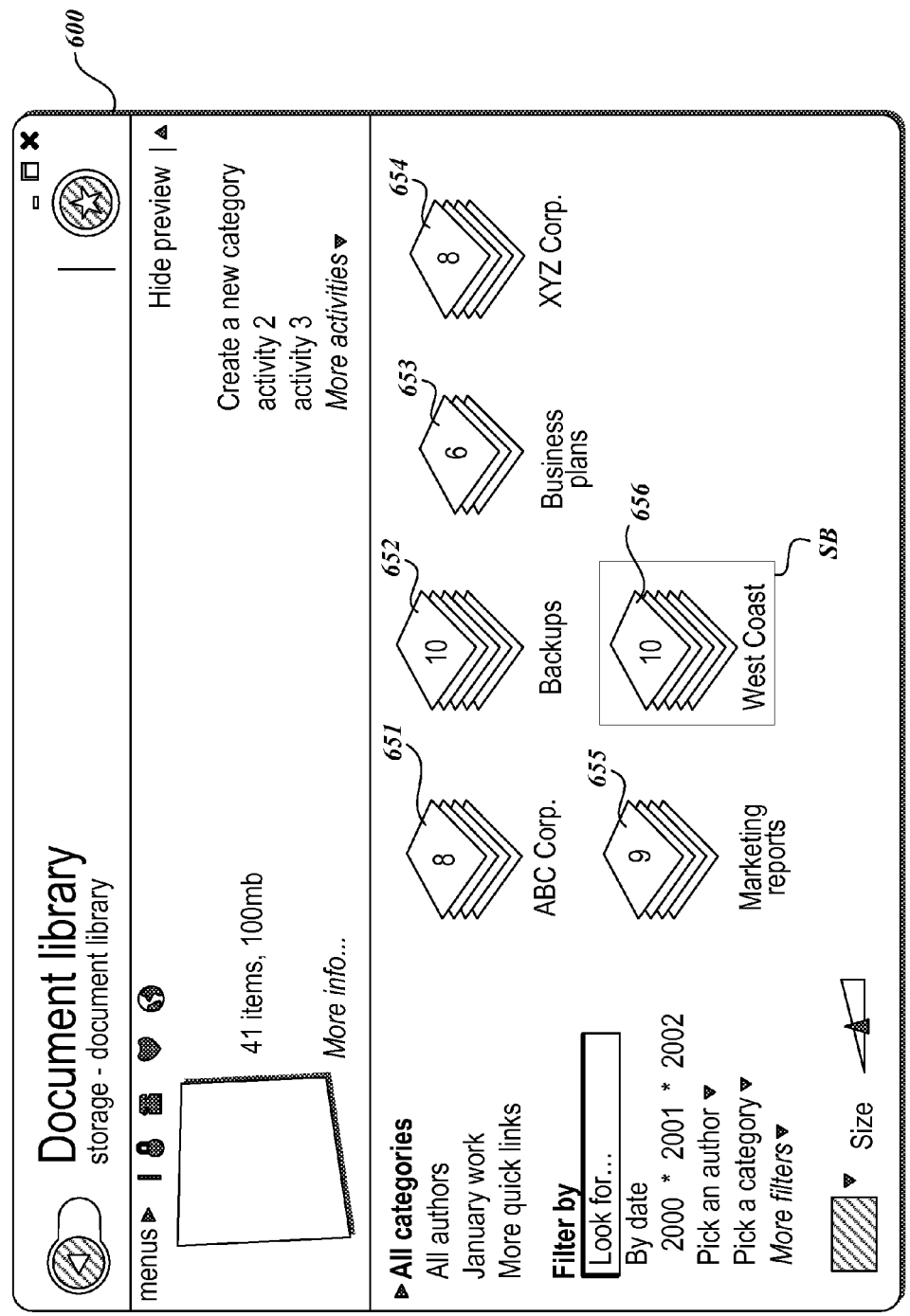
FIG. 21 is a diagram illustrative of a screen display in which direct manipulation is used for copying the files from the "ABC Corp." stack to the "West Coast" stack of FIG. 20.
Figure 35:
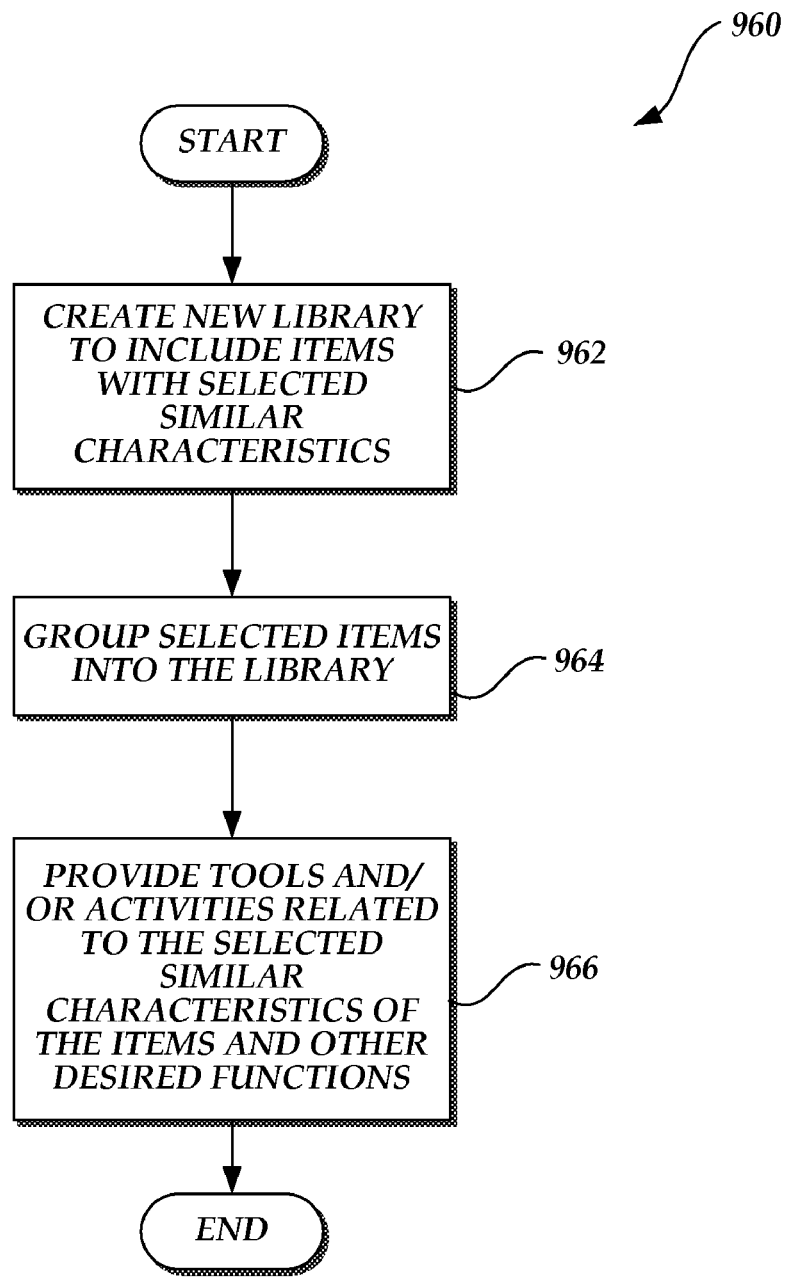
FIG. 35 is a flow diagram illustrative of a routine for creating a new library.
Figure 36:
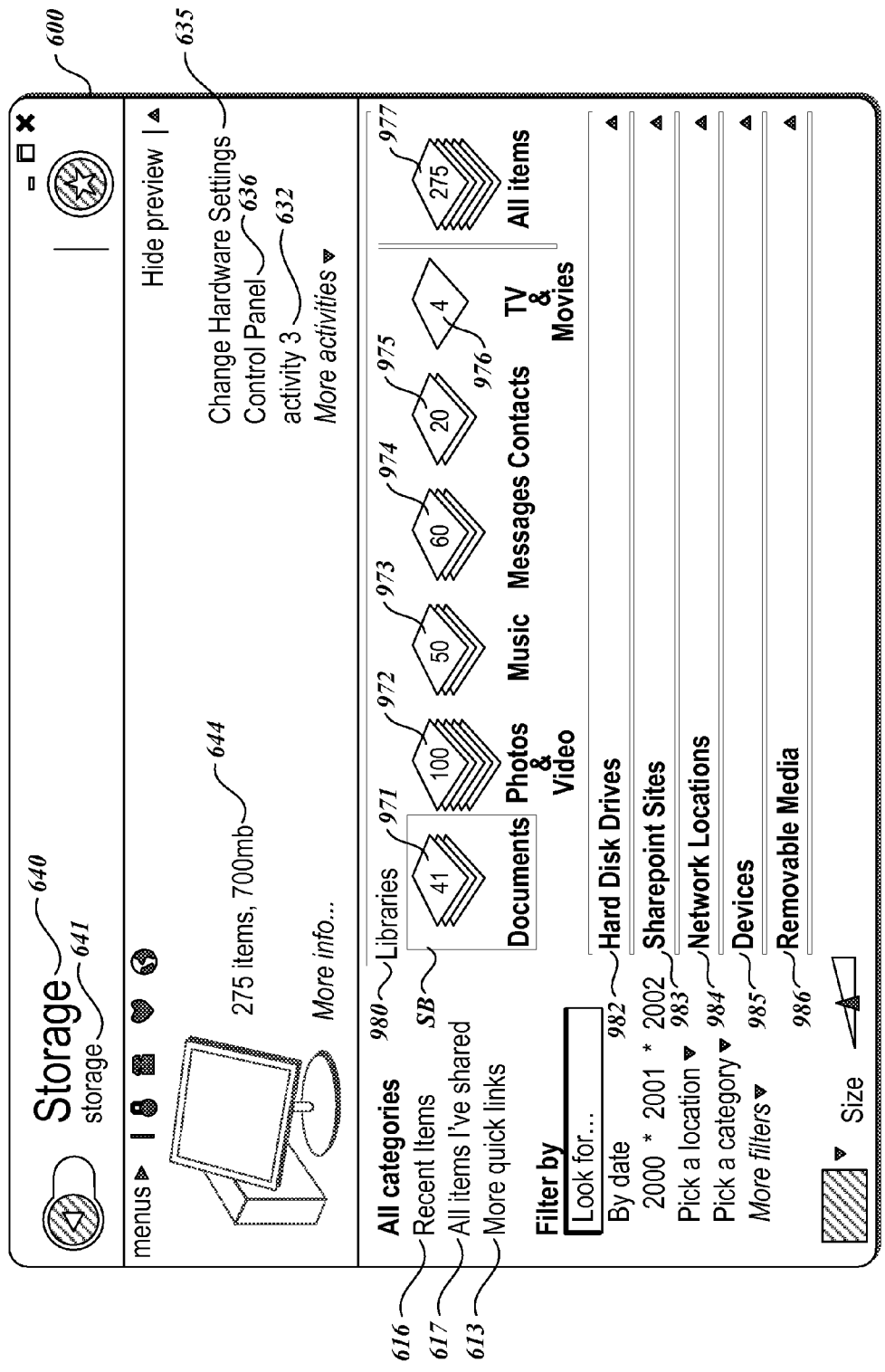
FIG. 36 is a diagram illustrative of a screen display in which a collection of various available libraries are shown.
Figure 37:
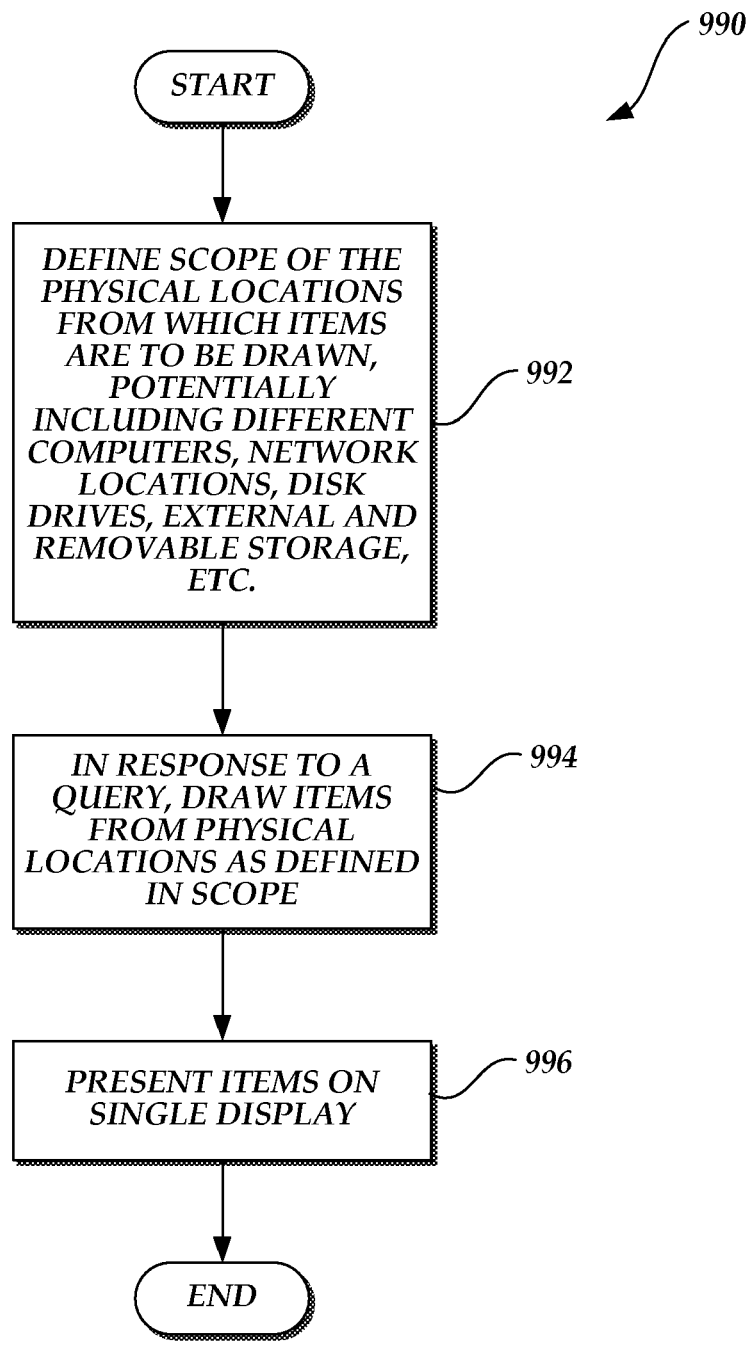
FIG. 37 is a flow diagram illustrative of a routine for defining the scope of a virtual folder collection.
Figure 38:
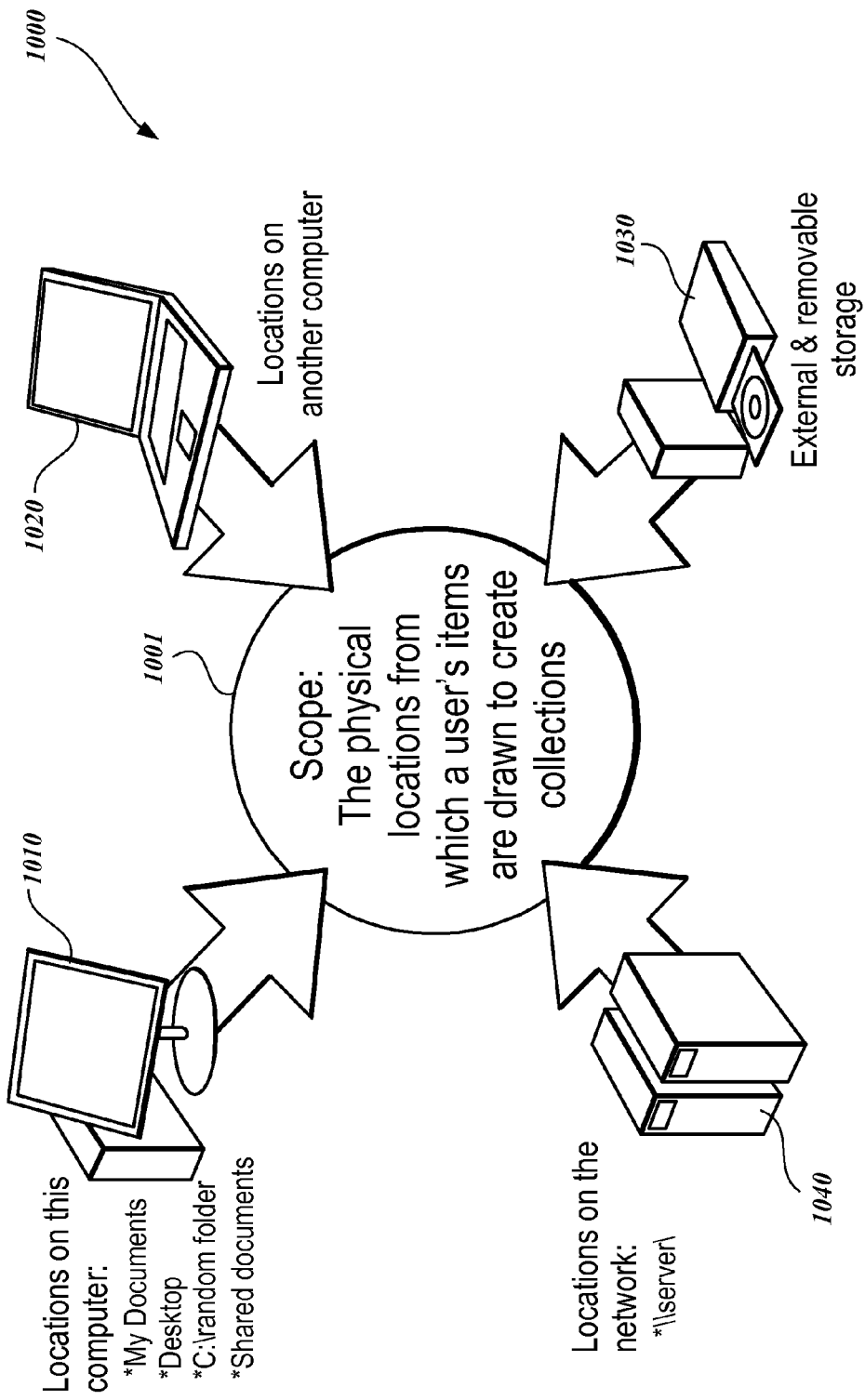
FIG. 38 is a block diagram illustrative of the various sources which may form the scope of a virtual folder collection.
Figure 39:
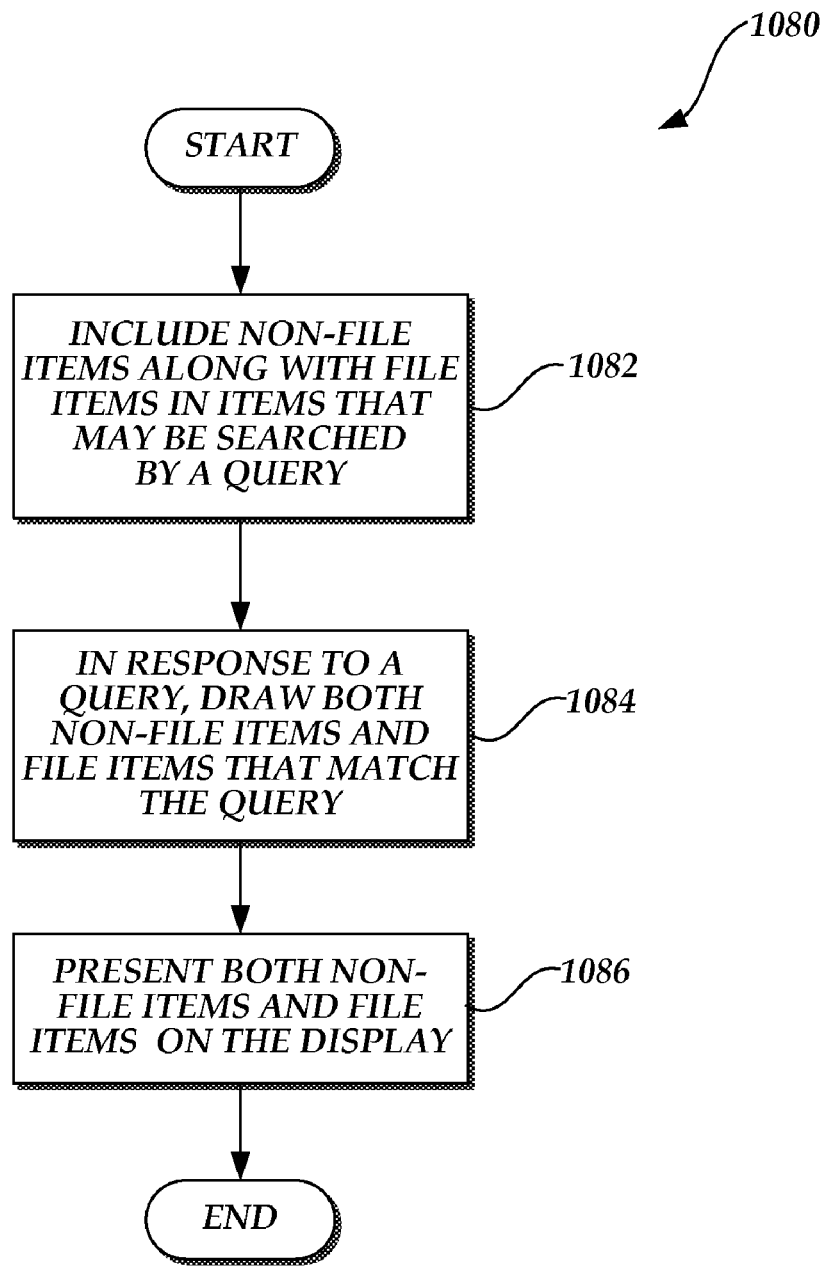
FIG. 39 is a flow diagram illustrative of a routine for including non-file items in a virtual folder collection.
Figure 40:
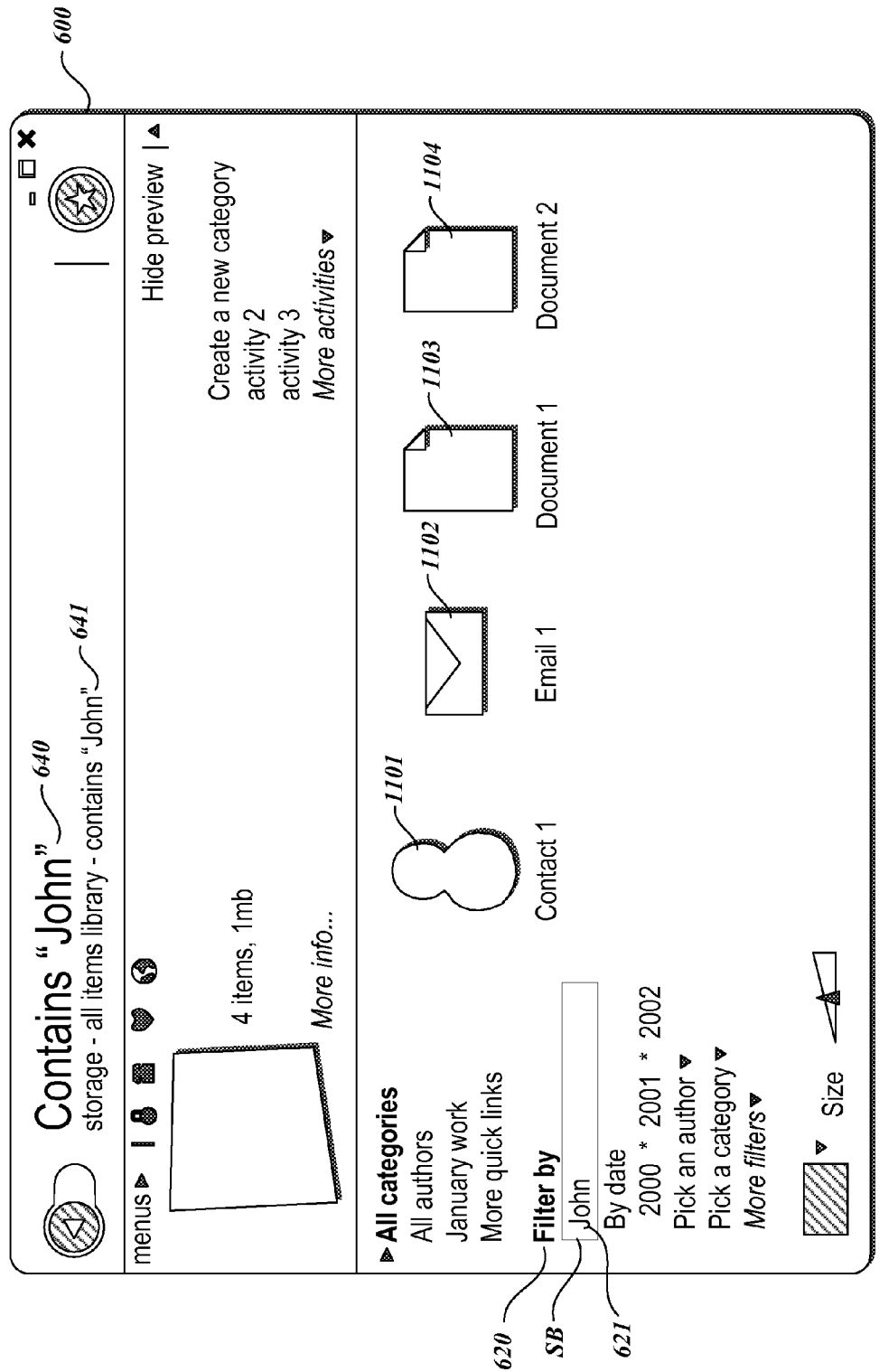
FIG. 40 is a diagram illustrative of a screen display showing various non-file items included in a virtual folder.

In summary, FIGS. 1-9 are generally directed to an overall system for virtual folders. Virtual folders provide a method for allowing a conventional user interface to expose regular files and folders (also known as directories) to users in different views based on their metadata instead of the actual physical underlying file system structure on the disk. FIGS. 10-18 are generally directed to stacks, which are related to the ability of the virtual folders to take any property that is stored in the database and represent it as a container that is like a folder. FIGS. 19-21 are generally directed to direct manipulation of virtual folders, which relates to providing mechanisms for manipulating virtual folders that are similar to the mechanisms currently used for manipulating standard folders (e.g., copying, pasting, clicking and dragging, etc.). FIGS. 22-29 are generally directed to filters, which provide a set of tools for narrowing down a set of files/items. FIGS. 30-34 are generally directed to quick links, which are a set of predefined links that can be clicked on to generate useful views of sets of files/items. FIGS. 35-36 are generally directed to libraries, which are related to the concept that groups of usable types of files can be associated together, and that tools and activities that are related to the particular types of items can be provided. FIGS. 37-38 are generally directed to scope which is related to the concept of being able to acquire files/items from multiple physical locations (e.g., different hard drives, different computers, from a computer in a network location, etc.) so that to the user all the files/items are presented with the same convenience as if they were being provided from one location. FIGS. 39-40 are generally directed to non-file items, which can be included in the database along with files, and which can include items such as emails and contacts. FIGS. 41-50 are generally directed to a virtual address bar which comprises a plurality of segments, each segment corresponding to a filter for selecting content. FIGS. 51-57 are generally directed to a shell browser, with which users can readily identify an item based on the metadata associated with that item. FIGS. 58-66 are generally directed to extending the functionality of an object previewer in a shell browser configured to display a plurality of items representing multiple item types. The following description provides a detailed discussion of each of these aspects of the invention.

As noted above, FIGS. 1-9 are generally directed to a system for implementing virtual folders. Virtual folders utilize the same or similar user interfaces that are currently used for file systems. The virtual folders expose regular files and folders (also known as directories) to users in different views based on their metadata instead of the actual physical underlying file system structure on the disk. Location-independent views are created which allow users to manipulate their files and folders utilizing similar controls as those presently used for managing file systems. In general, this means that users can organize and rearrange their files based on inherent properties in the files themselves, instead of the managing and organization being done as a separate part of the system. The virtual folders may represent files or items from different physical locations, such as from multiple disk drives within the same computer, between multiple computers, or different network locations, such that one view of files or items can expose files or items sitting at different physical locations. In one embodiment, the different items or files need only be connected via an IP network in order to be included.

The virtual folder modeling is also able to be used for traditionally non-file entities. An application of this is to have a set of user interfaces similar to files and folders (that is, objects and containers) to show traditionally non-file entities. One example of such non-file entities would be e-mails, while another would be contact information from a contact database. In this manner, virtual folders provide for a location-independent, metadata-based view system that works regardless of whether the data being shown is from files or non-file entities. In general, these aspects allow more flexibility in terms of letting users manipulate their files and data, using both common user interface techniques (drag and drop, double-click, etc.) as well as leveraging the rich integration of various data types.

Figure 1:
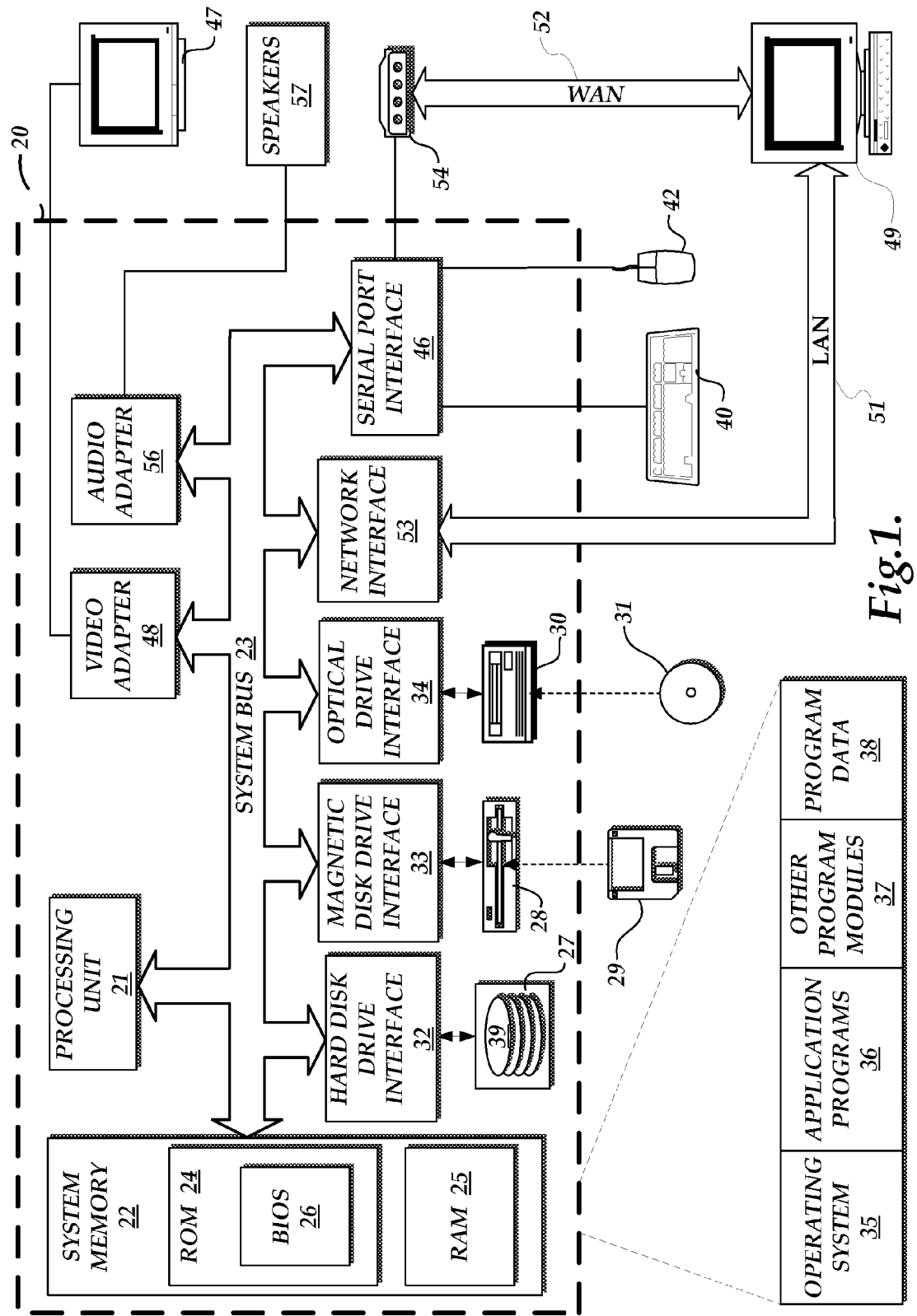
FIG. 1 is a block diagram of a general purpose computer system suitable for implementing the present invention.

FIG. 1 and the following discussion are intended to provide a brief, general description of a suitable computing environment in which the virtual folders, and any of the other aspects of the present invention that are described herein, may be implemented.

Although not required, the invention will be described in the general context of computer-executable instructions, such as program modules, being executed by a personal computer.

Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that helps to transfer information between elements within the personal computer 20, such as during start-up, is stored in ROM 24. The personal computer 20 further includes a hard disk drive 27 for reading from or writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

As implemented on a system of the type illustrated in FIG. 1, the present invention utilizes virtual folders which make it easier for users to perform basic tasks around file manipulation and folder navigation (browsing) and to provide higher level storage capabilities which can be leveraged in new features. The virtual folders expose files and items to users in different views based on their metadata instead of the actual physical underlying file system structure on the disk.

Figure 2:
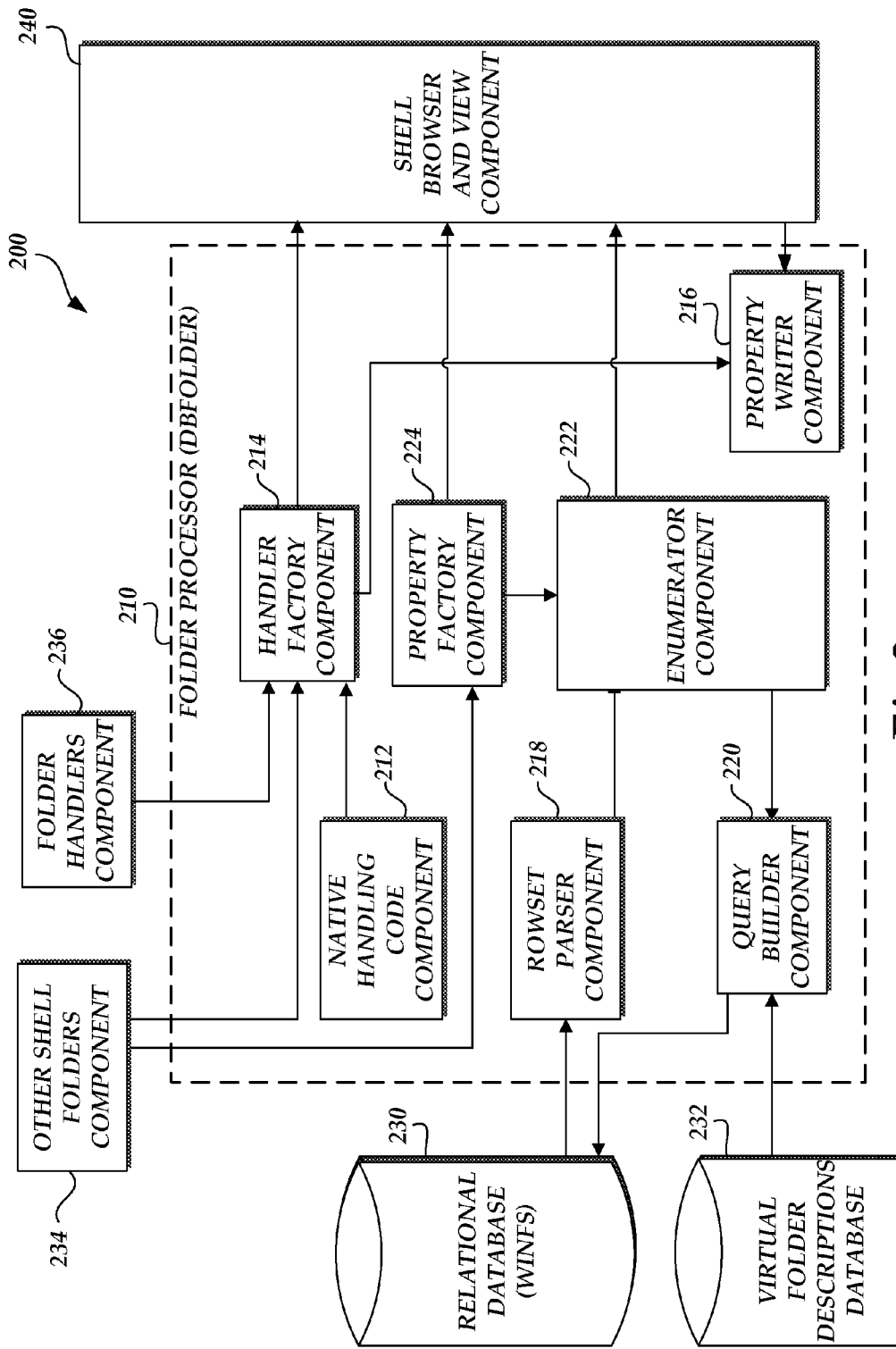
FIG. 2 is a block diagram of a virtual folder system in accordance with the present invention.

FIG. 2 is a block diagram of a virtual folder system 200 in accordance with the present invention. As will be described in more detail below, the virtual folders allow a user to change the "pivot" which controls the way the data is viewed. As an example, a user could view their music as a flat list of all the songs, which can be grouped by album. Alternatively, the user could switch the view to show only the genres or artists or years, etc. The user can tailor the view to see only the objects suited to the task at hand. This allows an improved browsing experience that negates the need for further navigation through folders (both down and back up). The same lessons and capabilities apply to modeling other data-types not stored as files. Contacts, for example, can be exposed to the user in this way, giving them familiar interface capabilities, as well as richer infrastructure for manipulating them than is provided by a flat address book.

As illustrated in FIG. 2, the virtual folder system 200 includes a folder processor 210, a relational database 230, a virtual folder descriptions database 232, an other shell folders component 234, a folder handler's component 236, and a shell browser and view component 240. The folder processor 210 includes a native handling code component 212, a handler factory component 214, a property writer component 216, a rowset parser component 218, a query builder component 220, an enumerator component 222, and a property factory component 224.

The relational database 230 stores properties about all files in the system. It also stores some items, like contacts (i.e., non-file items), entirely. In general, it stores metadata about the types of files and items that it contains. The relational database 230 receives SQL queries from the query builder 220. The relational database 230 also sends SQL rowsets to the rowset parser component 218, with one row per item column, columns being the item properties.

The virtual folder descriptions database 232 includes the virtual folder descriptions. The virtual folder descriptions database 232 sends data to the query builder component 220, including a list of types to display in the folder, the initial filter, and the physical locations to show results from (the scopes).

With regard to the other shell folders component 234, the folder processor 210 delegates to existing shell folders from many types of items, including all files, for handlers or properties. The other shell folders component 234 sends properties from other folders to the property factory 224. The other shell folders component also sends handlers to the handler factory 214.

The folder handlers component 236 provides code behavior for the items that exist only in the database, like contacts. This is what allows non-file items to behave akin to files. The folder handlers component 236 sends handlers to the handler factory 214.

For the native handling code component 212, the folder processor 210 directly implements certain handlers based on the properties of the items. The native handling code component 212 sends handlers to the handler factory 214. For the native handling code component 212 and the folder handlers component 236, like all namespaces, virtual folders have to provide a set of handlers (context menu, icon, thumbnail, infotip, . . . ) for their items. For most of these (infotip, data object, drag-drop handler, background context menu . . . ) the virtual folder provides a common (native) handler for all the types it holds. However there are others which the author of the type has to provide (context menu on the item itself, writable property store, . . . ). The default handler can also be overridden. Virtual folders reuse this for files and allow non-file items do the same.

The handler factory 214 takes ID lists and produces code behaviors that provide context menus, icons, etc. In general, the folder processor 210 may use native handlers, external handlers, or delegate to other shell folders to get handlers, as described above with respect to the native handling code component 212, the other shell folders component 234, and the folder handlers component 236. The handler factory component 214 sends handlers to the shell browser in view 240, as requested by the view. The handler factory component 214 sends a property handler to the property writer 216.

The property writer 216 converts user intentions such as cut, copy, and paste into property rights to the file or item. A shell browser and view component 240 sends data to the property writer 216, including direct manipulation (cut/copy/paste) or editing of metadata. In general, since virtual folders present an organization based on the properties of an item, operations such as move and copy (drag-drop) become an edit on those properties. For example, moving a document, in a view stacked by author, from Author 1 to Author 2, means changing the author. The property writer component 216 implements this function.

The rowset parser 218 takes database rowsets and stores all item properties into a shell ID list structure. A rowset takes the piecewise definition of the virtual folder and builds a SQL string which can then be issued to the database. The rowset parser component 218 sends ID lists to the enumerator component 222. As described above, the rowset parser component 218 also receives data from the relational database 230, including SQL rowsets, with one row per item, the columns being item properties.

The query builder component 220 builds SQL queries. The query builder component 220 receives data from the enumerator component 222, including new filters from the navigation. The query builder component 220 also receives data from the virtual folder descriptions database 232, including a list of the types to display in the folder, the initial filter, and the physical location to show results from (the scopes). The query builder component 220 sends the SQL queries to the relational database 230.

In general, the query builder component 220 includes a set of rows (in other words a table). This is what running the query yields. The rowset parser component 218 takes each row and using the column names transforms the row into an ID list. An ID list is a well-known shell structure which is used to reference items in a namespace. Doing this allows virtual folders to be just like any other namespace to the rest of the shell. Also caching this data helps keep database access, which can be costly, to a minimum.

The enumerator component 222 operates in response to a navigation to a virtual folder. As described above, the enumerator component 222 receives ID lists from the rowset parser component 218, and sends new filters from the navigation to the query builder component 220. The enumerator 222 also sends data to the shell browser and view component 240, including ID lists that are returned to be inserted into the view after a navigation.

The property factory component 224 takes ID lists and property identifiers and returns values for those properties. The property factory component 224 receives data from the handler factory component 214 including the property handler. As described above, the property factory component 224 also receives data from the other shell folders component 234, including properties from other folders. The property factory component 224 also sends data to the shell browser and view component 240, including item properties, as requested by the view.

The shell browser and view component 240 displays the contents of a folder in a window, and handles all the user interaction with the displayed files or items, such as clicking, dragging, and navigating. Thus, the shell browser and view component 240 receives the user actions. The shell browser and view component 240 also gets the data regarding the code behaviors that it needs from the folder, in this case the folder processor 210.

As described above, the virtual folders expose regular files and folders (also known as directories) to users in different views based on their metadata instead of the actual physical underlying file system structure on the disk. Thus, the system is able to take a property that is stored in the database and represent it as a container that is like a folder. Since users are already familiar with working with folders, by presenting the virtual folders in a similar manner, users can adapt to the new system more quickly.

Figure 3:
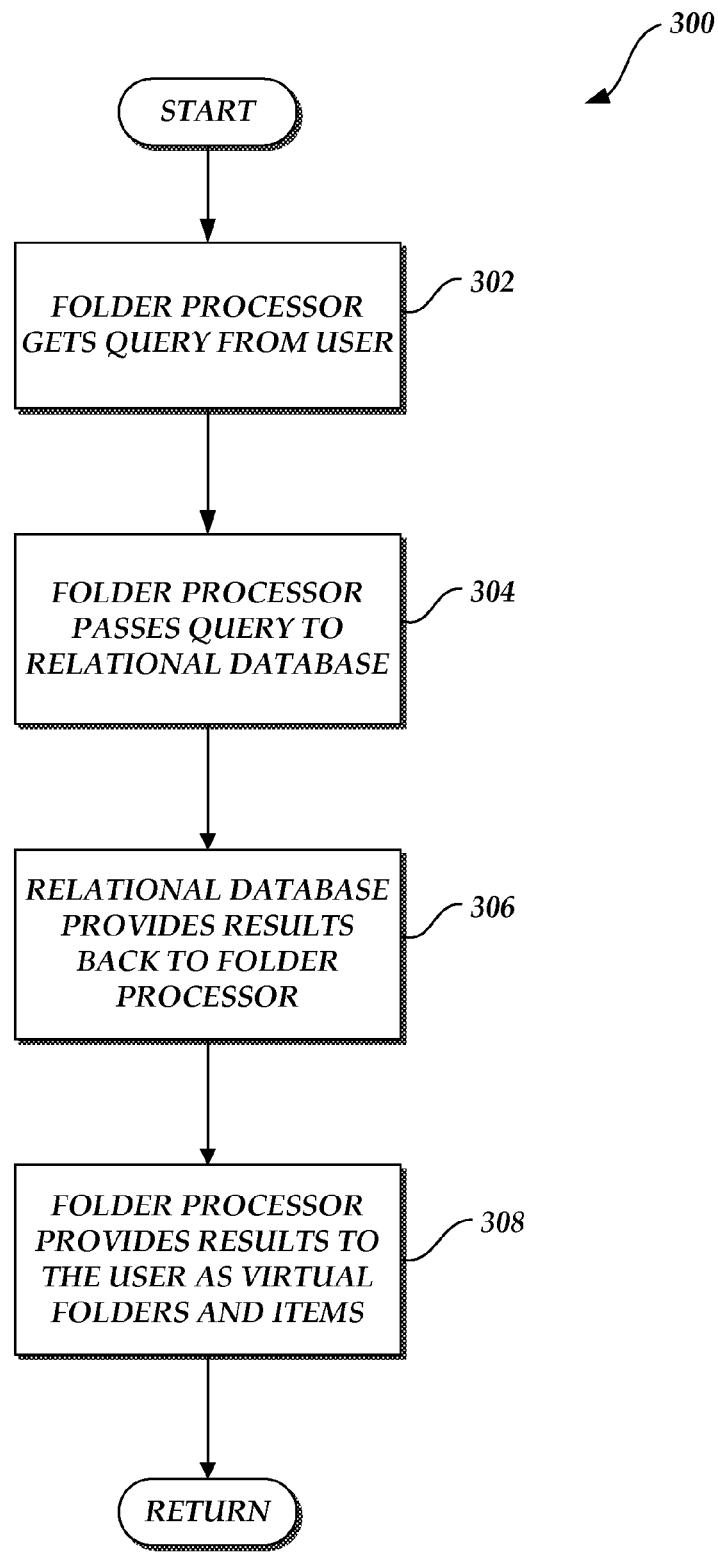
FIG. 3 is a flow diagram illustrative of a routine by which a user provides a query that draws back selected files and folders.

FIG. 3 is a flow diagram illustrative of a routine 300 by which a user provides a query that draws back selected items. At a block 302, the folder processor gets a query from the user. In a block 304, the folder processor passes the query to the relational database. At a block 306, the relational database provides the results back to the folder processor. At block 308, the folder processor provides the results to the user in the form of virtual folders and items.

Figure 4:
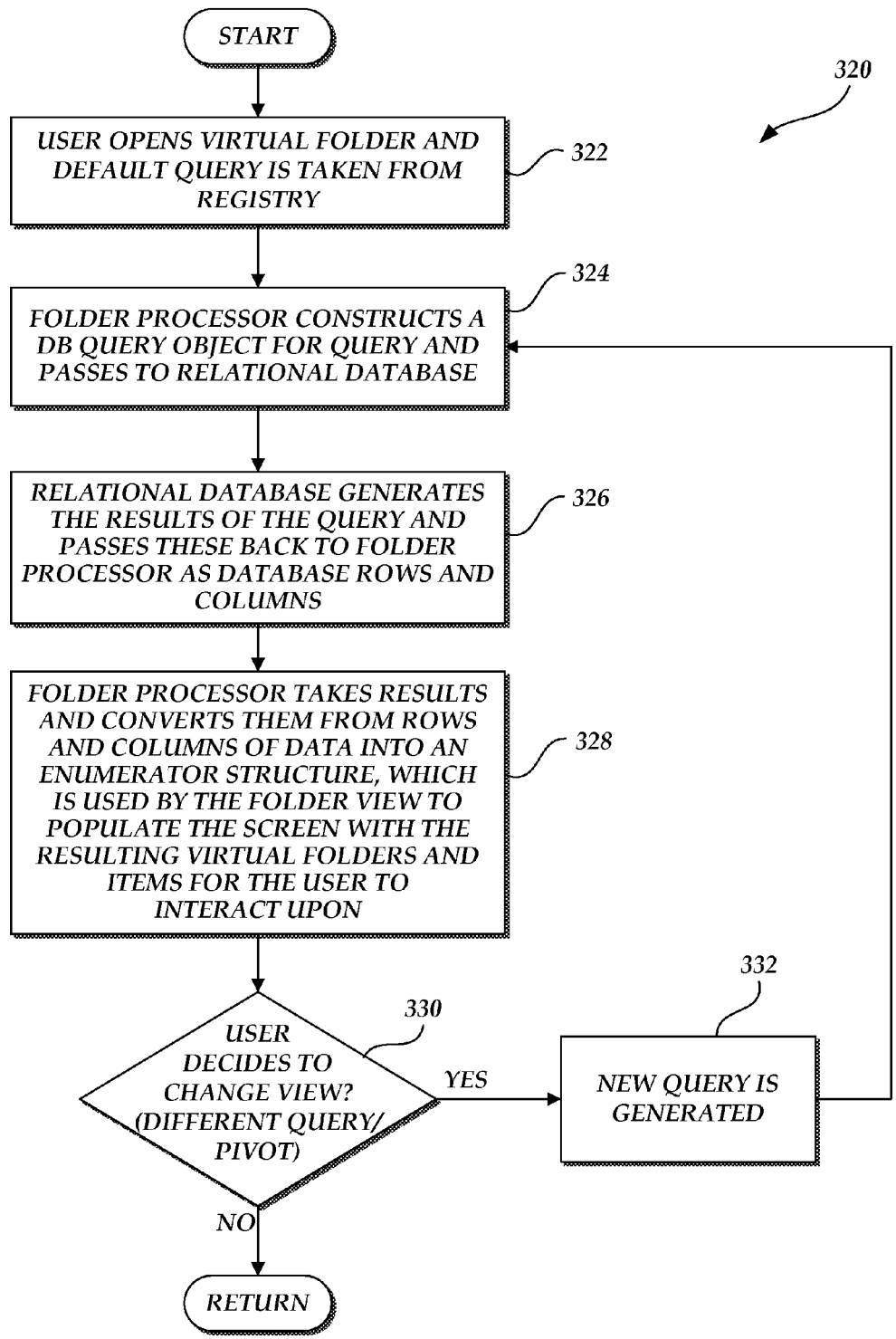
FIG. 4 is a flow diagram illustrative of a routine by which virtual folders are constructed and displayed on the screen in accordance with either a default query or a query from the user.

FIG. 4 is a flow diagram illustrative of a routine 320 by which virtual folders are constructed and displayed on the screen in accordance with either a default query or a query from the user. At a block 322, when a user first opens the virtual folder, a default query is used. This default query is taken from the registry. For example, the default query for a music library could be to show all the songs grouped by album. At a block 324, the folder processor constructs a query object for this query, and then passes this query to the relational database. At a block 326, the relational database generates the results of the query and passes these back to the folder processor as database rows and columns.

At a block 328, the folder processor takes these results and converts them from the rows and columns of data into an enumerator structure, which is used by the folder view to populate the screen with the resulting virtual folders and items for the user to interact upon. At a decision block 330, a user decides whether to change the view (by issuing a different query or "pivot"). For example, a user could issue a "show all artists" pivot. If the user does want to change the view, then the routine returns to block 324 where the folder processor passes this new query to the relational database, and receives back new rows and columns of results, and constructs a new enumerator structure. The process then continues as described above, as the folder view clears and updates, using the enumerator to draw the "artist" objects to the screen.

In one example, album objects are provided that represent containers that users can navigate into. For example, double-clicking the "Beatles" albums will navigate the view to see all of the Beatles' songs. The folder processor issues the "show all Beatles' songs" query to the relational database, which hands back the rows and columns of data for those songs. The folder processor creates an enumerator of all these songs, which then get drawn to the screen.

The user can also choose the view at any point while browsing virtual folders. From the above example, after narrowing down to just show Beatles songs, a user can change the view to only show the songs as albums. The process of changing the view of items into another representation is called "stacking". This is because the items are conceptually arranged into "stacks" based on that representation. In this case, the songs are rearranged into stacks for each of the various albums. Users can then navigate into one of these stacks, only seeing the songs from that particular album. Again, the user can rearrange the view of these remaining songs into stacks based on a property (e.g., a rating, for example). If the rating property were selected, the songs from that Beatles album would be shown in stacks for a one-, two-, or a three-star rating.

The results of each query depend on which physical locations are included in the scope. For example, the scope may be made to include only the folders in the user's "my documents" folder. Alternatively, the scope could include all folders on the computer, or even all folders on multiple network connected computers. The user is able to view and change the scope through a scope property sheet. In one example, the scope property sheet could be exposed by right-clicking on the virtual folder and choosing "properties." The user could add new folders to the scope, or remove folders that were previously added.

One group of users for which virtual folders will provide particular utility is knowledge workers. Virtual folders allow knowledge workers to easily switch between viewing documents by file type, project, case number, author, etc. Since knowledge workers each tend to have a different method for organizing documents, virtual folders can be used to accommodate these different preferences.

Figure 5:
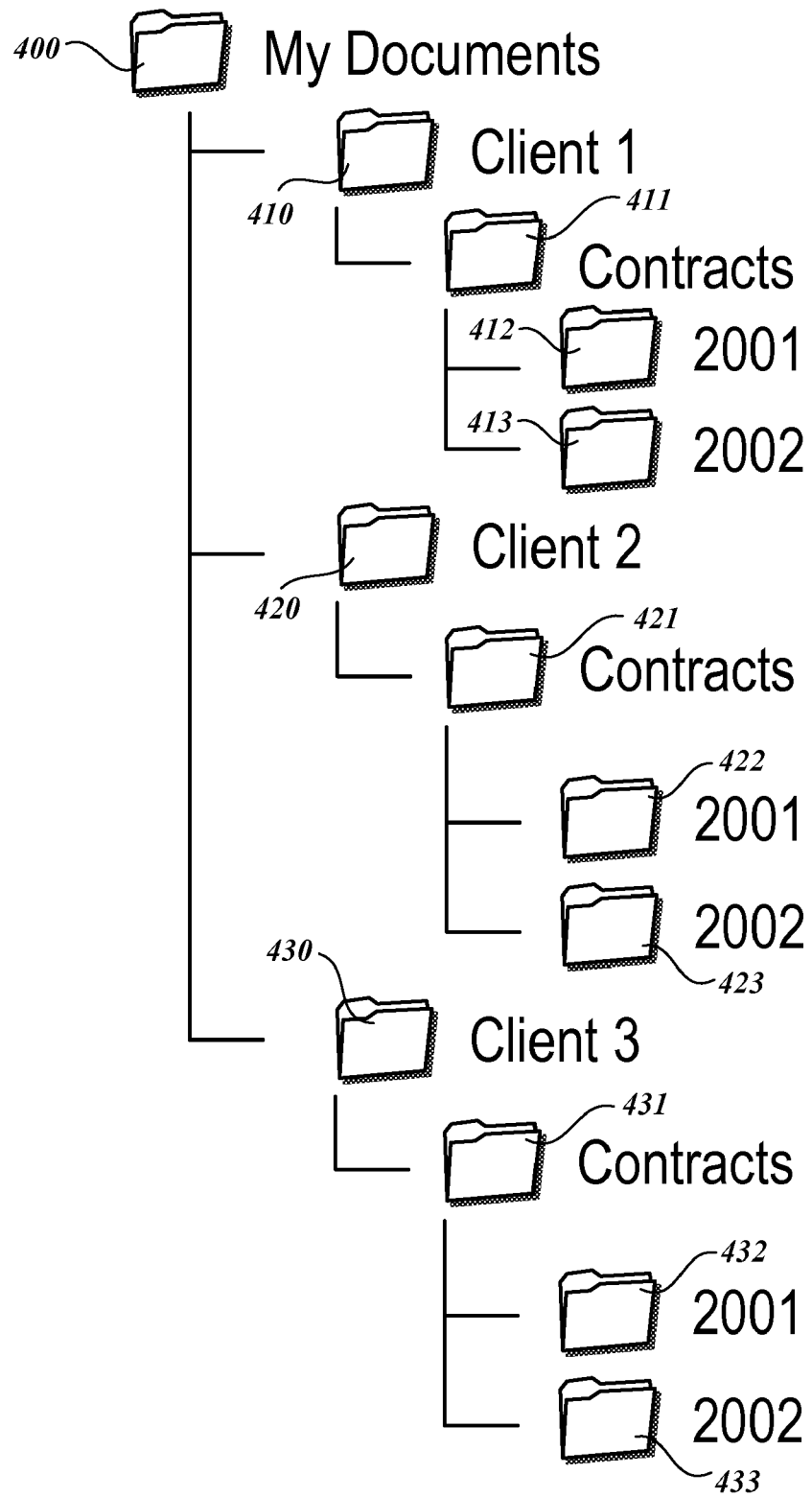
FIG. 5 is a tree diagram of a folder structure in accordance with a physical folder arrangement on a hard drive.

FIG. 5 is a tree diagram of a folder structure in accordance with a physical folder arrangement on a hard drive. This physical folder arrangement is based on the traditional implementation of folders, which may be based on NTFS or other existing file systems. Such folders are referred to as physical folders because their structuring is based on the actual physical underlying file system structure on the disk. As will be described in more detail below, this is in contrast to virtual folders, which create location-independent views that allow users to manipulate files and folders in ways that are similar to those currently used for manipulating physical folders.

As illustrated in FIG. 5, a folder 400 is a "my documents" folder. At a first level, the folder 400 includes folders 410, 420, and 430, corresponding to Clients 1, 2, and 3, respectively. At a second level, each of the folders 410, 420, and 430 contain a folder 411, 421, and 431, respectively, which each correspond to the contracts for the selected client. At a third level, each of the folders 411, 421, and 431 contains a folder 412, 422, and 432, respectively, each corresponding to the year 2001. At the third level, each of the folders 411, 421, and 431 also contains a folder 413, 423, and 433, respectively, each corresponding to the year 2002.

It will be appreciated that a number of obstacles are presented to a user who wishes to navigate a physical folder file structure such as that illustrated in FIG. 5. For example, if the user wishes to work with all of the contracts that the user has produced, the user will first need to navigate to the folder 411 to work with the contracts for Client 1, and then will have to renavigate to the folder 421 to reach the contracts for Client 2, and will again have to renavigate to the folder 431 for the contracts for Client 3. This arrangement makes it difficult for the user to access all of the contracts, and in general prevents simultaneous viewing and manipulation of all of the contracts. Similarly, if the user wishes to view all of the contracts produced in the year 2001, the user will have to navigate and renavigate to the folders 412, 422, and 432, respectively. As will be described in more detail below, the virtual folders of the present invention provide an improved file system structure.

Figure 6:
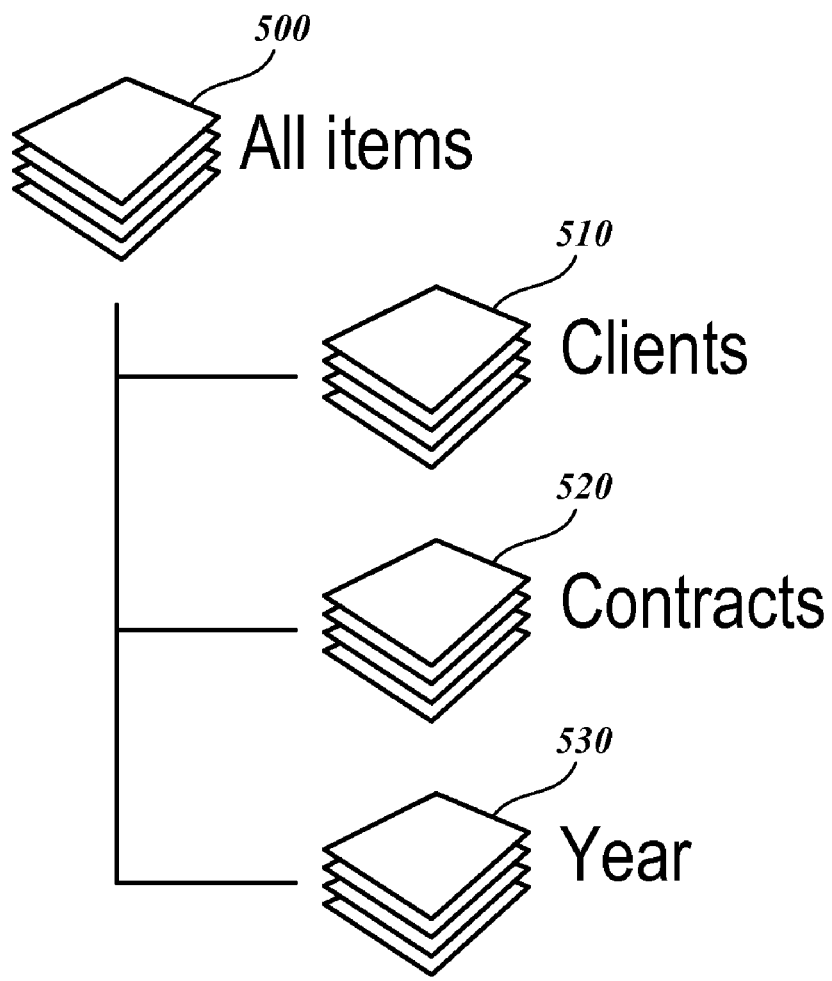
FIG. 6 is a tree diagram of a virtual folder structure.

FIG. 6 is a tree diagram of a virtual folder structure. As will be described in more detail below, virtual folders create location-independent views that allow users to manipulate their files and folders in convenient ways. As shown in FIG. 6, the virtual folders are represented as stacks. A virtual folder 500 is an "all items" folder. At a first level, the virtual folder 500 contains virtual folders 510, 520, and 530, corresponding to clients, contracts, and year, respectively. As will be described in more detail below, this structure allows a user to access files according to a desired parameter.

Figure 7:
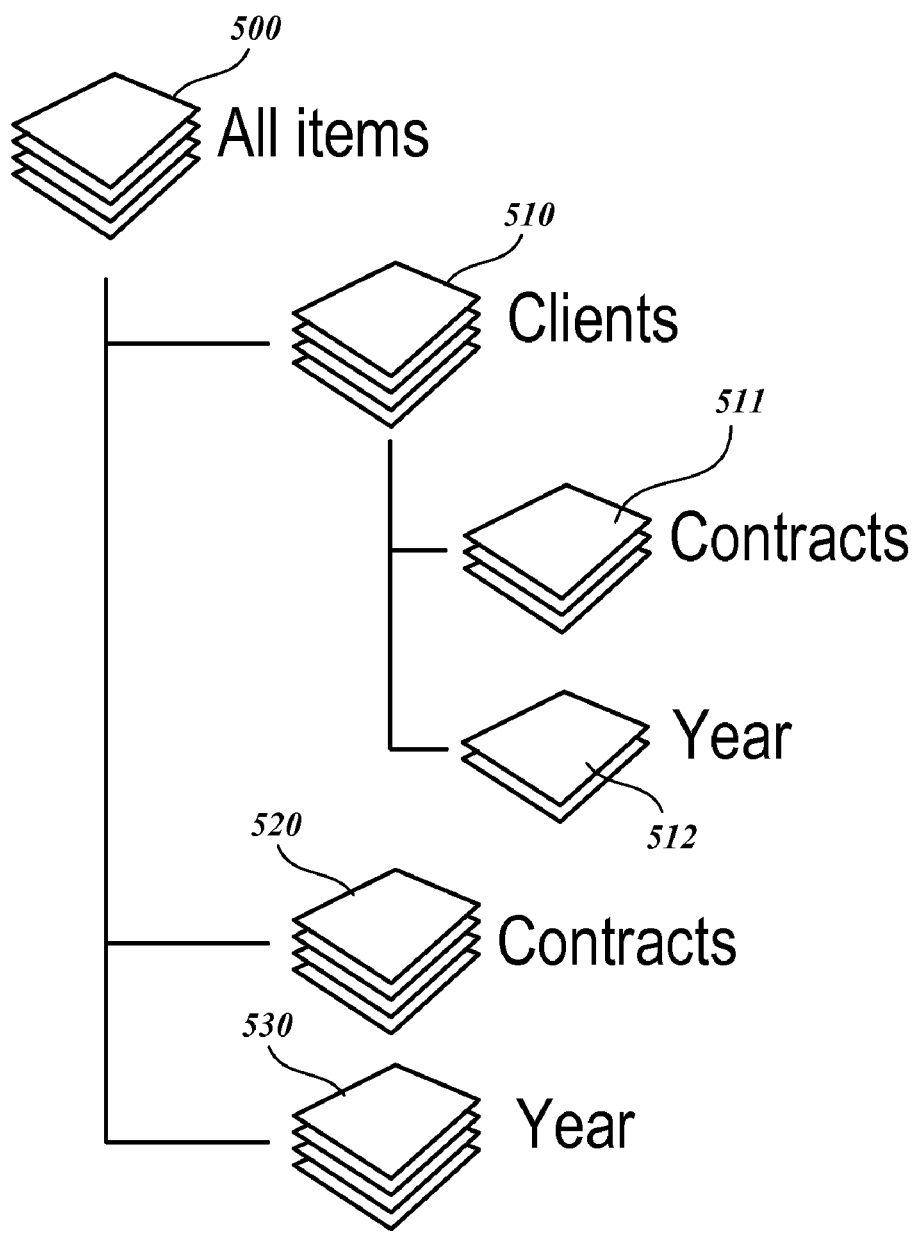
FIG. 7 is a tree diagram of the virtual folder structure of FIG. 6, wherein the clients stack is further filtered by contracts and year.

FIG. 7 is a tree diagram of the virtual folder structure of FIG. 6, wherein at a second level, the virtual folder 510 further includes virtual folders 511 and 512, which correspond to contracts and year, respectively. In other words, the clients stack of virtual folder 510 is further filtered by contracts and year. The process for determining which files and items are contained in each of the virtual folders will be described in more detail below.

Figure 8:
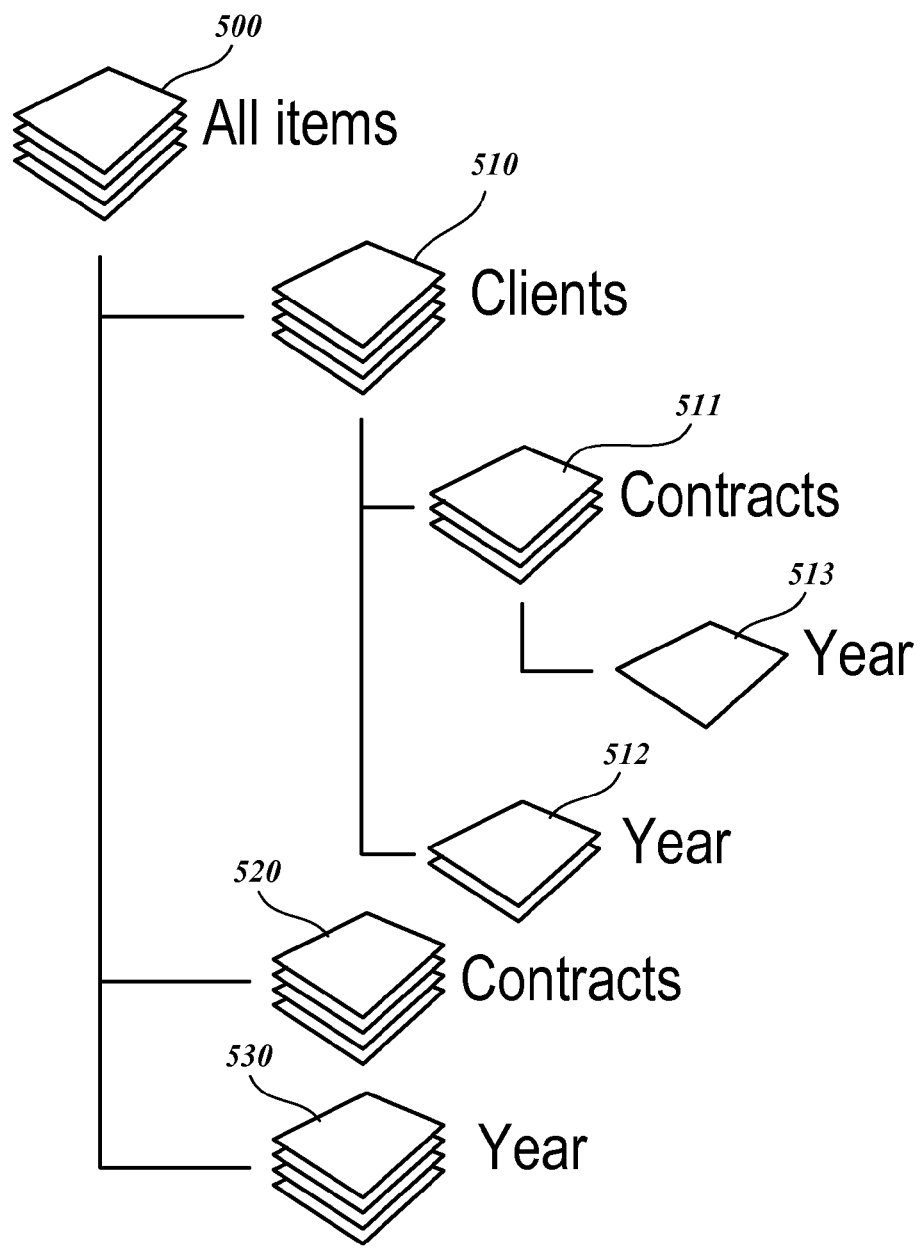
FIG. 8 is a tree diagram of the virtual folder structure of FIG. 7, wherein the contracts of the clients stack are further filtered by year.

FIG. 8 is a tree diagram of the virtual folder structure of FIG. 7, wherein at a third level, the virtual folder 511 contains a virtual folder 513, which corresponds to a year. In other words, the contracts stack of virtual folder 511 is further filtered by year. While the virtual folder structure for the virtual folders 510, 511, and 513 have been structured according to clients, contracts, and year, it will be appreciated that the virtual folders allow for other structuring sequences to occur, as will be described in more detail below with reference to FIG. 9.

Figure 9:
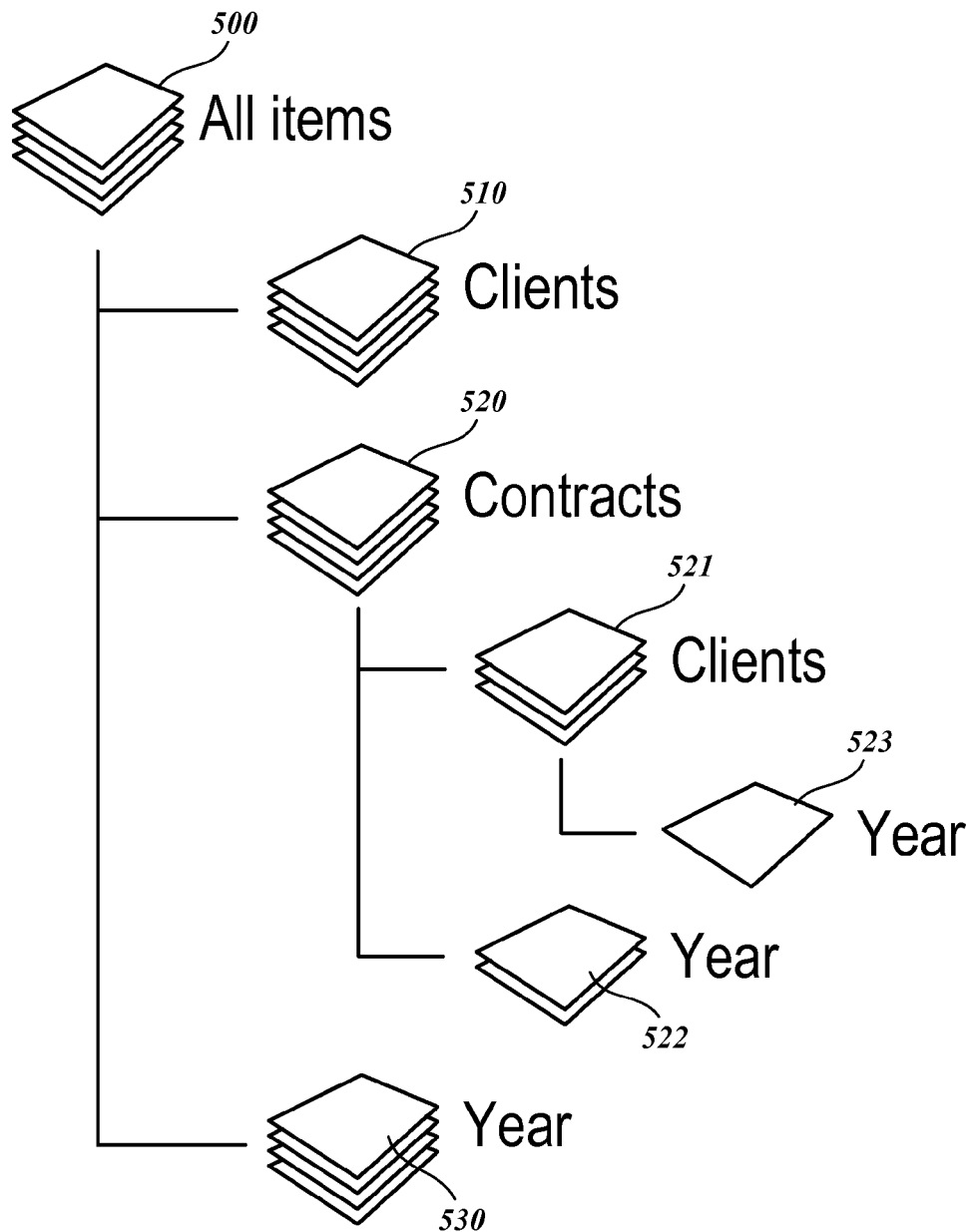
FIG. 9 is a tree diagram of the virtual folder structure of FIG. 6, wherein the contracts stack is further filtered by clients and year, of which the clients are still further filtered by year.

FIG. 9 is a tree diagram of the virtual folder structure of FIG. 6, wherein at a second level, the virtual folder 520 has been further filtered into virtual folders 521 and 522, corresponding to clients and year. At a third level, the virtual folder 521 has further been filtered to a virtual folder 523, corresponding to a year. The contrast between the organizational structures of FIGS. 8 and 9 helps illustrate the flexibility of the virtual folder system. In other words, in a virtual folder system, a user is able to navigate the virtual folders according to desired parameters, as opposed to being dependent on the location-dependent views of a physical file structure such as that illustrated in FIG. 5.

Figure 10:
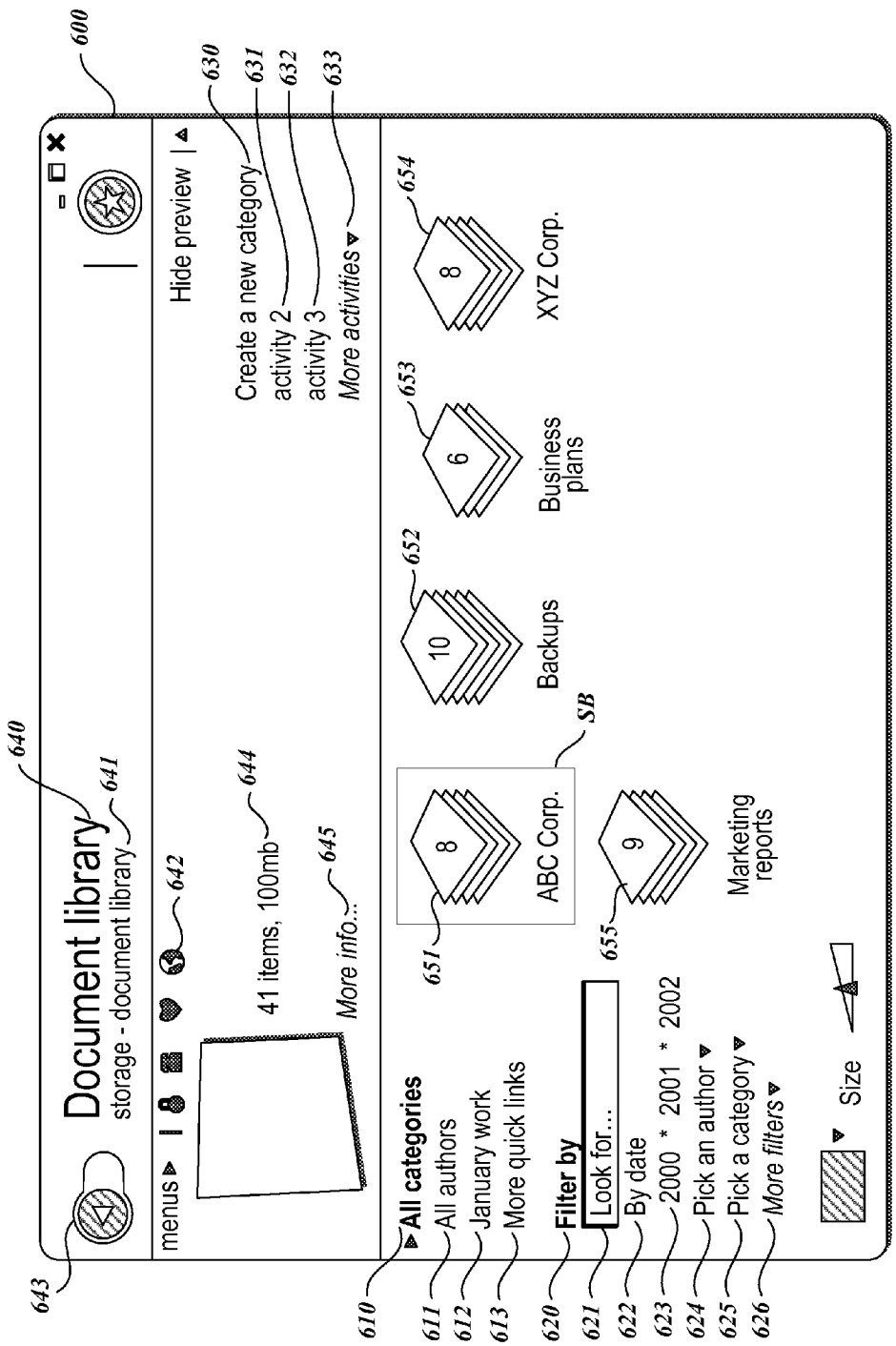
FIG. 10 is a diagram illustrative of a screen display showing the stacks of a document library.

FIG. 10 is a diagram illustrative of a screen display 600 showing the stacks of a document library. As noted above, stacks can be used to represent a type of virtual folder. As will be described in more detail below, the screen display 600 includes quick link elements 610-613, filter elements 620-626, activity elements 630-633, information and control elements 640-645, and virtual folder stacks 651-655.

The quick link elements include an "all categories" quick link 610, on "all authors" quick link 611, a "January work" quick link 612, and a selection for displaying additional quick links 613. As will be described in more detail below, quick links can be selected by a user to perform desired navigations of the virtual folders. Quick links may be provided by the system, and some quick links may be created and saved by a user.

The filter elements include a "filter by" indicator 620, an entry blank 621, a "by date" indicator 622, a "year" selector 623, a "pick an author" selector 624, a "pick a category" selector 625, and a "more filters" selector 626. The "filter by" indicator 620 directs a user to the fact that the items below can be used to filter the virtual folders or items. The entry blank 621 provides an area in which a user can type a desired new filter term. The "by date" indicator 622 directs a user to the fact that by selecting a date from the "year" selector 623, the virtual folders or items can be filtered by the selected year. The "pick an author" selector 624 allows a user to filter according to a specific author. The "pick a category" selector 625 allows a user to filter according to a selected category. The "more filters" selector 626 allows a user to pull up additional filters on the display.

The activity selectors include a "create a new category" selector 630, "activity" selectors 631 and 632, and a "more activities" selector 633. As will be described in more detail below, the activities that are presented may be for generally desirable functions, or may more specifically be directed to activities useful for the type of virtual folders that are currently being displayed. For example, the "create a new category" selector 630 can be selected by the user to create a new category which will be represented by a new stack.

As noted above, the activity selectors 631 and 632 may be more specifically directed to the type of folders or items that are being displayed. For example, the present display is of a document library, for which the "activity" selectors 631 and 632 may be directed to activities specifically tailored for documents, such as editing or creating attachments. If the present library had been a photo library, the "activity" selector 631 and 632 could be for activities specifically directed to photos, such as forming photo albums or sharing photos with other users.

The information and control elements include information lines 640 and 641, a control line 642, a backspace control 643, and information lines 644 and 645. The information lines 640 and 641 provide information as to the current navigation of the virtual folders or items. In the present example, the information line 640 indicates that the current navigation is to a document library, while the information line 641 indicates the more complete navigation, showing that the document library is within the storage area. The control line 642 provides a number of standard controls, and the backspace button 643 allows a user to back up through a navigation. The information line 644 provides numerical information about the contents of the present navigation. In the present example, the information line 644 indicates that there are 41 items which take up 100 MB in the stacks of the document library. The information line 645 is available to provide additional information, such as additional information about a file that is selected.

The stacks of the document library include an "ABC Corp." stack 651, a "backups stack" 652, a "business plans" stack 653, an "XYZ Corp." stack 654, and a "marketing reports" stack 655. The numbers on top of each of the stacks indicate how many items are in each stack. For example, the "ABC Corp." stack 651 is shown to include 8 items. The total number of items of the stacks adds up to the number of items indicated in the information line 644, which as described above is 41 in the present example. A selection box SB is provided which can be utilized by a user to select a desired item. The selection of the "ABC Corp." stack 651 yields a view of the items of that stack, as will be described below with respect to FIG. 11.

Figure 11:
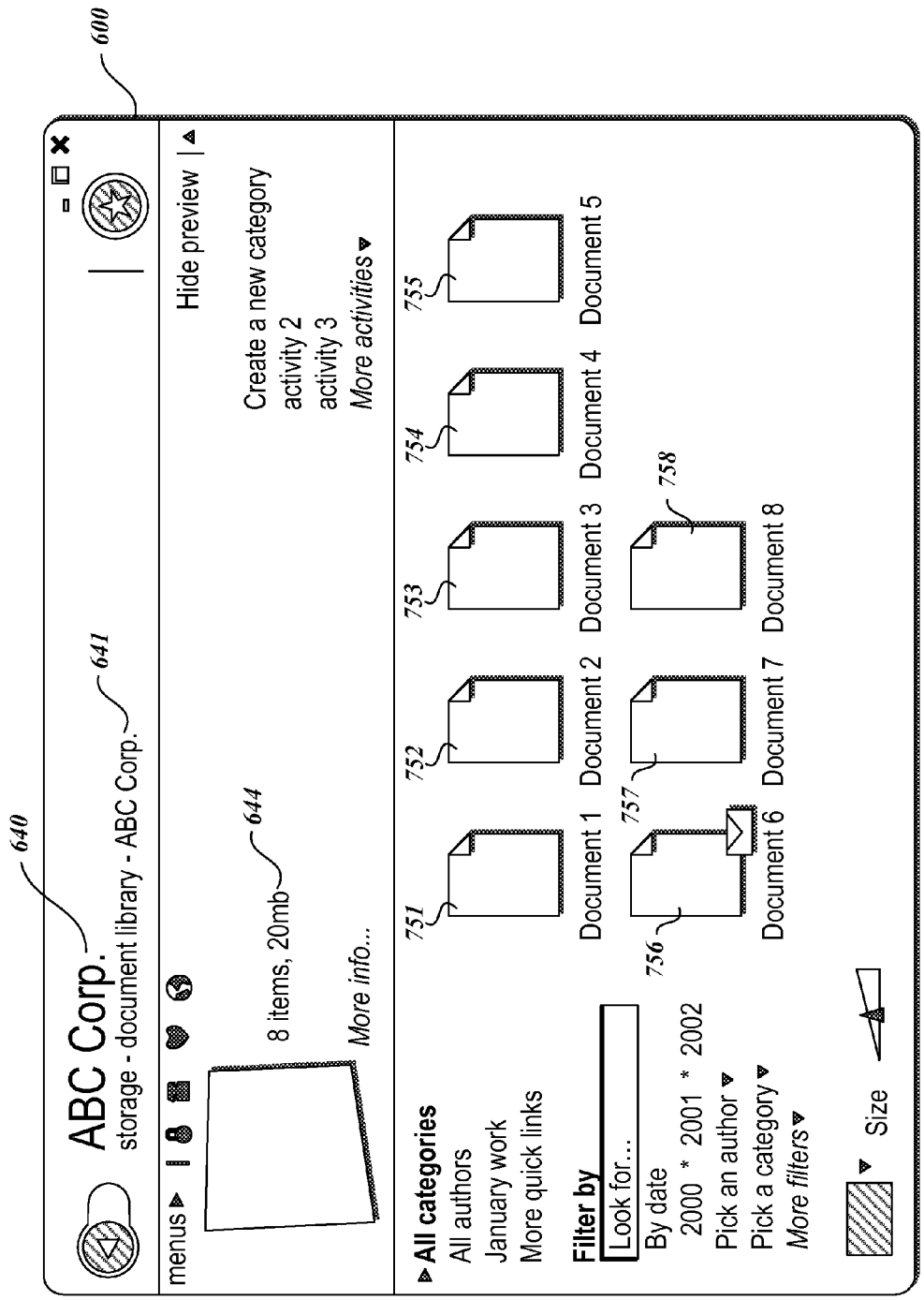
FIG. 11 is a diagram illustrative of a screen display showing the documents in the ABC Corp. stack of FIG. 10.

FIG. 11 is a diagram illustrative of a screen display showing the items in the "ABC Corp." stack 651 of FIG. 10. It should be noted that the information lines 640 and 641 now indicate that the present navigation is showing the "ABC Corp." stack. The "ABC Corp." stack 651 is shown to include 8 documents 751-758, corresponding to documents 1-8, respectively. The information line 644 correspondingly indicates that there are 8 items which take up 20 MB of memory. Documents of FIG. 11 may be further arranged into stacks within the ABC Corp. stack. In other words, within the virtual folder represented by the ABC Corp. stack 651, additional virtual folders may be organized to hold the documents, as will be described below with respect to FIGS. 12-16.

Figure 12:
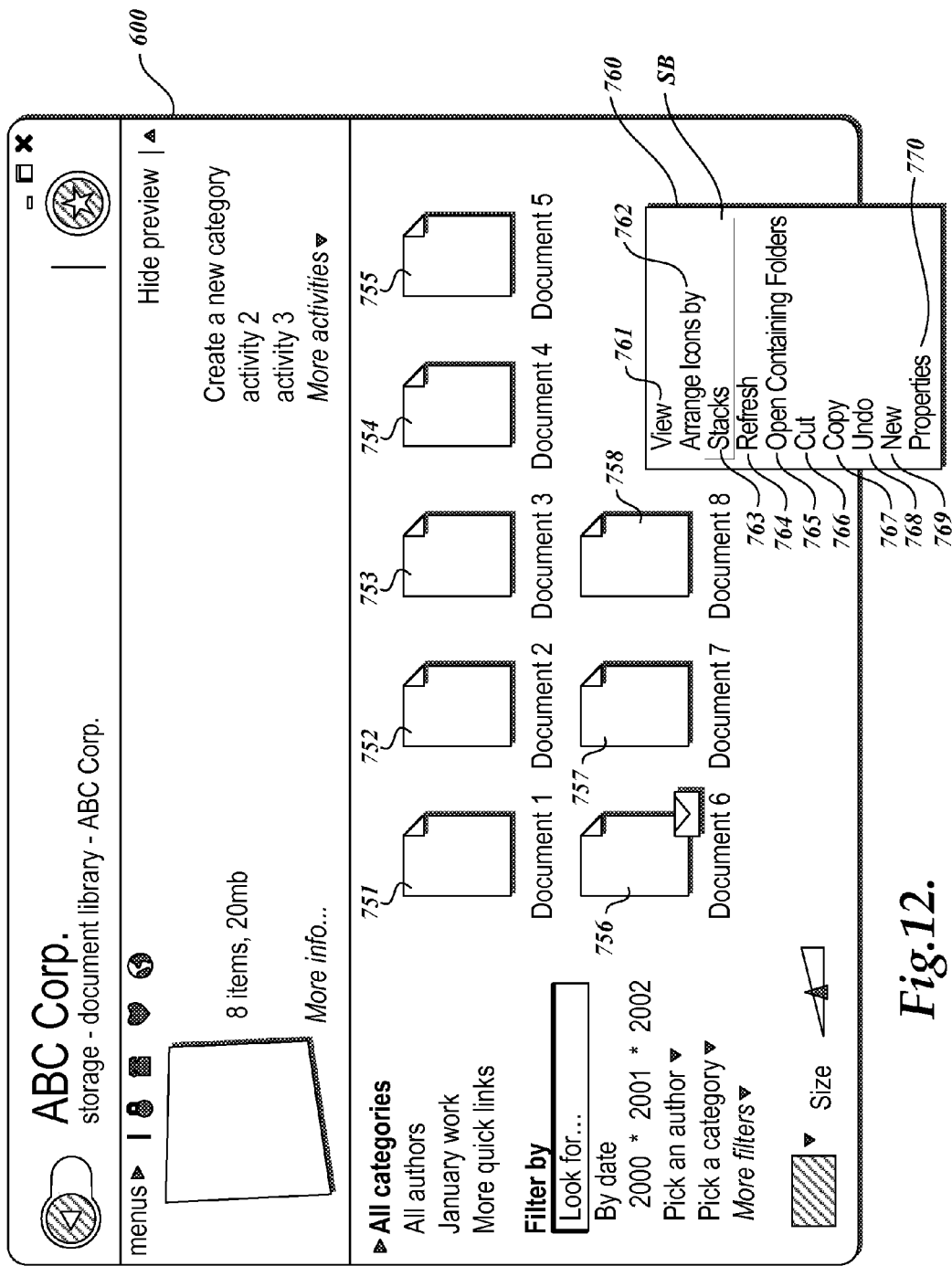
FIG. 12 is a diagram illustrative of a screen display in which a stacking function is selected for the documents of FIG. 11.

FIG. 12 is a diagram illustrative of a screen display in which a stacking function is selected for the documents of FIG. 11. As shown in FIG. 12, the user is able to pull up a function box 760. The function box 760 includes a "view" selection 761, an "arrange icons by" selection 762, a "stacks" selection 763, a "refresh" selection 764, an "open containing folders" selection 765, a "cut" selection 766, a "copy" selection 767, an "undo" selection 768, a "new" selection 769, and a "properties" selection 770. The selection box SB is shown to be around the "stacks" selection 763.

Figure 13:
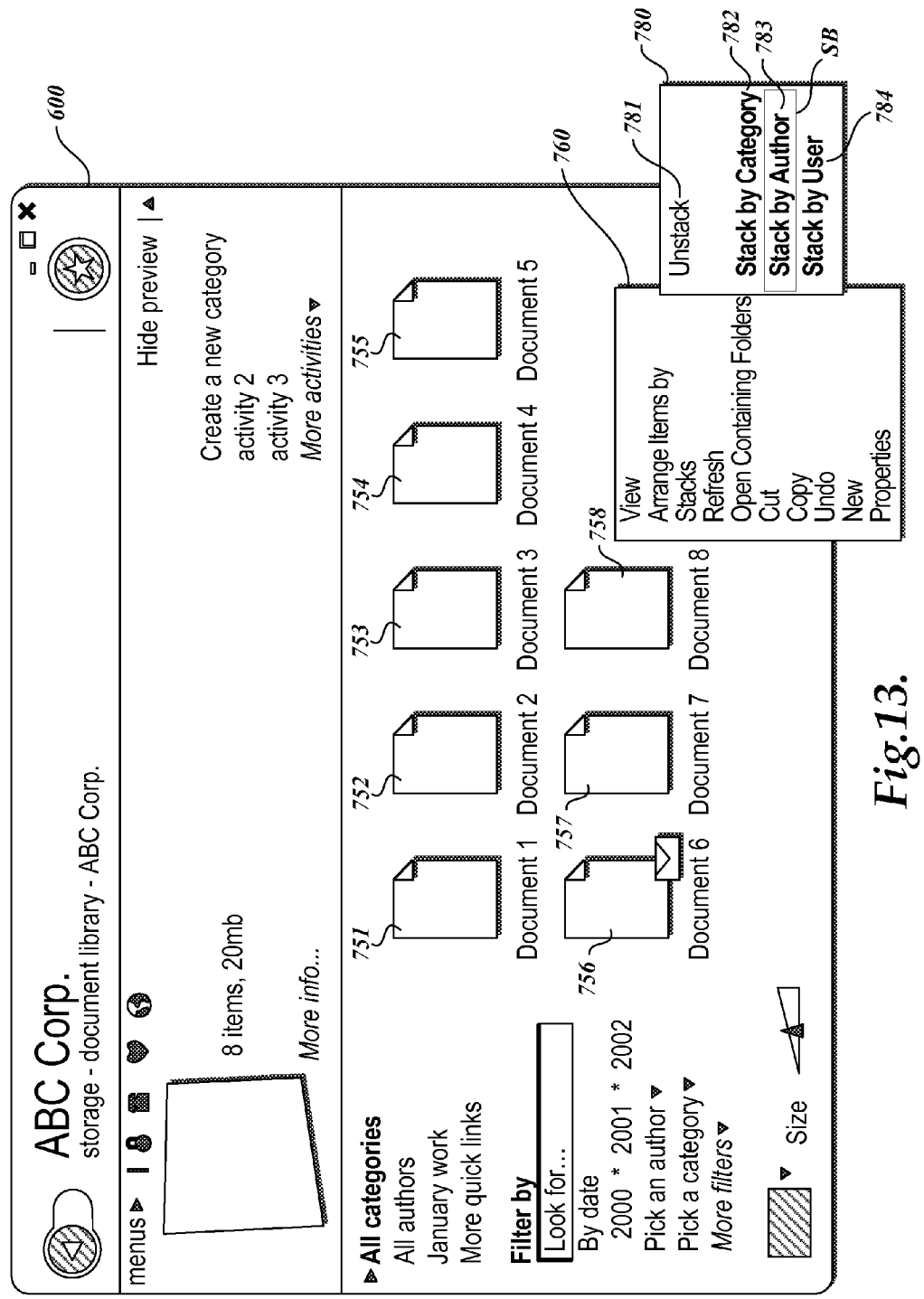
FIG. 13 is a diagram illustrative of a screen display in which a "stack by author" parameter is selected for the stacking function of FIG. 12.

FIG. 13 is a diagram illustrative of a screen display in which a "stack by author" parameter is selected for the stacking function of FIG. 12. As shown in FIG. 13, a box 780 is displayed which presents various stacking options. The stacking options include an "unstack" option 781, a "stack by category" option 782, a "stack by author" option 783, and a "stack by a user" option 784. The selection box SB is shown to be around the "stack by author" option 783.

Figure 14:
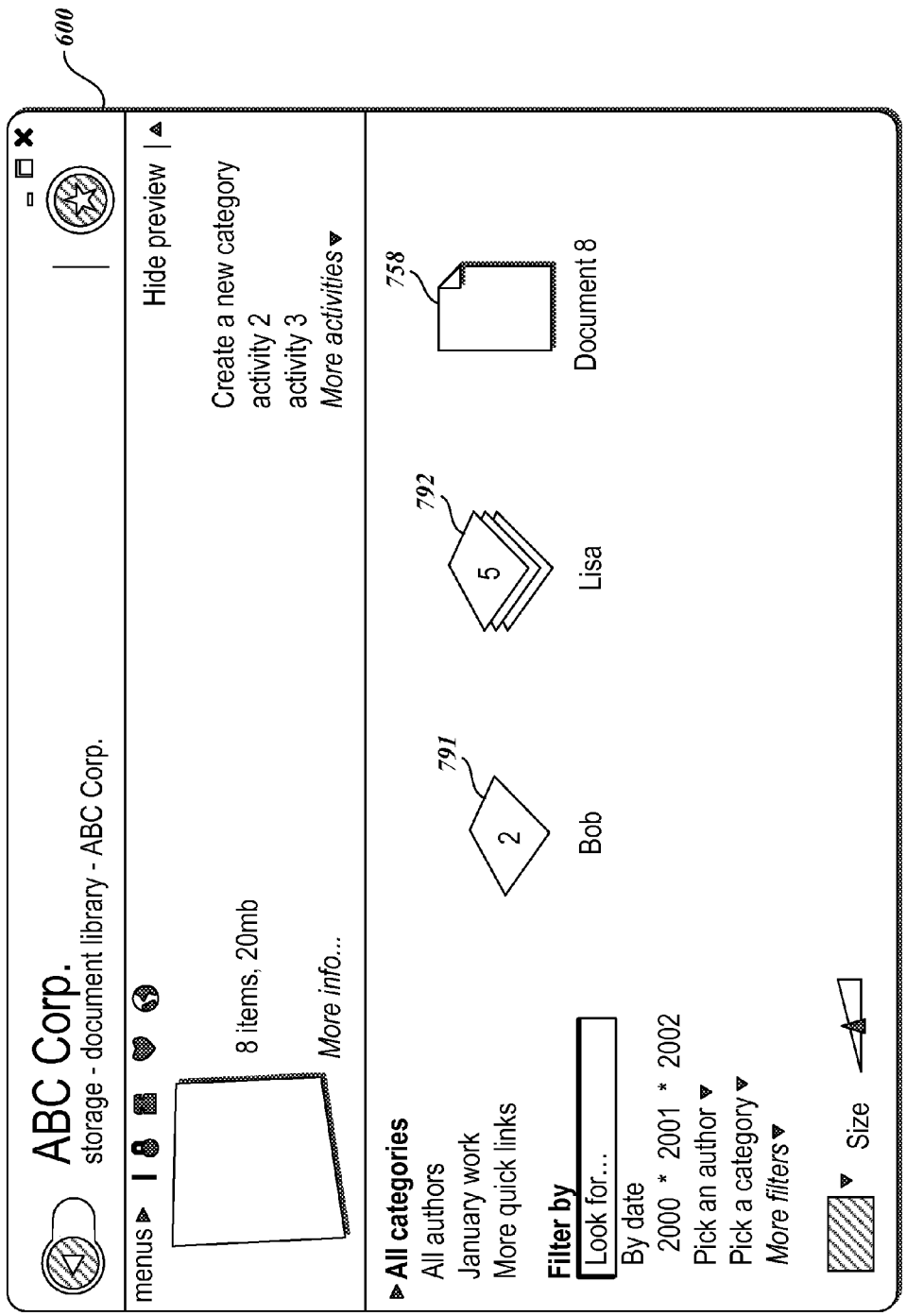
FIG. 14 is a diagram illustrative of a screen display in which the files of FIG. 13 have been stacked by author.

FIG. 14 is a diagram illustrative of a screen display in which the files of FIG. 13 have been stacked by author. As shown in FIG. 14, stacks 791 and 792 correspond to authors Bob and Lisa, respectively. As indicated by the numbers on top of each of the stacks, the Bob stack 791 includes two items, while the Lisa stack 792 includes five items. The item 758 (corresponding to document 8) did not have an author, and so is not included in an "author" stack. The stacks 791 and 792 illustrate that stacks may be organized at multiple levels, such as within the "ABC Corp." stack 651. Thus, the virtual folders may be formed at multiple levels, such as the "Lisa" stack 792 being within the "ABC Corp." stack 651 which is within the document library.

Figure 15:
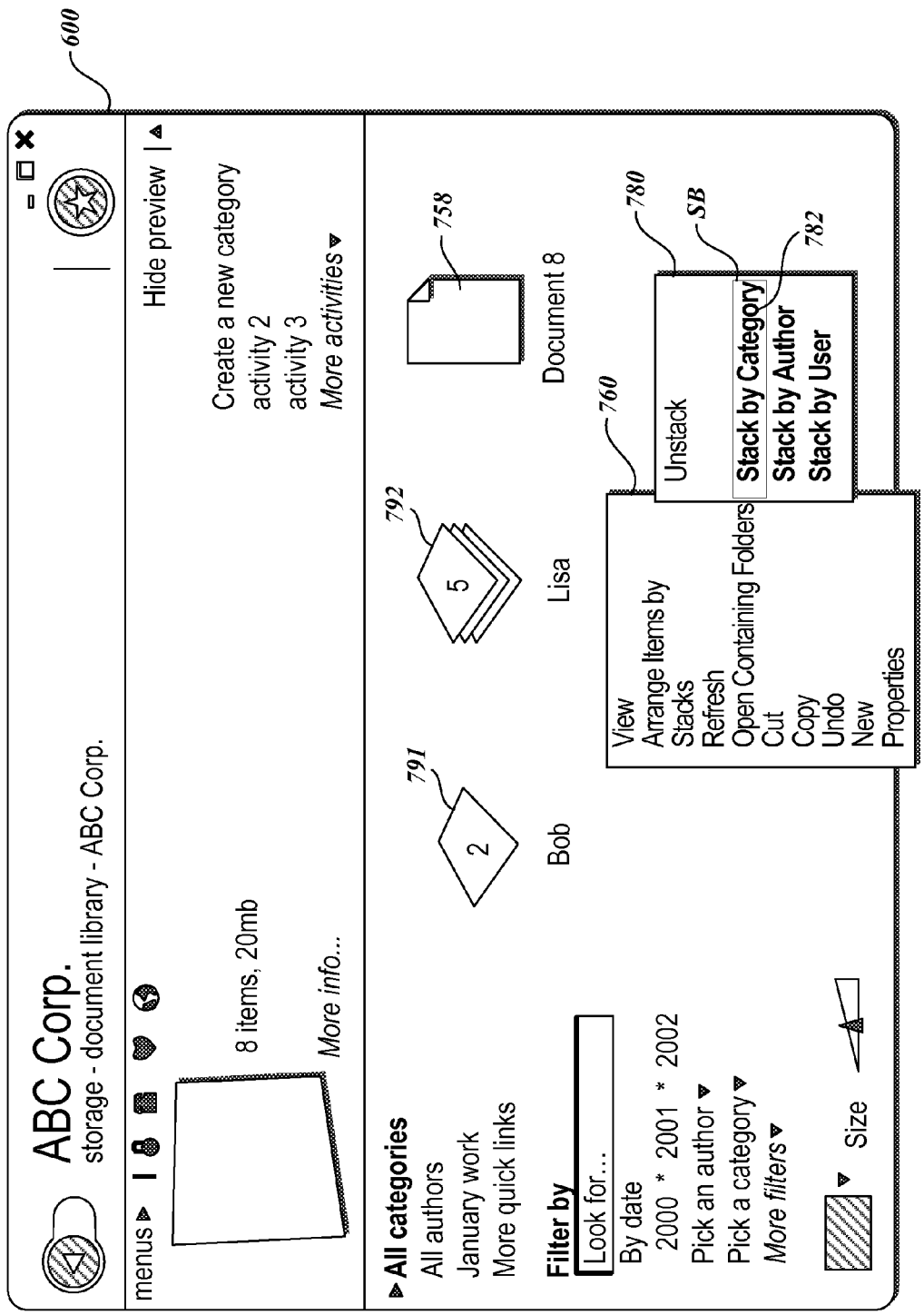
FIG. 15 is a diagram illustrative of a screen display in which a stacking function is selected and a "stack by category" option is further selected for restacking the files of FIG. 14.

FIG. 15 is a diagram illustrative of a screen display in which a "stack by category" option is further selected for restacking the files of FIG. 14. As shown in FIG. 15, the selection box SB is around the "stack by category" option 782. Since some of the items are already stacked in the stacks 791 and 792, the selection of the "stack by category" option 782 will restack the items, as will be described in more detail below with reference to FIG. 16.

Figure 16:
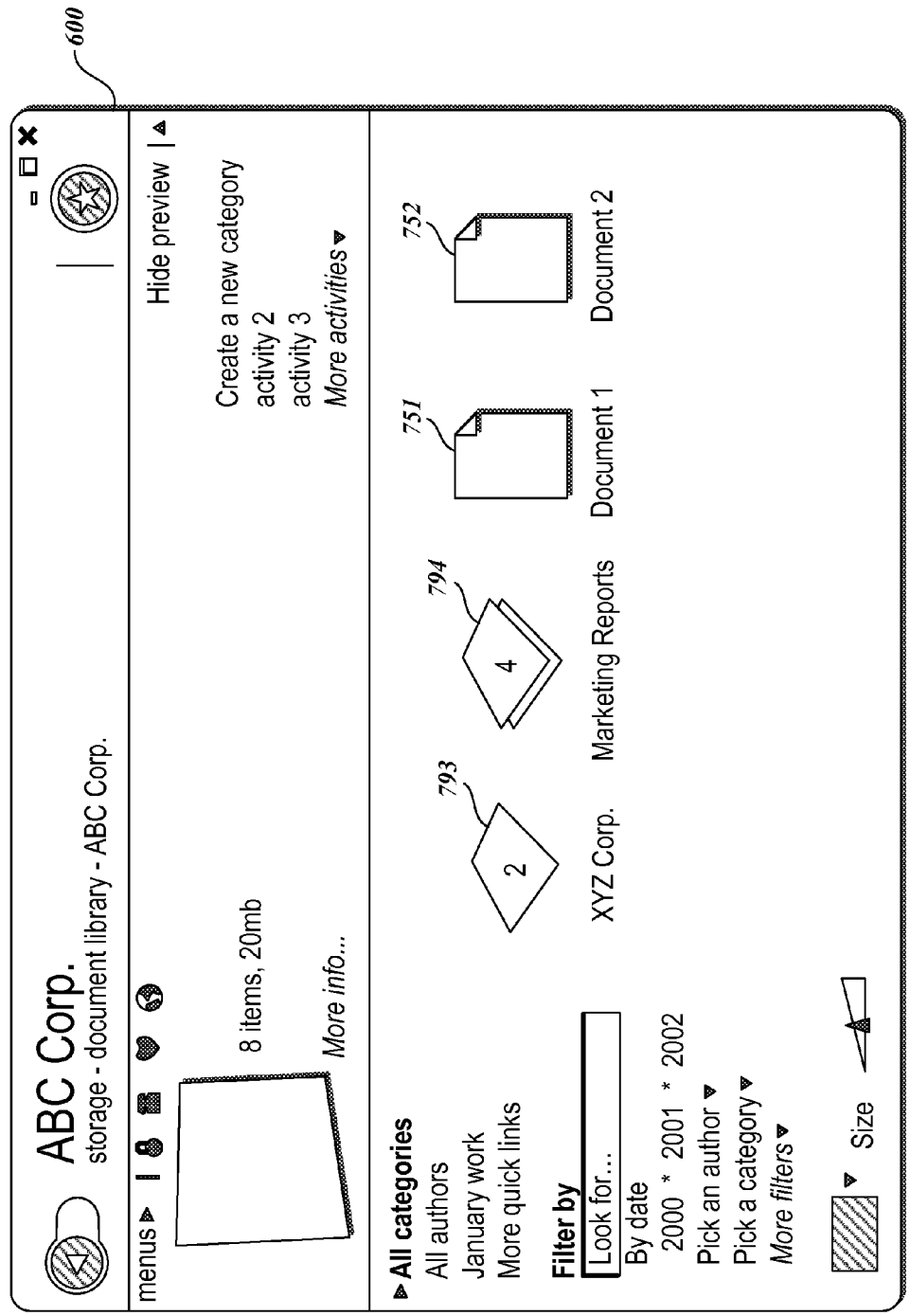
FIG. 16 is a diagram illustrative of a screen display in which the files of FIG. 14 have been restacked by category.

FIG. 16 is a diagram illustrative of a screen display in which the files of FIG. 14 are restacked by category. As shown in FIG. 16, the stacks 793 and 794 correspond to the "XYZ Corp." and "marketing reports" categories, respectively. The items 751 and 752, corresponding to documents 1 and 2, were not designated for any additional categories, and thus did not fall into any of the other category stacks.

Figure 17:
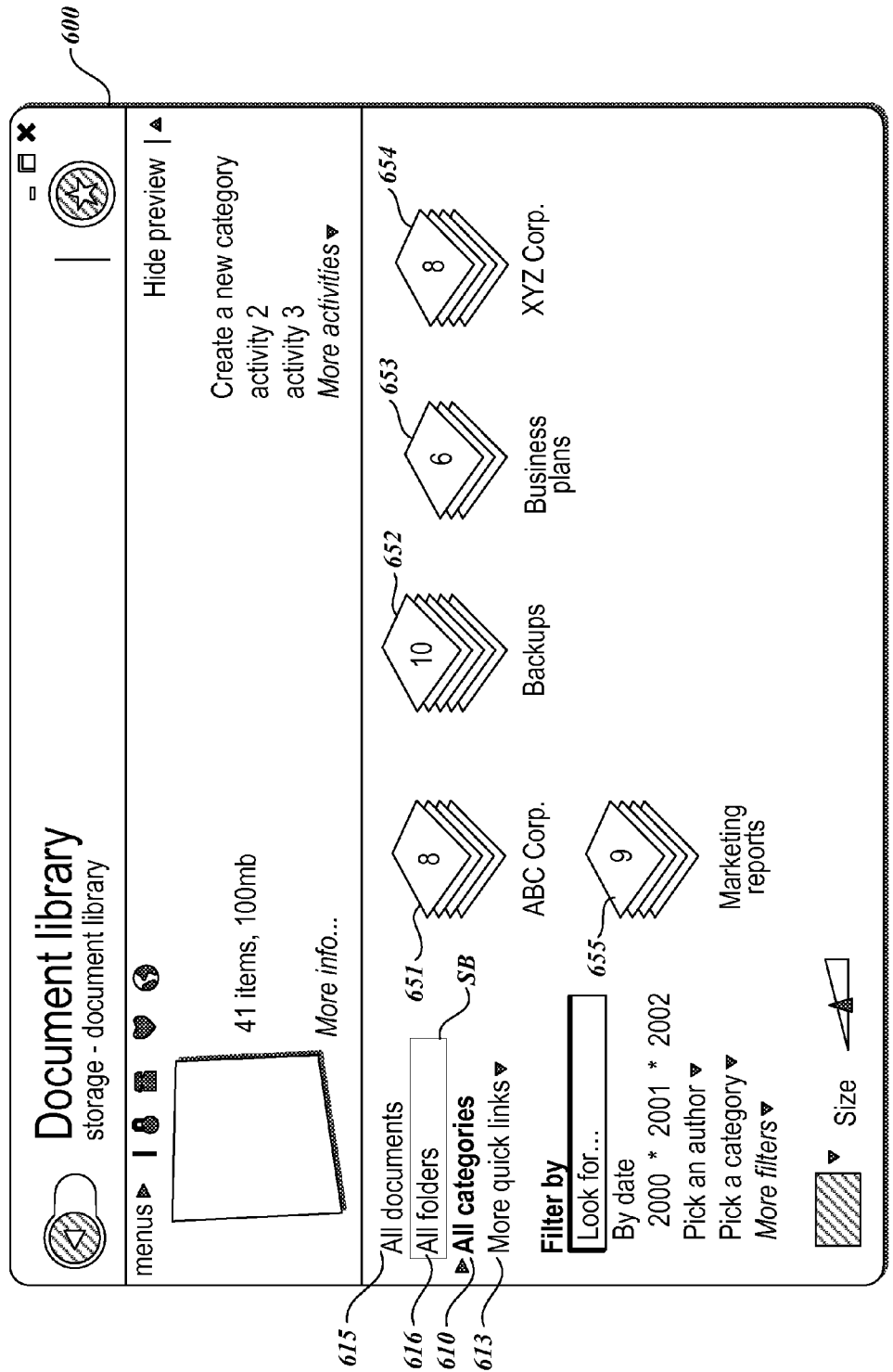
FIG. 17 is a diagram illustrative of a screen display in which a quick link for showing physical folders is selected.

FIG. 17 is a diagram illustrative of a screen display in which a quick link for physical folders is selected. The selection box SB is shown to be around the "all folders" quick link 616. As will be described in more detail below with respect to FIG. 18, the "all folders" quick link 616 provides for switching to a view of physical folders.

Figure 18:
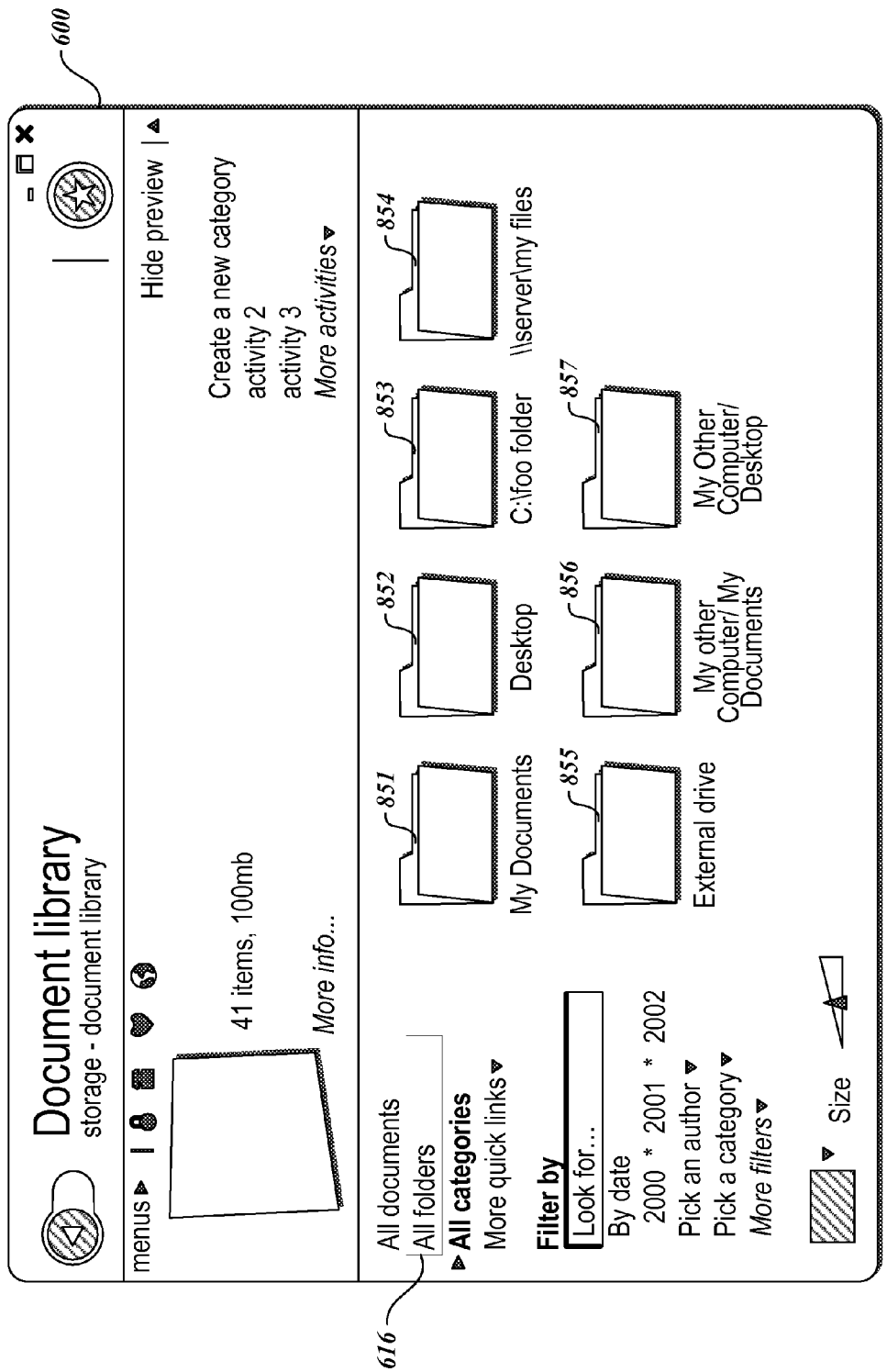
FIG. 18 is a diagram illustrative of a screen display in which the physical folders are shown which contain the files of the virtual folder stacks of FIG. 17.

FIG. 18 is a diagram illustrative of a screen display showing physical folders. The physical folders that are shown contain the files of the virtual folder stacks of FIG. 17. In other words, the items contained within the stacks 651-655 of FIG. 17 are also contained in certain physical folders in the system. These are shown in FIG. 18 as a "My Documents" folder 851 that is located on the present computer, a "Desktop" folder 852 that is located on the present computer, a "Foo" folder 853 that is located on the hard drive C:, a "My Files" folder 854 that is located on a server, an "External Drive" folder 855 that is located on an external drive, a "My Documents" folder 856 that is located on another computer, and a "Desktop" folder 857 that is located on another computer.

As shown in FIG. 18, a user is able to switch from the virtual files representation of FIG. 17 to the physical file representation of FIG. 18. This allows a user to toggle between virtual file representations and physical file representations, depending on which is desired for a current task. The different locations of the physical folders 851-857 also illustrate that the scope of the virtual file system may be relatively broad, as will be described in more detail below.

FIG. 19 is a flow diagram illustrative of a routine 880 by which a user can directly manipulate virtual folders. As will be described in more detail below, the mechanisms that are provided for manipulating the virtual folders are similar to those that are currently used for manipulating regular folders (e.g., clicking and dragging, copying, pasting, etc.). As shown in FIG. 19, at a block 882, the system provides defined actions that the user can perform for direct manipulation of the virtual folders that are represented as display objects. At a block 884, the user performs a defined action. As noted above, one example of this might be a user clicking and dragging a virtual folder to copy its contents to another virtual folder. At a block 886, the virtual folder and/or contents are manipulated as directed by the action performed by the user.

FIG. 20 is a diagram illustrative of a screen display in which a new West Coast stack 656 has been added to the stacks of FIG. 10. The West Coast stack 656 was formed by a user creating a new category of "West Coast." Upon its initial creation, the new West Coast stack 656 would be empty and have zero items. In the embodiment of FIG. 20, two items have been added to the West Coast stack 656. One method for adding items to a stack is to select a particular item, and either modify or add additional categories to the category metadata for the item, such as adding the category "West Coast" to two items as was done in the embodiment of FIG. 20. This process illustrates that the category data is a metadata property for an item that is a type of ad-hoc property. In other words, a property of this type does not have any implicit meaning, and can be assigned an arbitrary value by the user. For example, the category "property" can have any value whereas the "author" property should be the name of a person. As will be described in more detail below with reference to FIG. 21, items may also be clicked and dragged to be copied from other stacks to the West Coast stack 656 (in which case the categories of the items are automatically updated to include "West Coast"). In this regard, FIG. 20 shows that the selection box SB is around the ABC Corp. stack 651, in preparation for its contents being copied.

FIG. 21 is a diagram illustrative of a screen display in which direct manipulation is used for copying the files from the ABC Corp. stack 651 to the West Coast stack 656. In other words, as shown in FIG. 20, the user selected the ABC Corp. stack 651, and then as shown in FIG. 21 the user has clicked and dragged the stack to be copied to the West Coast stack 656. Thus, the West Coast stack 656 which had two items in FIG. 20, is now shown to include a total of ten items, including the additional eight items from the ABC Corp. stack 651. When the items from the ABC Corp. stack 651 were copied to the West Coast stack 656, this was accomplished by modifying the category descriptions of the eight items to also include the "West Coast" category in addition to including the original "ABC Corp." category. This illustrates one type of direct manipulation that may be performed.

Another example of direct manipulation is right clicking an item and selecting delete. In one embodiment, when a deleting function is selected by a user, the user is queried whether the item should be deleted all together, or simply removed from the present virtual folder. If the item is just to be removed from a present virtual folder category stack as noted above, this can be accomplished by removing the desired category from the metadata for the item. In other words, if one of the items that had been copied from the ABC Corp. stack 651 to the West Coast stack 656 was then to be removed from the West Coast stack 656, this could be accomplished by modifying the category data for the particular file to no longer include the "West Coast" category.

Figure 22:
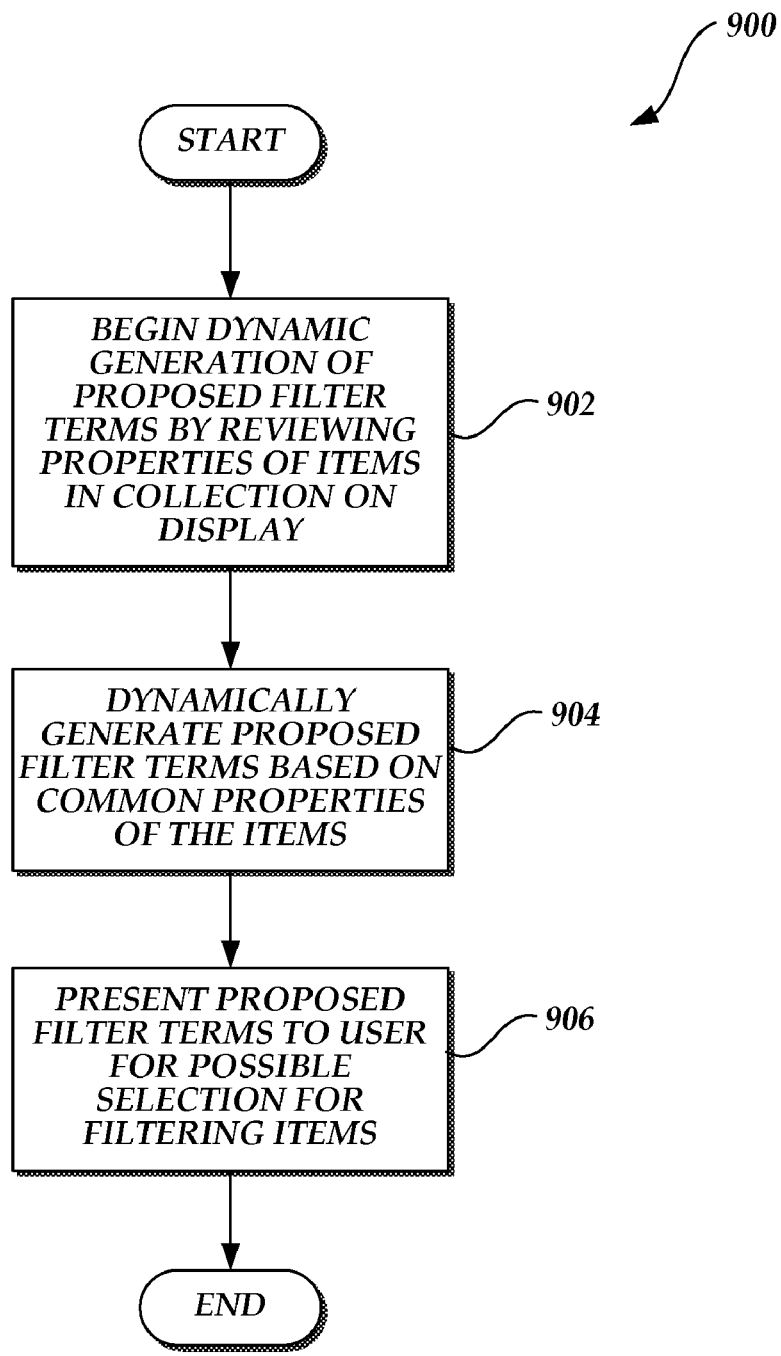
FIG. 22 is a flow diagram illustrative of a routine for the system dynamically generating new filter terms.

FIG. 22 is a flow diagram illustrative of a routine 900 for the system dynamically generating new filter terms. Filter terms are utilized for manipulating the virtual folders. The filtering terms are essentially utilized as a set of tools for narrowing down a set of items. In one embodiment, filters consist of metadata categories and their values (presented to the user in the user interface as clickable links or drop-down menus). The user clicks on a filter term in order to filter down the current results set of items on the display.

FIG. 22 illustrates how filters may be dynamically generated. As shown in FIG. 22, at a block 902, the properties (from the metadata) of the items in a collection on the present display are reviewed. In a block 904, proposed filter terms are dynamically generated based on common properties of the items. At a block 906, the proposed filter terms are presented to the user for possible selection for filtering items. As an example of this process, the system may review the properties of a set of items, and if the items generally have "Authors" as a property, the filter can provide a list of the authors to filter by. Then, by clicking on a particular Author, the items that don't have that Author are removed from the set on the display. This filtering process provides the user with a mechanism for narrowing the set of items on the display.

Figure 23:
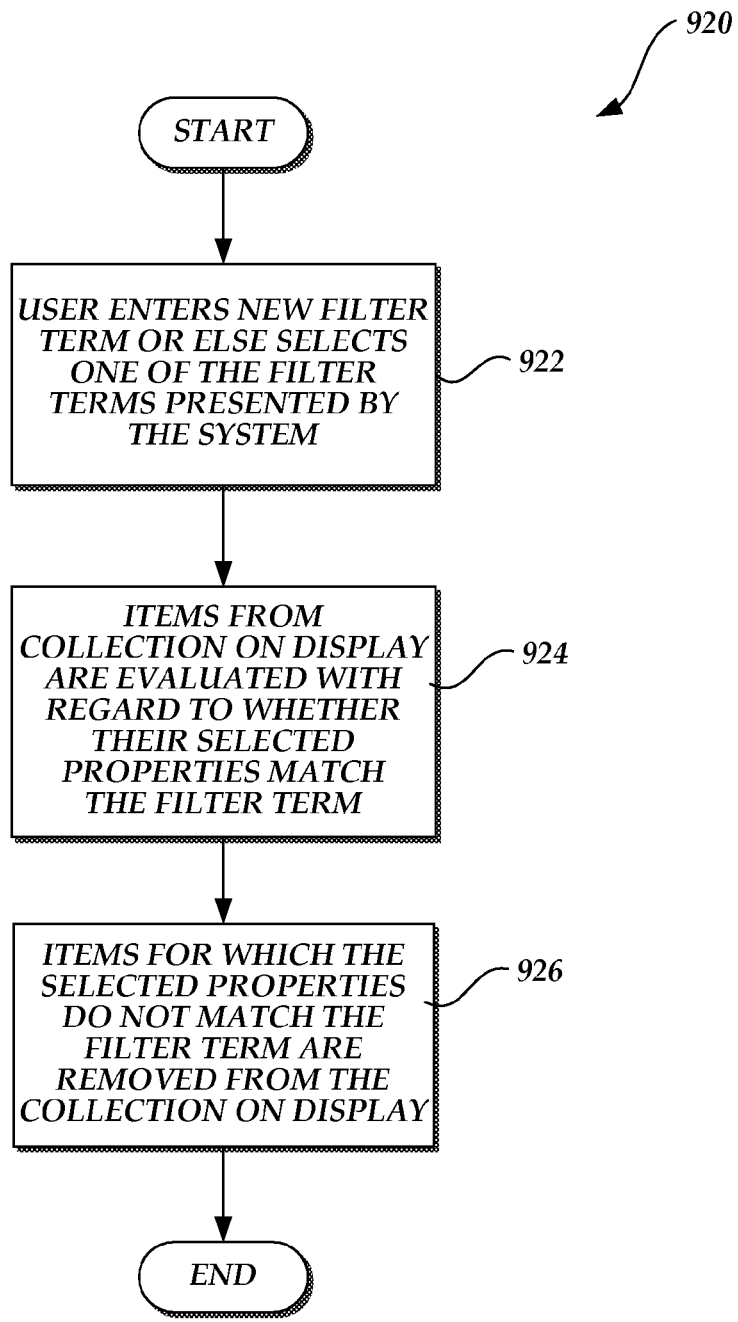
FIG. 23 is a flow diagram illustrative of a routine for the system filtering items based on the selection of a filter term.

FIG. 23 is a flow diagram illustrative of a routine 920 for the system filtering items based on the selection of a filter term. At a block 922, the user either enters a new filter term or else selects one of the filter terms that have been presented by the system. As noted above, the filter terms may be dynamically generated by the system, or they may be preset. At a block 924, the items from the collection on the display are evaluated with regard to whether their selected properties match the filter term. For example, if the filter term is for items that were authored by "Bob," then the items are evaluated in accordance with whether their author property includes "Bob". At block 926, the items for which the selected properties do not match the filter term are removed from the collection on the display.

FIGS. 24-29 generally illustrate how the filtering process appears on the screen display. As will be described below with reference to FIGS. 24-29, in one embodiment, the filtering may generally operate according to the following process. After the user clicks on a filter value, the items outside the filter range are animated off the screen. The animation is generally designed to make it obvious that items are being removed and that no new items are being added. The back button 643 may be selected by a user so as to undo the filter operations. In one embodiment, a navigation stack is created which contains the sequential filter actions, which is utilized to undo each of the filter actions when the back button 643 is selected. Each time a filter value is selected, the information areas 640 and 641 are updated to indicate the current filter value. In one embodiment, after a filter value is selected, a user is provided an option for saving a new quick link to the current filter navigation, as will be described in more detail below with respect to FIG. 30. As filter values are selected, the filter controls may be updated to be appropriate for the items remaining in the view.

Figure 24:
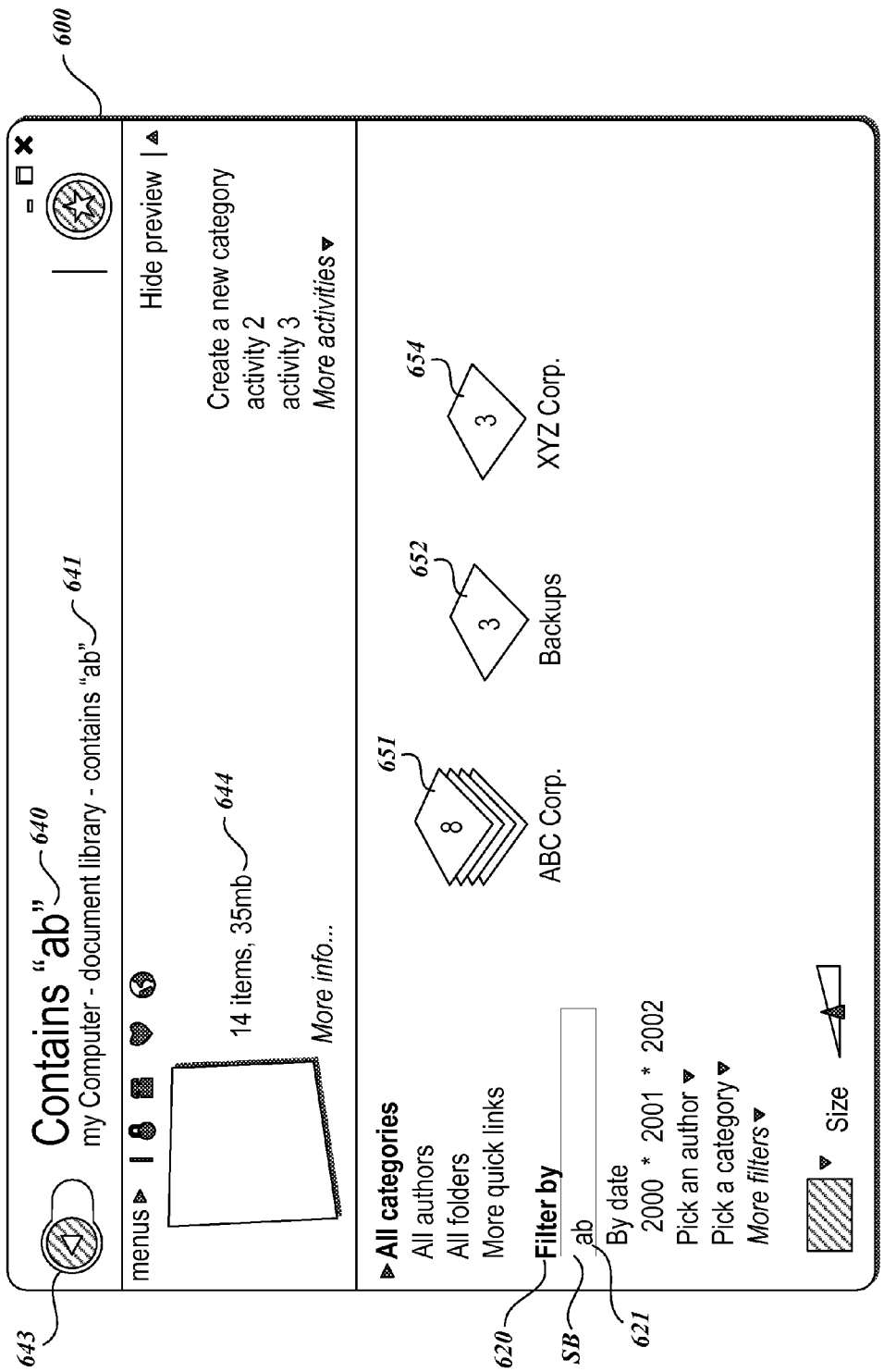
FIG. 24 is a diagram illustrative of a screen display in which the stacks of FIG. 10 have been filtered by the term "AB"

FIG. 24 is a diagram illustrative of a screen display in which the stacks of FIG. 10 have been filtered by the term "AB". As shown, in the filter area 621, the term "AB" has been typed by a user. The information lines 640 and 641 indicate that the items in the display are now those that have been filtered by the term "AB". As shown, the ABC Corp. stack 651 still contains eight items, while the Backups stack 652 now contains three items, and the XYZ Corp. stack 654 also contains three items. The information line 644 thus indicates that there are a total of 14 items, taking up a total of 35 MB of memory.

Figure 25:
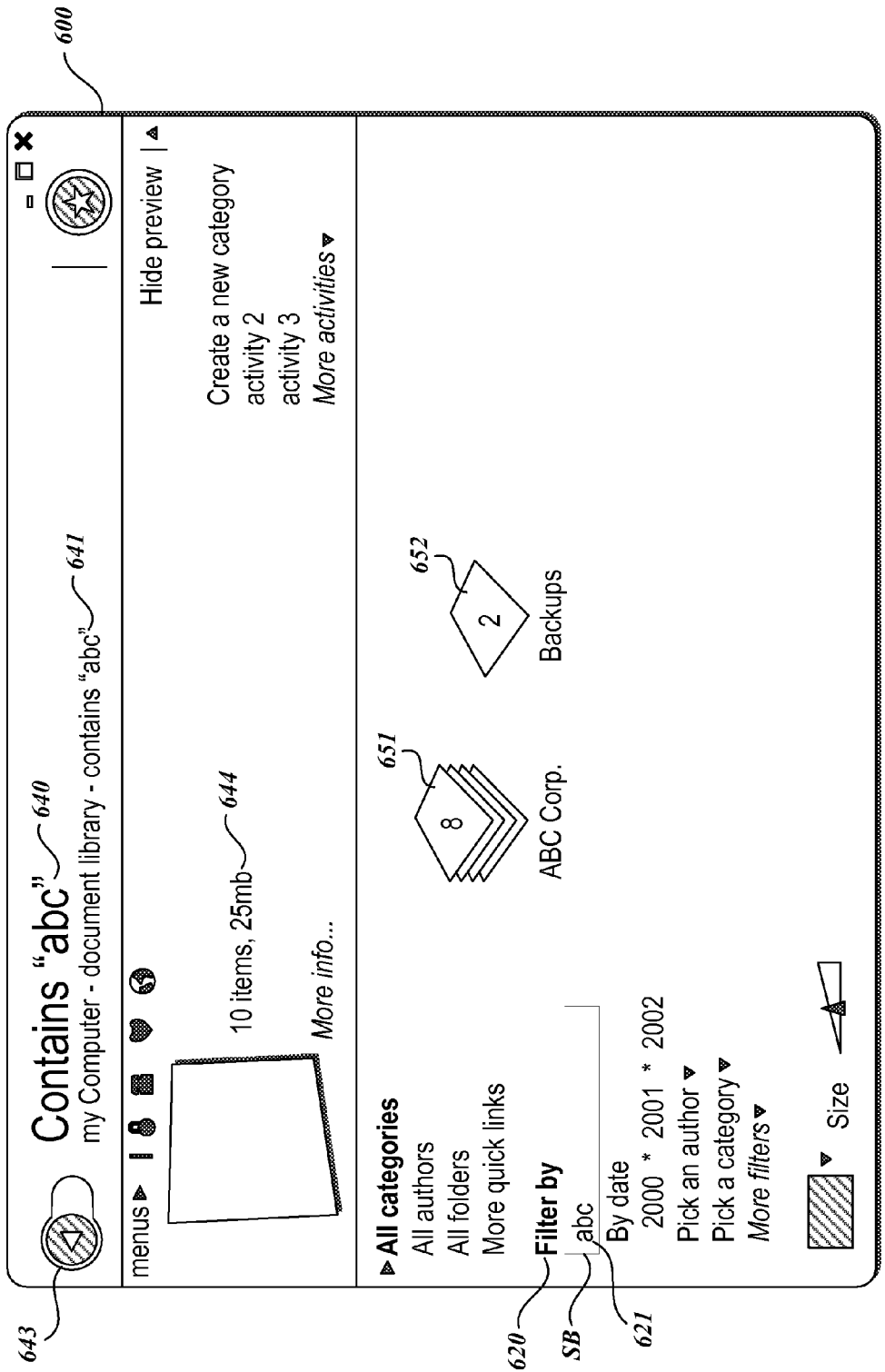
FIG. 25 is a diagram illustrative of a screen display in which the stacks of FIG. 10 have been filtered by the term "ABC"

FIG. 25 is a diagram illustrative of a screen display in which the stacks of FIG. 10 have been filtered by the term "ABC". With regard to the filter term "AB" of FIG. 24, the user has simply typed the additional letter "C" to make the total filter term "ABC". As shown in FIG. 25, the information lines 640 and 641 now indicate that the items on the display are those that contain the term "ABC". The ABC Corp. stack 651 is still shown to contain eight items, while the Backups stack 652 now contains only two items. The XYZ Corp. stack 654 has disappeared because none of its contents matched the "ABC" filter. The information line 644 now indicates that there are a total of 10 items in the stacks on the display, which take up a total of 25 MB of memory. FIGS. 24 and 25 thus provide examples of how a user may enter new filter terms, and how those filter terms are then used to filter the items that are shown on the display.

The back button 643 may be utilized by a user to back through the filtering process. As described above with respect to FIG. 10, the back button 643 allows a user to back up through a navigation. With regard to the examples of FIGS. 24 and 25, after filtering by the term "ABC" in FIG. 25, a user could select the back button 643 so as to back up one step of the filtering process, which would return to the state of FIG. 24. Alternatively, in another embodiment, the back button 643 may clear out the entire filter term, and may thus return to the state before that filtering occurred. In this case, by pressing the back button 643 in FIG. 25, a user would return to the state of FIG. 10.

In one embodiment, in addition to the back button, an additional means is provided for a user to back up in or otherwise modify the filtering navigation. This additional means involves allowing the user to directly access and modify the information line 641, which correspondingly changes the filter navigation. In other words, by directly accessing and modifying the information line 641, the user can remove one or more of the applied filters, or modify the values for any of the applied filters. This feature is described in greater detail in U.S. patent application Ser. No. 10/420, 040, filed Apr. 17, 2003, which is commonly assigned and hereby incorporated by reference in its entirety.

A timer may also be utilized in conjunction with a user typing in filter terms such as those shown in FIG. 24 and 25. The timer is used to monitor for a pause in the typing by the user. After a selected interval of no typing, the filter is applied. For example, in the state of FIG. 24, a user has typed the filter term "AB", with no significant time lag between the "A" and the "B." After typing the term "AB", the user pauses, thus producing the state shown in FIG. 24, where the filter term "AB" is applied. Sometime later, the user adds the letter "C" to complete the filter term "ABC", and then pauses again, at which point the filter term "ABC" is applied as illustrated in FIG. 25.

In one embodiment, after a user has typed a filter term in the filter area 621, and then chooses another filter or navigation, the navigation state is updated, and the filter term in the filter area 621 is made to be empty again. In addition, as will be described in more detail below with reference to FIGS. 26-29, other filter controls may be updated based on the selection of certain filter terms.

Figure 26:
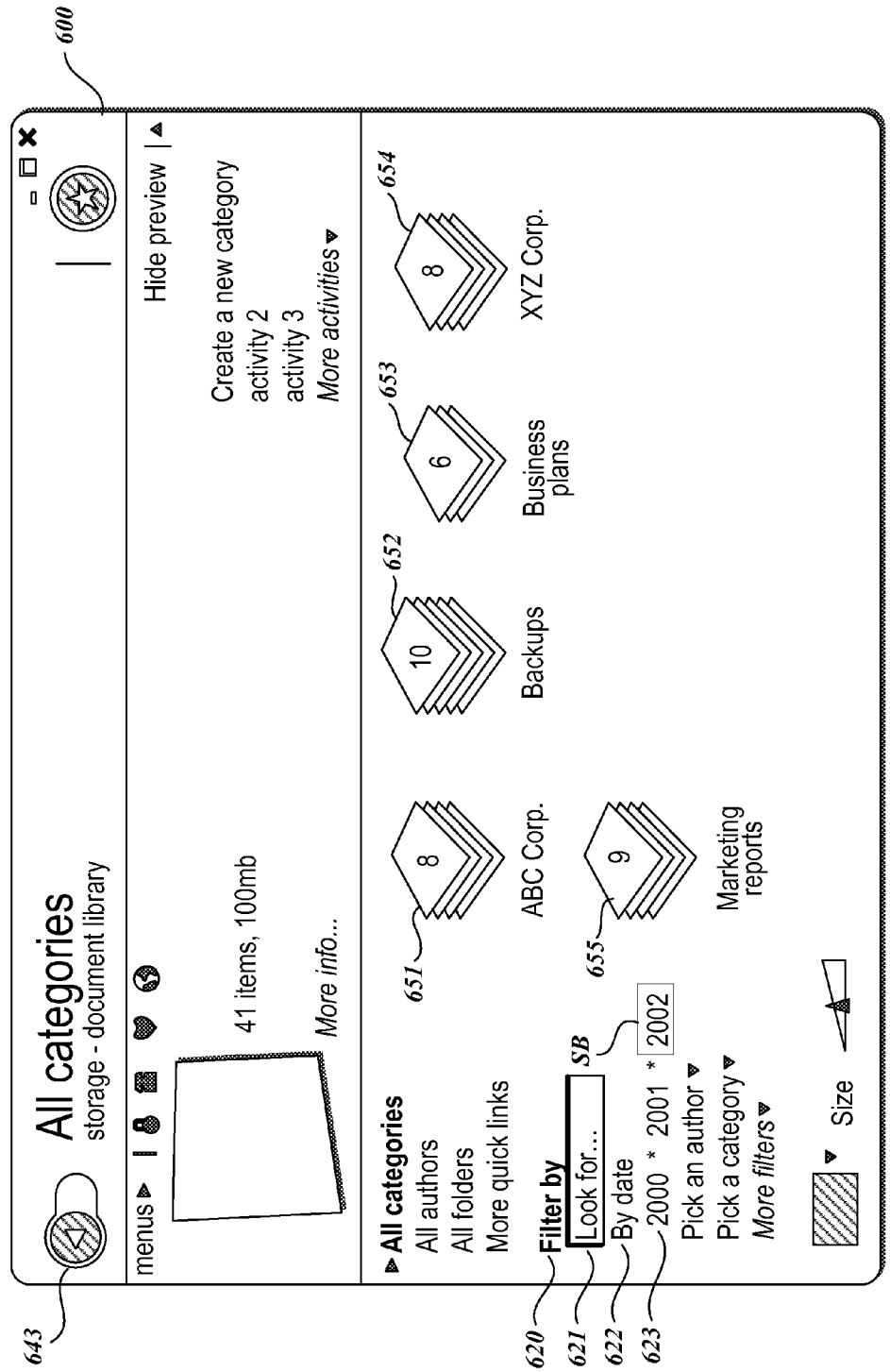
FIG. 26 is a diagram illustrative of a screen display in which the filter term "year 2002" is selected for the stacks of FIG. 10.

FIG. 26 is a diagram illustrative of a screen display in which the system provided filter term "year 2002" is selected. As noted above, under the by date indicator 622, the year selections 623 include the years 2000, 2001, or 2002. The selection box SB is shown to be around the year 2002, indicating that the user is selecting that as the desired filter term.

Figure 27:
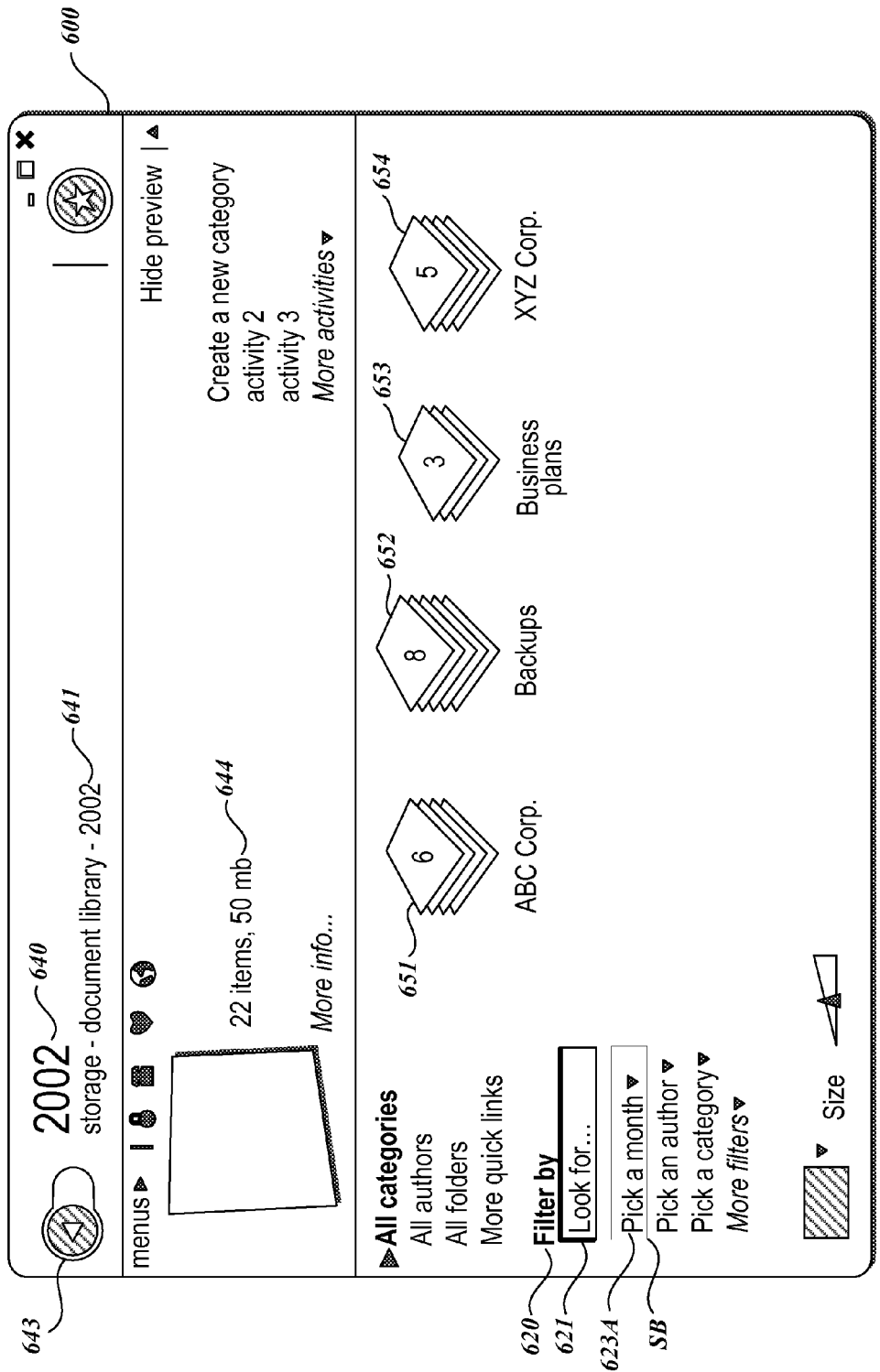
FIG. 27 is a diagram illustrative of a screen display in which the stacks of FIG. 10 have been filtered by the "year 2002" and the further selection of the filter term "month"

FIG. 27 is a diagram illustrative of a screen display in which the filter term "2002" has been applied. Also shown is the further selection of the "pick a month" selector 623A. As shown in FIG. 27, after applying the filter term "2002", the number of items in the stacks have been reduced. More specifically, the ABC Corp. stack 651 now contains six items, the Backups stack 652 now contains eight items, the Business Plans stack 653 now contains three items, and the XYZ Corp. stack 654 now contains five items. The information line 644 now indicates a total of 22 items, taking up a total of 50 MB of memory. The information lines 640 and 641 now indicate that the items shown on the display are those that have been filtered to contain the filter term "2002".

Figure 28:
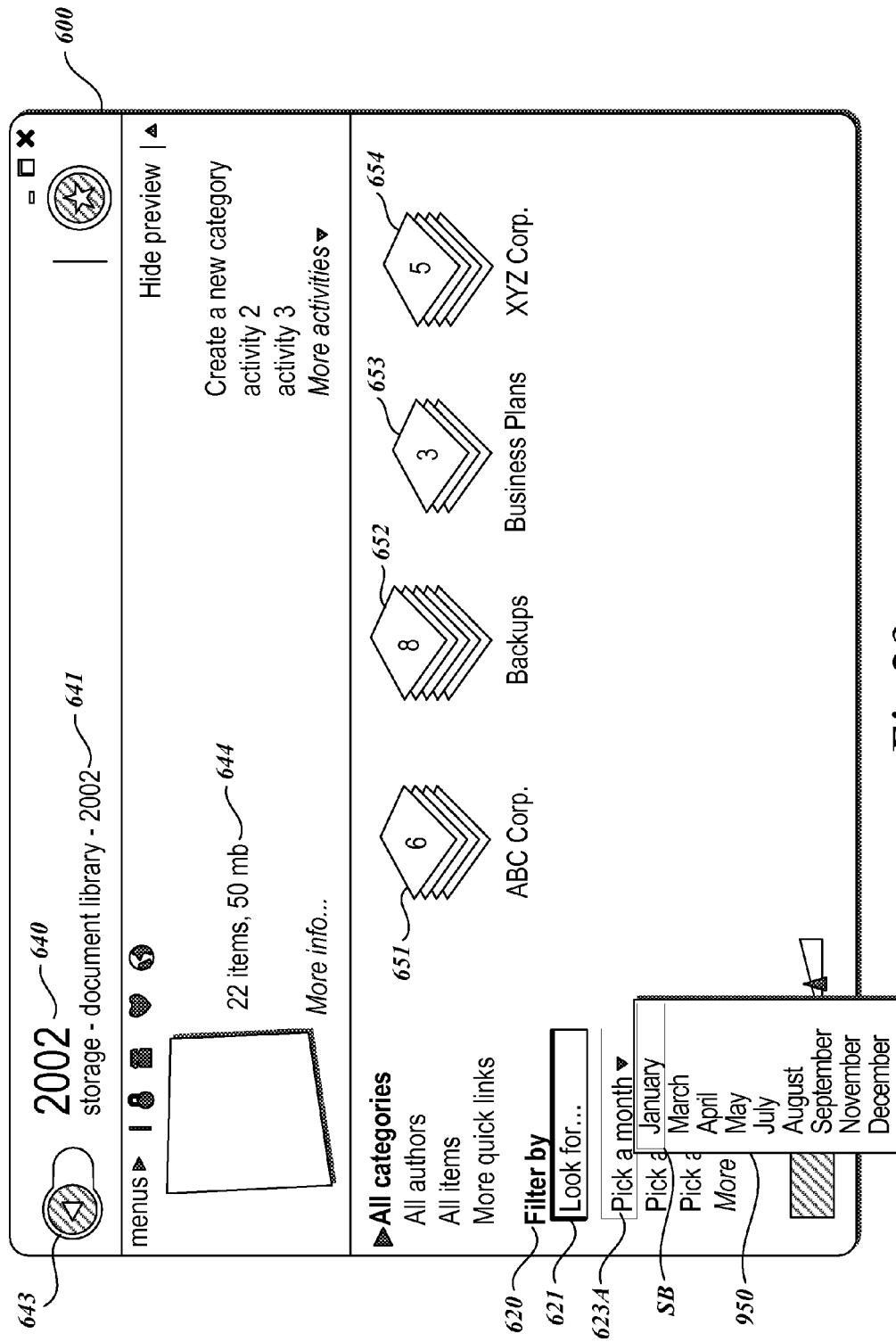
FIG. 28 is a diagram illustrative of a screen display in which a list is presented for selecting a month for filtering.

FIG. 28 is a diagram illustrative of a screen display in which a list is presented for selecting a month for filtering. A box 950 is provided which includes the list of the months. The box 950 has been provided on the display due to the user selecting the "pick a month" selector 623A. The selection box SB is shown to be around the month of January.

Figure 29:
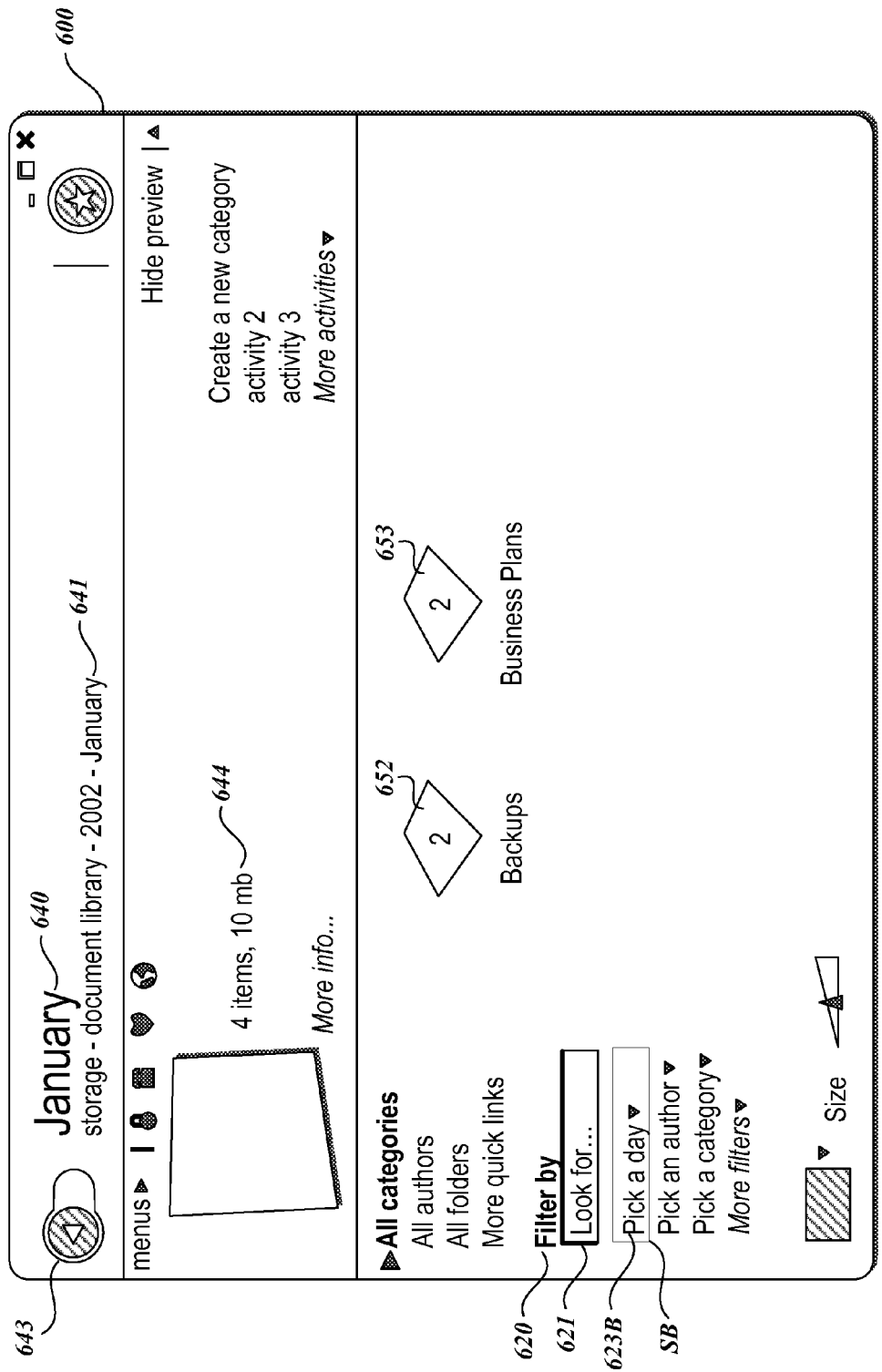
FIG. 29 is a diagram illustrative of a screen display wherein the stacks of FIG. 10 have been further filtered by the month of January, and further showing a filter term of "day"

FIG. 29 is a diagram illustrative of a screen display wherein the stacks of FIG. 28 have been further filtered by the month of January, and further showing a filter term of "day". As shown in FIG. 29, the information lines 640 and 641 now indicate that the items on the display are those that have been filtered by the term "January". The Backups stack 652 is now shown to contain two items, while the Business Plans stack 653 is also shown to contain two items. The information line 644 indicates that there are a total of four items on the display, which take up a total of 10 MB of memory. A "pick by day" selector 623B is provided, should the user wish to further filter the results to a specific day.

As described above with respect to FIGS. 24-29, filter terms may be presented by the system, or typed by a user. Once a filter term is selected, the remaining filter terms that are presented may be updated (e.g., after the year "2002" is selected in FIG. 26, in FIG. 27 the options for selecting a year are no longer presented and instead a "pick a month" option is provided). As noted above, the back button 643 may be selected by a user to back through the filtering process. For example, after the month of "January" has been selected in FIG. 29, the user may select the back button 643 to back up the filtering process to the year "2002", as illustrated in FIG. 27. The filter menu may also include a "stack by" function, which would work similarly to the stack by function described above with respect to FIGS. 15 and 16. For example, a "file type" filter could have choices for "Excel", "PowerPoint", "Word", and also "Stack by file type". Choosing the "stack by" function changes the view to show stacks for the various file types.

In general, the filters may be configured to apply to different properties of the files or items. In one embodiment, the filters may be classified according to different types, such as: alphabet index; discrete values; dates; and numerical ranges. Example properties for the alphabet index may include file name, author, artist, contact friendly name, owner, document author, document title, document subject, and description. Example properties for the discrete values may include location, file type (application name), genre, track, decade (for music), rating (for music), bit rate, protected, document category, document page count, document comments, camera model, dimensions, product name, product version, image X, image Y, and document created time. Example properties for the dates may include last accessed, last modified, created on, taken on (for pictures). An example property for the numerical range may be file size.

It will be appreciated that the filters described above with respect to FIGS. 24-29 allow users to reduce a list of items to find a particular item that is of interest. As a specific example, according to the processes described above, a user could narrow a current list of documents to only show Microsoft Word files, authored by a particular person and edited in the last week. This functionality allows a user to find a particular item in a list of many, and helps the user avoid having to manually scan each item in the list.

Figure 30:
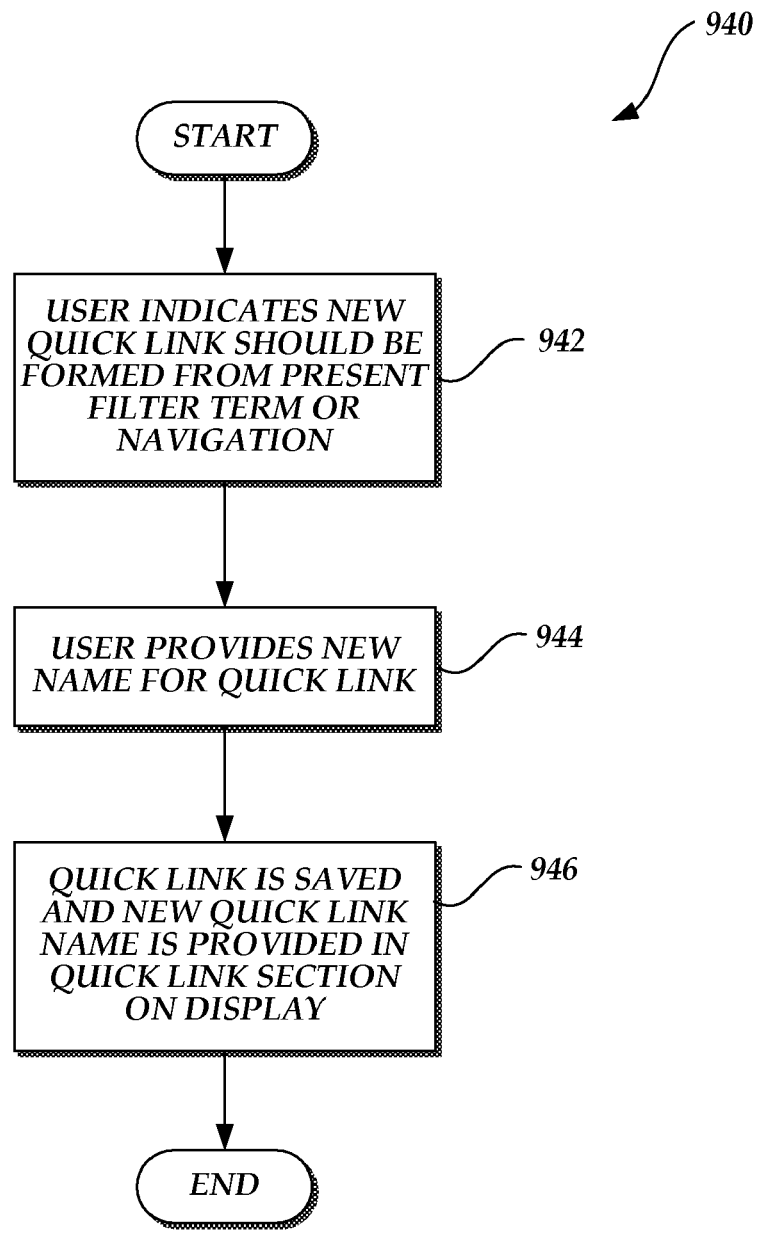
FIG. 30 is a flow diagram illustrative of a routine for creating a new quick link.

FIG. 30 is a flow diagram illustrative of a routine 940 for creating a new quick link. As will be described in more detail below, quick links are predefined links that can be clicked on by a user to create user selected views of the sets of items. In one embodiment, a quick link may be thought of as a type of pivot. Quick links provide a mechanism for retrieving a virtual folder. Clicking a quick link can take a user to a desired folder (in the same way that clicking a "favorites" may take a user to a Web site. The quick links can be predefined by the system, or can be set by a user. For example, clicking on "all authors" could return a view stacked by authors. Clicking on "all documents" may return a flat view for all of the documents for all of the storage areas. Users can also create their own quick links.

As shown in FIG. 30, at a block 942, a user makes a selection on the display to indicate that a new quick link should be formed from the present filter term or navigation. At a block 944, the user provides a new name for the new quick link. At a block 946, the new quick link is saved and the new quick link name is provided in the quick link section on the display.

Figure 31:
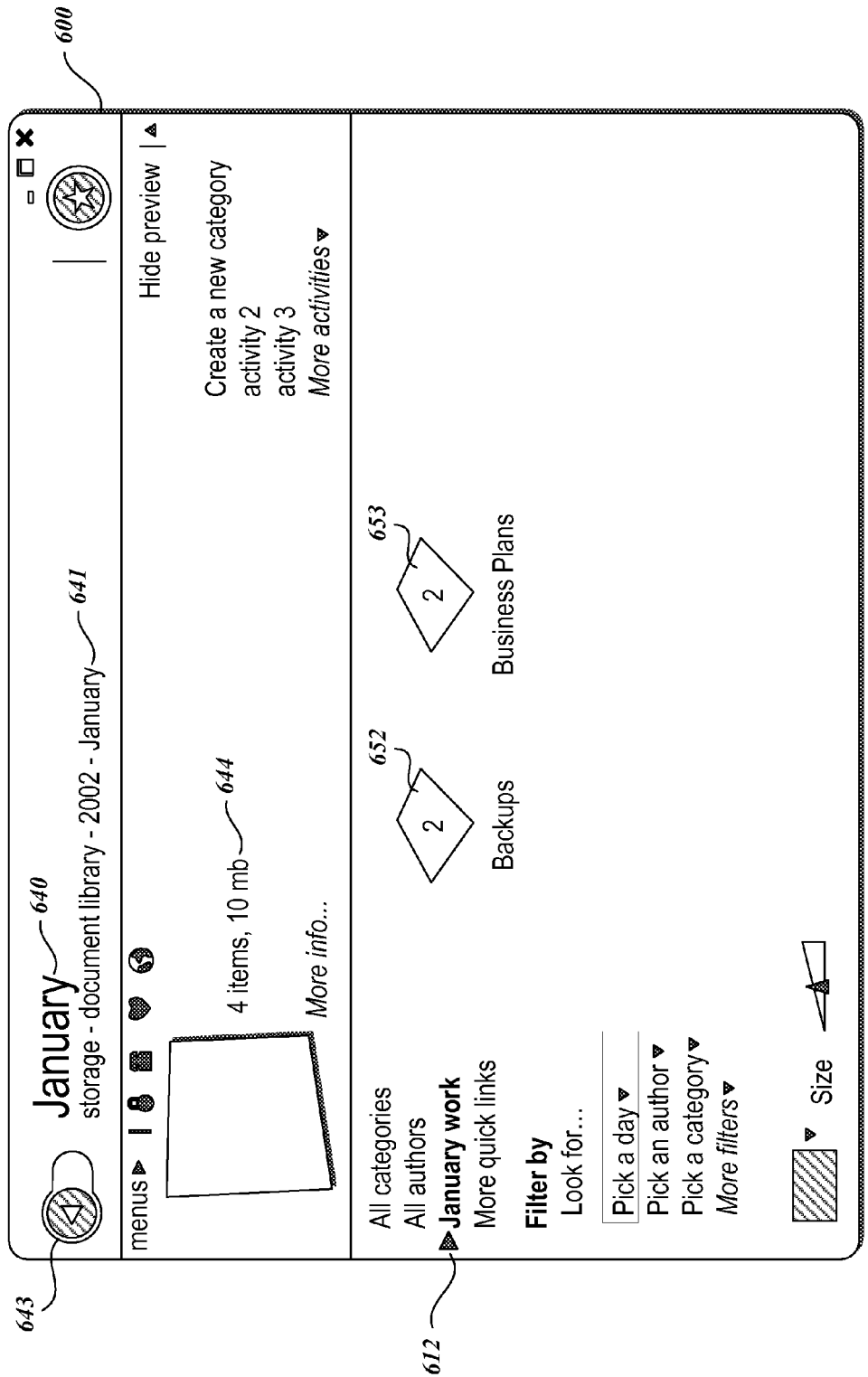
FIG. 31 is a diagram illustrative of a screen display for creating a new quick link called "January Work" based on the filtering of FIG. 29.

FIG. 31 is a diagram illustrative of a screen display for creating a new quick link called "January Work" based on the filtering of FIG. 29. As described above, in FIG. 29, the stacks have been filtered by the month of January. In FIG. 31, the user has indicated that the filtering of FIG. 29 should be saved as a new quick link, and has named the new quick link "January work". Thus, the new January work quick link 612 is shown in the quick links section of the display. With regard to forming new quick links, the user is generally provided with an option such as "save this collection as a quick link".

Figure 32:
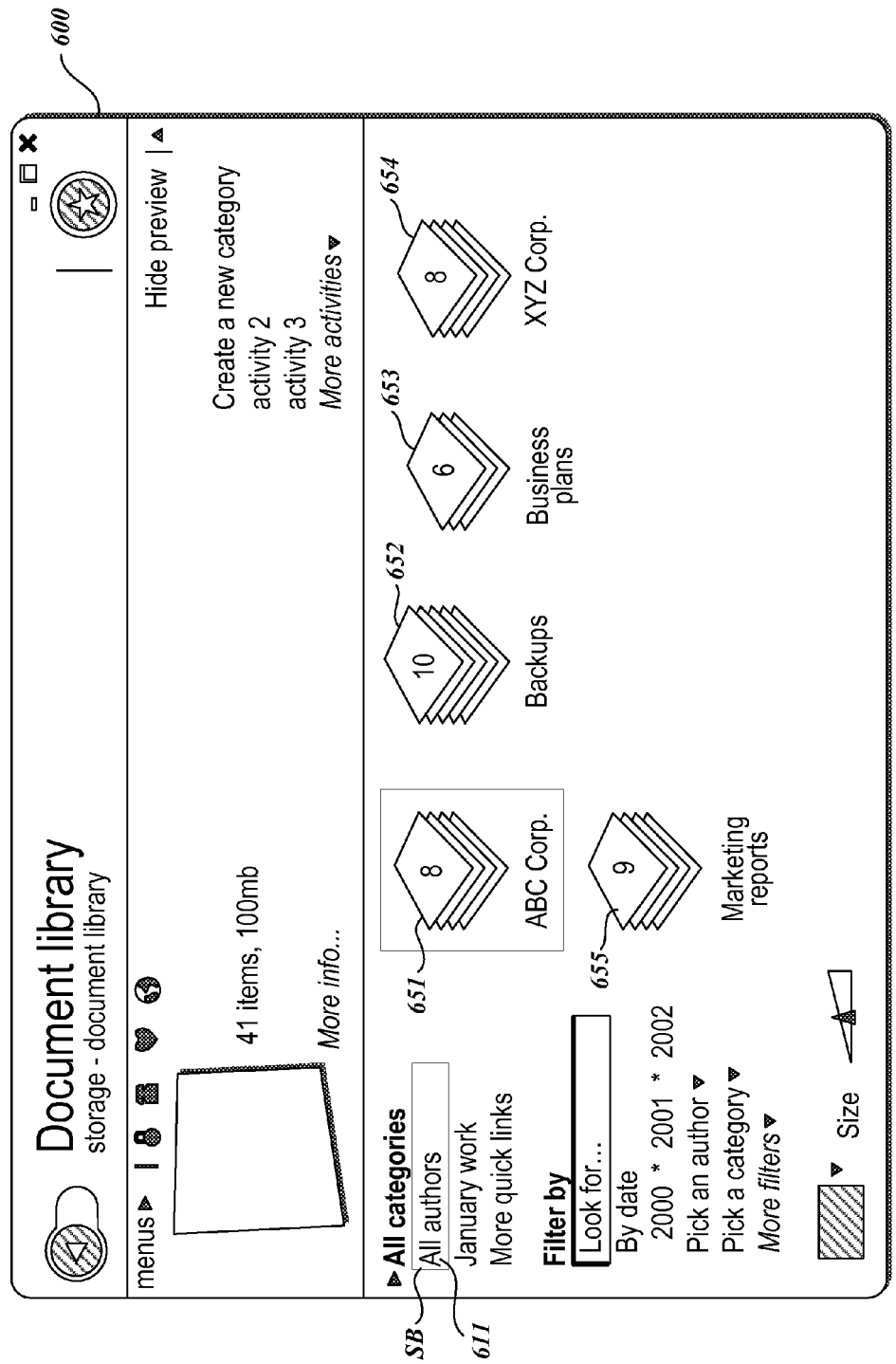
FIG. 32 is a diagram illustrative of a screen display in which a quick link of "All Authors" is selected.

FIG. 32 is a diagram illustrative of a screen display in which a quick link of "All Authors" is selected. As shown in FIG. 32, the selection box SB is shown around the All Authors selection 611. Other examples of collections that might be accessible by quick links include "all authors", "recent documents", "all documents I've shared", "all documents I've authored", "all documents not authored by me", "desktop", and "all types".

Figure 33:
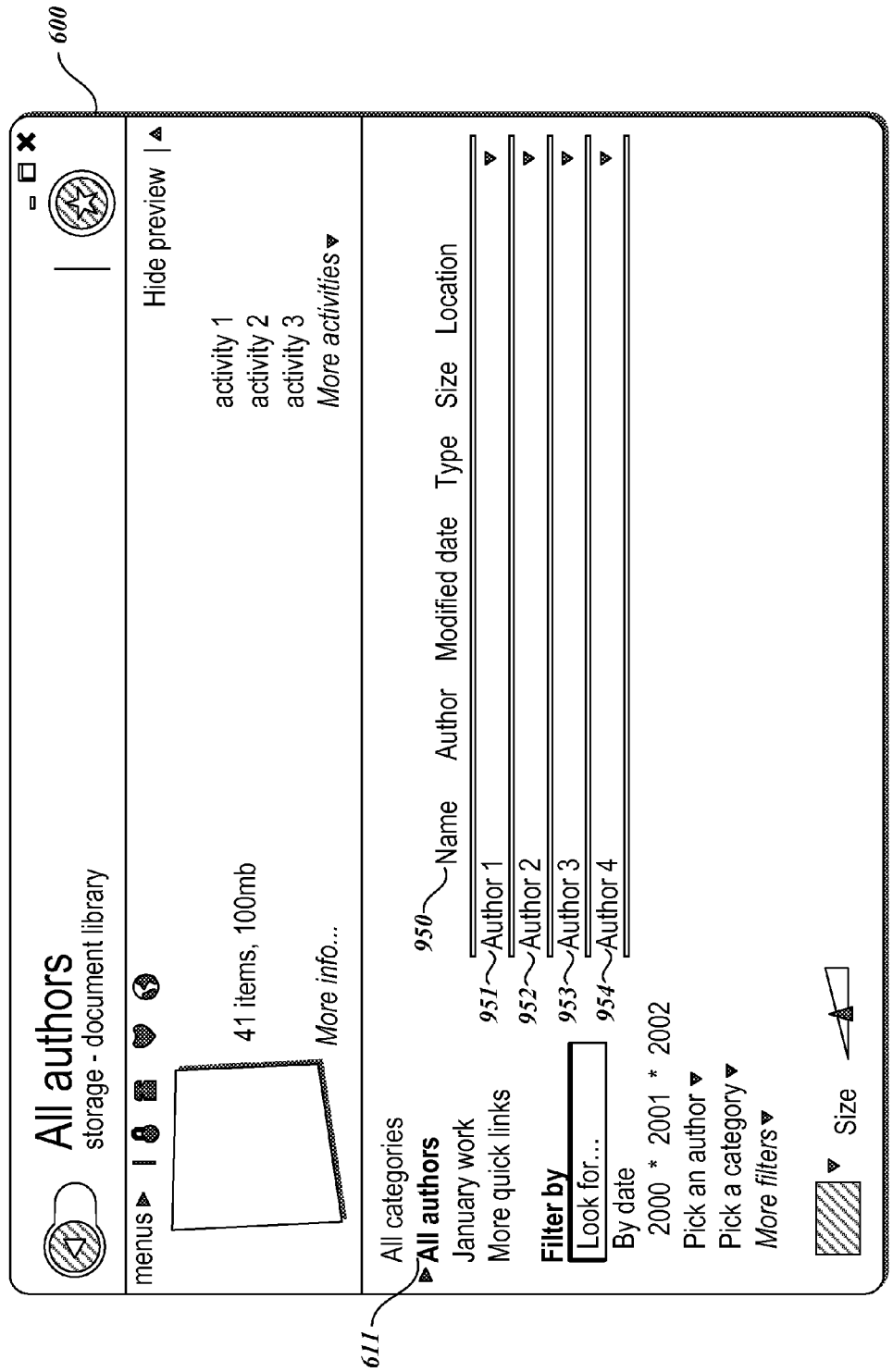
FIG. 33 is a diagram illustrative of a screen display in which a list of all of the authors of FIG. 32 is presented.

FIG. 33 is a diagram illustrative of a screen display in which a list of all of the authors of the items of FIG. 32 is presented. As shown in FIG. 33, an information line 950 is provided, which indicates columns for showing the name of an item, the author, the modified date, the type, the size, and the location of an item. A list of Authors 951-954 are shown, corresponding to Authors 1-4, respectively.

Figure 34:
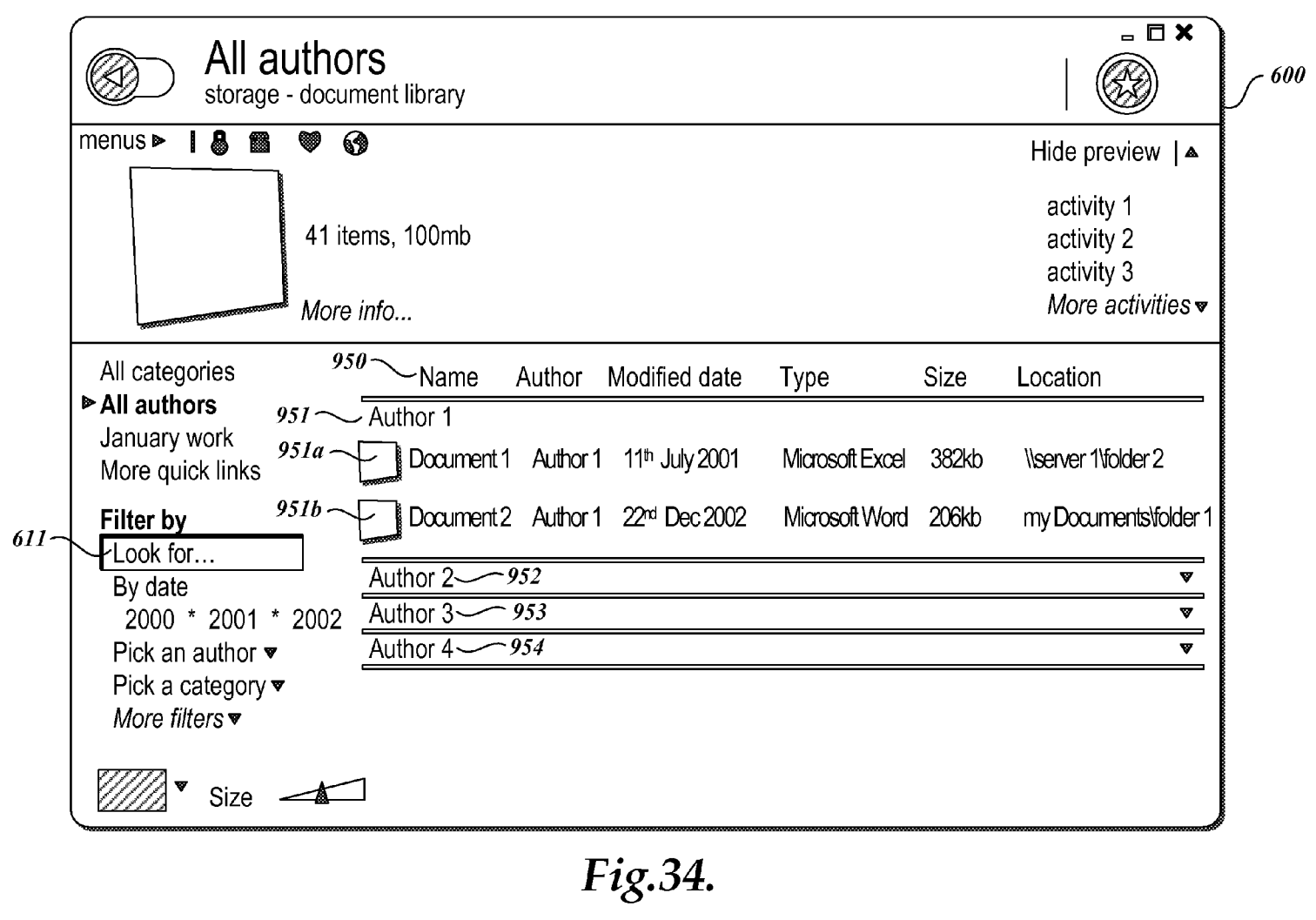

FIG. 34 is a diagram illustrative of a screen display in which "Author 1" has been selected from the list of FIG. 33. The Author 1's documents include documents 951A and 951B, corresponding to documents 1 and 2, respectively. The document 951A is shown to have been authored by Author 1, was modified on 11 Jul., 2001, is a Microsoft Excel file, takes up 282 Kb of memory, and was obtained from the location \\server1\folder2. The document 951B is shown to have been authored by Author 1, was modified on 22 Dec., 2002, is a Microsoft Word file, takes up 206 kilobytes of memory, and is physically stored in the location My Documents\folder1. The locations of the documents 951A and 951B also illustrate that the virtual folders of the present invention may contain items from different physical locations, as will be described in more detail below.

FIG. 35 is a flow diagram illustrative of a routine 960 for creating a new library. One example of a library is the documents library described above with reference to FIG. 10. In general, libraries consist of large groups of usable types of files that can be associated together. For example, photos may be one library, music may be another, and documents may be another. Libraries may provide tools and activities that are related to the particular types of items. For example, in the photo library, there may be tools and filters that relate to manipulating photos, such as for creating slide shows or sharing pictures. As shown in FIG. 35, at a block 962, a new library is created which is to include items with selected characteristics. At a block 964, the selected items are grouped into the library. At a block 966, the tools and/or activities related to the selected characteristics of the items or to other desired functions are provided.

FIG. 36 is a diagram illustrative of a screen display in which a collection of available libraries are shown. As shown in FIG. 36, the libraries include a documents library 971, a photos and video library 972, a music library 973, a messages library 974, a contacts library 975, and a TV and movies library 976, as well as an all items library 977. The all items library 977 is shown to include 275 items, which is the total number of items from all of the other libraries combined. The information line 644 indicates a total of 275 items, which take up a total of 700 MB of memory. It should be noted that the documents library 971 is the library that was described above with respect to FIG. 10.

FIG. 37 is a flow diagram illustrative of a routine 990 for defining the scope of a virtual folder collection. As will be described in more detail below, a virtual folder system is able to represent items from multiple physical locations (e.g., different hard drives, different computers, different networks locations, etc.) so that to a user, all of the items are readily accessible. For example, a user can be presented with music files from multiple physical locations on a single display, and manipulate the files all at once.

As shown in FIG. 37, at a block 992, a scope is defined for the physical locations from which items are to be drawn. At a block 994, in response to a query, the items are drawn from the physical locations as defined in the scope. At a block 996, all of the items drawn by the query are presented on a single display.

FIG. 38 is a block diagram illustrative of the various sources which may form the scope of a virtual folder collection. As shown in FIG. 38, the system 1000 may include a present computer 1010, an additional computer 1020, external and removable storage 1030, and locations on a network 1040. The overall scope 1001 is described as including all of the physical locations from which a user's items are drawn to create collections. The scope may be set and modified by a user. As noted above, other figures have illustrated that items may come from different physical locations, such as FIG. 34 showing different documents coming from a server and a My Documents folder on a present computer, and in FIG. 18 showing physical folders that are physically stored in multiple locations.

FIG. 39 is a flow diagram illustrative of a routine 1080 for including non-file items in a virtual folder collection. Non-file items are contrasted with file items that are typically located in a physical file storage. Examples of non-file items would be things like e-mails, or contacts. As shown in FIG. 39, at a block 1082 a database is utilized to include non-file items along with file items that may be searched by a query. At a block 1084, in response to a query, both non-file items and file items are drawn to match the query. At a block 1086, both the non-file items and the file items that matched the query are presented on the display.

FIG. 40 is a diagram illustrative of a screen display showing various non-file items. As shown in FIG. 40, the items have been filtered to those that include "John". The items are shown to include a contact item 1101, an e-mail item 1102, and document items 1103 and 1104. The contact item 1101 and e-mail item 1102 are non-file items. The present system allows such non-file items to be included with regular file items, such that they can be organized and manipulated as desired by a user. As was described above with respect to FIG. 2, such non-file items may be contained entirely within the relational database 230, which otherwise includes information about the properties of files.

FIGS. 41-50 are diagrams related to a virtual address bar that corresponds to the information line 641 of FIG. 10 and which is formed in accordance with the present invention. As will be described in more detail below, the virtual address bar comprises a plurality of segments, and each segment corresponds to a filter for selecting content. Collectively, the corresponding filters of each segment represent a virtual address for selecting content.

Figure 41:
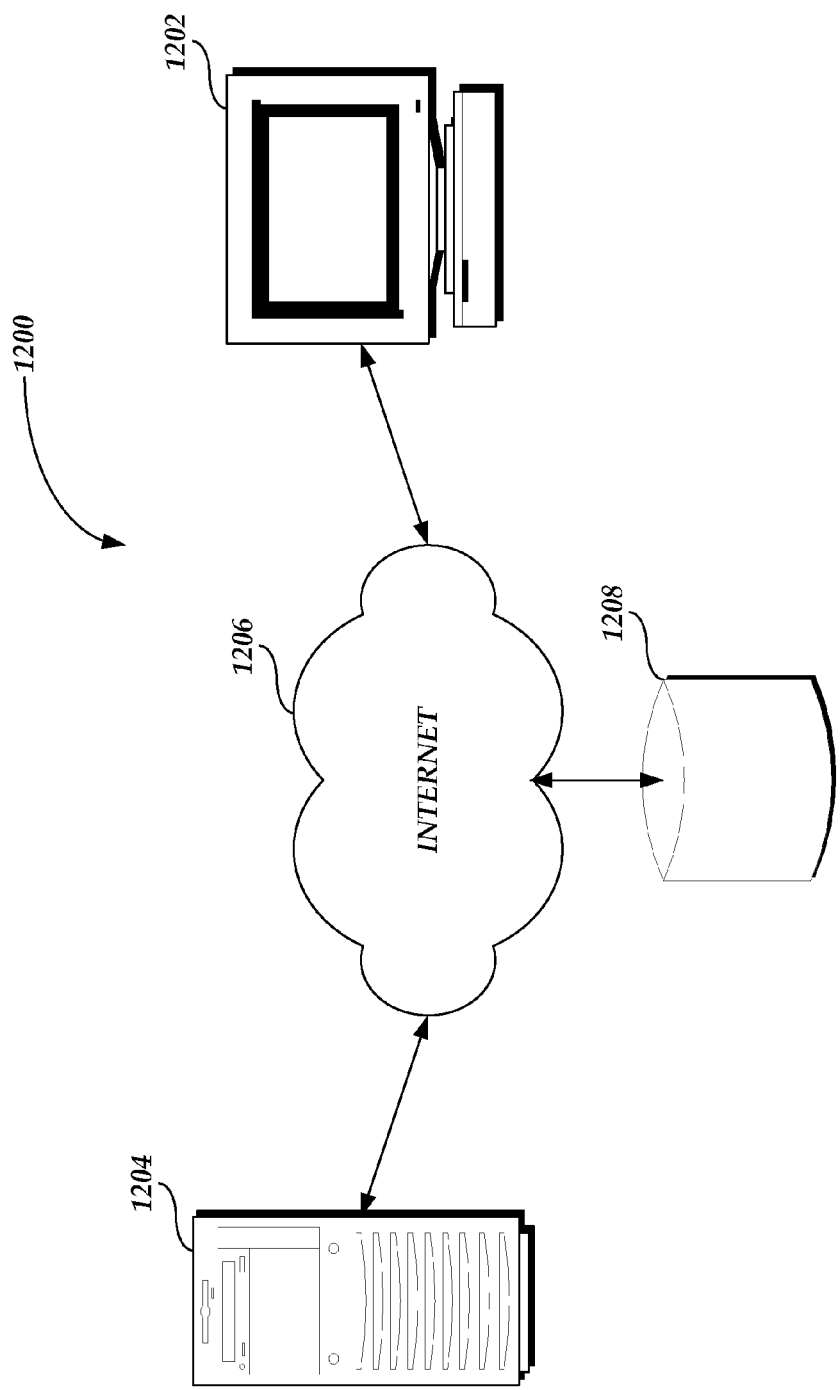
FIG. 41 is a pictorial diagram of an exemplary networked computer environment suitable for implementing the present invention.

FIG. 41 is a block diagram of an exemplary networked computing environment 1200 suitable for operating the virtual address bar, or any of the other aspects of the present invention described herein. The exemplary networked computing environment 1200 includes a computing device 1202, such as the personal computer described in regard to FIG. 1, for interacting with a user, and upon which the user may view files stored either locally or remotely to the computing device. While the following discussion describes the present invention in relation to a personal computer, it should be understood that the computing device 1202 includes many types of physical devices including, but not limited to mini- and mainframe computers, PDAs, tablet computers, and other devices capable of interacting with a user and displaying files and content stored on the computing device and elsewhere.

The exemplary networked computing environment 1200 may also include one or more remote servers, such as server 1204, that stores files accessible to the computing device 1202, and connected to the computing device via a communications network, such as the Internet 1206, as shown in FIG. 41. In addition, the computing device 1202 may also be connected to other information sources storing files or other content, such as a remote database 1208. Those skilled in the art will recognize that files and information stored on both the remote server 1204 and the remote database 1208, as well as on local storage devices such as hard disk drive (FIG. 1), may be accessible to, and displayable on, the computing device 1202 as part of an integrated file system on the computing device. Additionally, while a particular configuration of a remote server 1204 and remote database 1208 is presented in FIG. 41, those skilled in the art will readily recognize that this particular configuration is for illustrative purposes only, and should not be construed as limiting upon the present invention.

Figure 42:
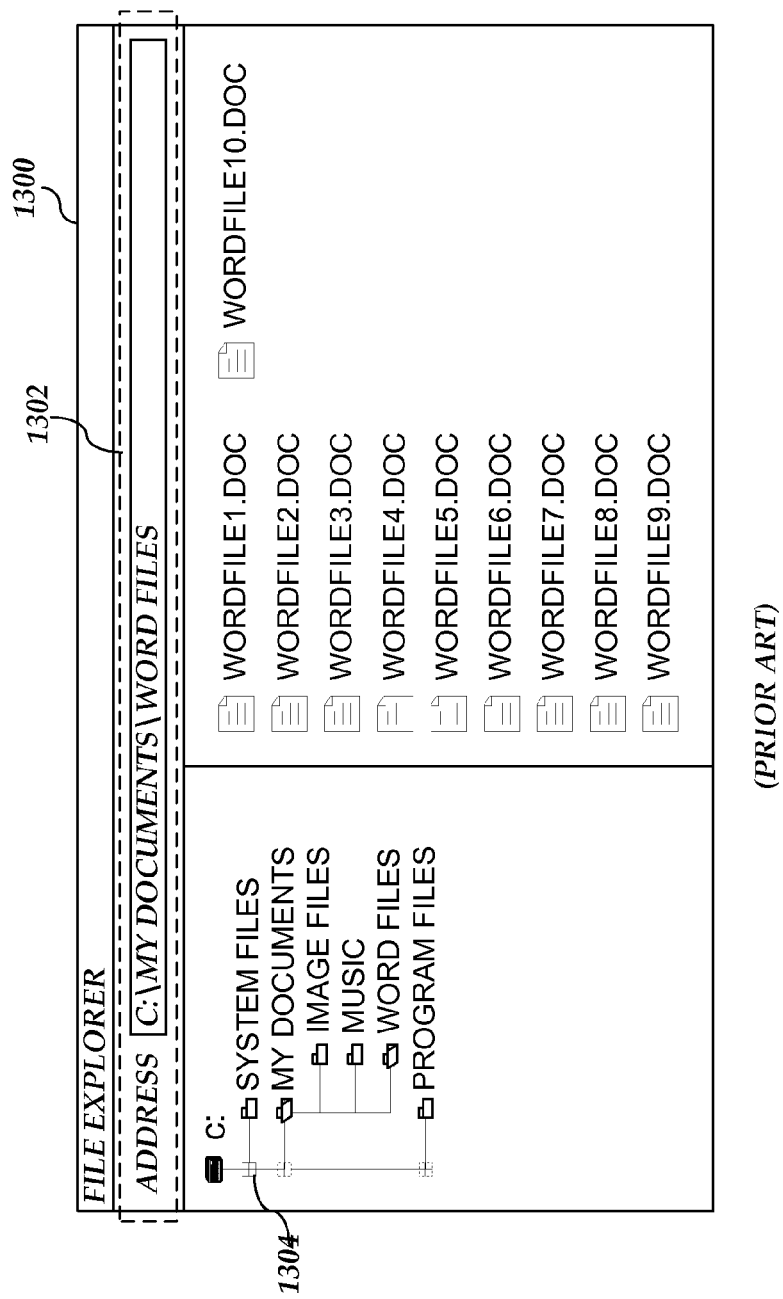
FIG. 42 is a pictorial diagram illustrating an exemplary file viewer having a conventional address bar associated with displaying files in a computer file system, as found in the prior art.

FIG. 42 illustrates an exemplary file viewer 1300 having a conventional address bar 1302 associated with displaying files in a computer file system, as found in the prior art. For purposes of the present discussion, a file viewer is a view or window on a display device, such as display device (FIG. 1), for displaying files or other content to a user. A file viewer may be a window corresponding to an executable program specifically for displaying files to a user. Alternatively, a file viewer may be a view within an open or close dialog box on an executable program that must save or retrieve data from a storage device connected locally or remotely to the computer system. It should be noted that the above examples of a file viewer are illustrative, and should not be construed as limiting upon the present invention.

An address in the conventional address bar 1302 corresponds to a specific location in a file system. As previously described, in order to edit the address displayed in the conventional address bar 1302, a user must modify the address according to specific knowledge of the file system. Alternatively, a user may select an entry in a tree view 1304 to navigate to an alternative location. Those skilled in the art will recognize that other controls external to the address bar 1302 may also be available that are not shown in the exemplary file view 1300. While the address displayed in the conventional address bar 1302 corresponds to a specific location in a file system, related files distributed among multiple folders in the file system cannot be displayed in conjunction with the conventional address bar 1302.

Figure 43:
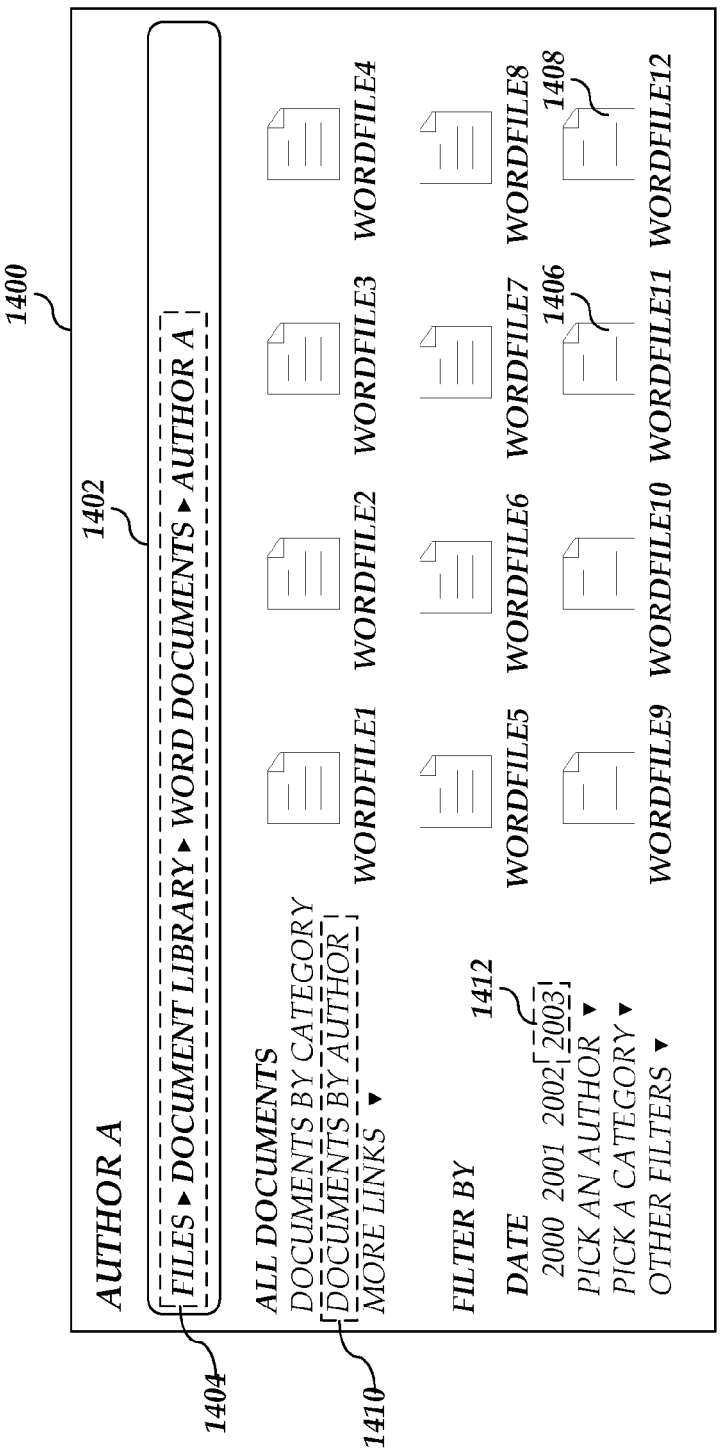
FIG. 43 is a pictorial diagram illustrating an exemplary file viewer for displaying files in a computer file system in accordance with a virtual address in a virtual address bar formed in accordance with the present invention.

FIG. 43 illustrates an exemplary file viewer 1400 having a virtual address bar 1402 associated with displaying files in a computer file system. The virtual address bar 1402 corresponds to the information line 641 of FIG. 10. The virtual address bar 1402, having a virtual address 1404, is configured to display similar information to that displayed by the conventional address 1304 of the prior art file viewer 1300 of FIG. 42. A virtual address, also referred to as a virtual path, references files stored in a computer file system according to selection criteria.

Similar to a conventional address, such as address 1304 of FIG. 42, the virtual address's selection criteria may reference files stored in a specific location in the file system hierarchy. However, in contrast to a conventional address, the virtual address's selection criteria may also reference files irrespective of their specific file system location. Thus, a virtual address may reference files stored in multiple locations in a computer file system. As shown in FIG. 43, the file viewer 1400, according to the virtual address 1404 in the virtual address bar 1402, is able to display additional files, such as files 1406 and 1408, not found in the file viewer 1300 of FIG. 42. Additionally, the virtual address bar 1402 may also be utilized to display content other than files in a computer file system. For example, the virtual address bar 1402 may be used to reference content including system devices, system services, or Internet locations.

Figure 44A:
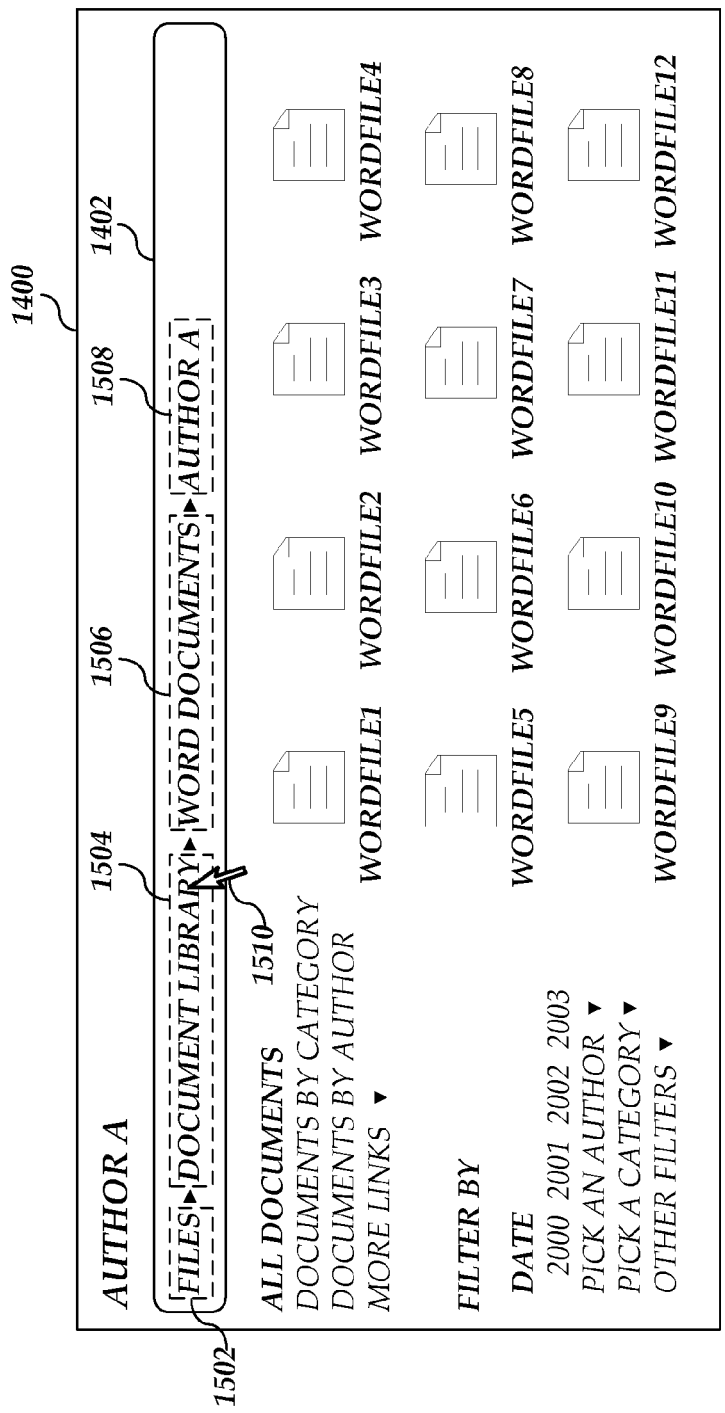
FIG. 44A is a pictorial diagram of the exemplary file viewer of FIG. 5 illustrating selecting a segment of the virtual address in the virtual address bar to navigate in the file system.

FIG. 44A illustrates manipulating a segment of the virtual address 1404 in the virtual address bar 1402 in order to navigate in a computer file system. Each virtual address bar, such as virtual address bar 1402, is comprised of one or more interactive segments, such as segments 1502, 1504, 1506, and 1508. Each segment in a virtual address bar corresponds to a predetermined filter, or selection criteria, on all of the available content or files accessible to a computer file system. Collectively, the filters of all of the segments in a virtual address bar 1402 represent the virtual address bar's virtual address.

The first segment in a virtual address bar, such as segment 1502, is referred to as a root segment, or root filter. The root segment represents the broadest category of content available for selection by the virtual address bar 1402. For example, segment 1502 "Files" would likely represent a filter that references all files accessible the computer file system. Alternatively, a root segment may represent a filter that references all system services available to the user on the computer system, or a filter that references all hardware devices installed in the computer system. Those skilled in the art will recognize that numerous other alternative root filters may be utilized by the present invention. Thus, the above described examples are given for illustrative purposes, and should not be construed as limiting upon the present invention. Additionally, the labels displayed for each segment, such as "Files" on the root segment 1502, are illustrative and should not be construed as limiting upon the present invention. According to one embodiment, a label displayed on a segment is user configurable.

Each additional segment in a virtual address bar 1402, such as segments 1504, 1506, and 1508, represent additional filters to be applied when selecting and displaying files or content in a file viewer 1400. For example, root segment 1502 "Files" references all files available to the computer system. Segment 1504 "Document Library" filters the files selected by the root segment 1502, by selecting those files that were generated as documents by the user, such as through a word processor, spreadsheet, or some other document generating application. Segment 1506 "Word Documents" filters the files selected by segment 1504 according to those documents that were generated using a word processor, such as Microsoft Corporation's Word application. Finally, segment 1508 "Author A" filters the word processing documents selected by segment 1506 according to whether they were authored by "Author A." Thus, content selected according to the virtual address represented in the virtual address bar 1402 must satisfy the filters corresponding to all of the segments in the virtual address bar.

Segments in the virtual address bar 1402 are generally ordered from those filters that are most inclusive, to those filters that are least inclusive. For example, as previously discussed, segment 1502 "Files" is the broadest and most inclusive. Segments 1506 "Word Documents" and segment 1508 "Author A" are less inclusive. The virtual address bar 1402 illustrates the ordering of segments from left to right, and, for purposes of the present discussion, segments 1504, 1506, and 1508 are subsequent to the root segment 1502. However, it should be understood that other orientations are possible, such as a top-down arrangement, without departing from the scope of the invention. Thus, the orientation from left to right should be viewed as illustrative, and not construed as limiting on the present invention.

As previously mentioned, segments in a virtual address bar 1402, such as segments 1502, 1504, 1506, and 1508, do not necessarily correspond to specific locations in a computer file system, such as folders, drives, and directories. Thus, segment 1504 "Document Library" may reference files or content distributed on multiple servers, drives, or folders/directories. However, certain segments in a virtual address bar 1402 may reference specific locations with a computer file system hierarchy. A further discussion of virtual address segments referencing specific file system locations is given below in regard to FIGS. 48A and 48B.

In contrast to a conventional address bar, each segment in a virtual address bar 1402 represents an actionable, interactive user interface element. For example, a segment in a virtual address bar 1402 is responsive to user selection, monitors whether a cursor is located over the segment for a specific period of time, and may be removed from the virtual address bar by a dragging user interaction. Hence, as shown in FIG. 44A, a user may place a cursor 1510 over a segment in the virtual address bar 1402, such as segment 1504 "Document Library," to select, or click, on that segment in order to navigate to that level, i.e., truncate the virtual address at that segment, as described in regard to FIG. 44B.

Figure 44B:
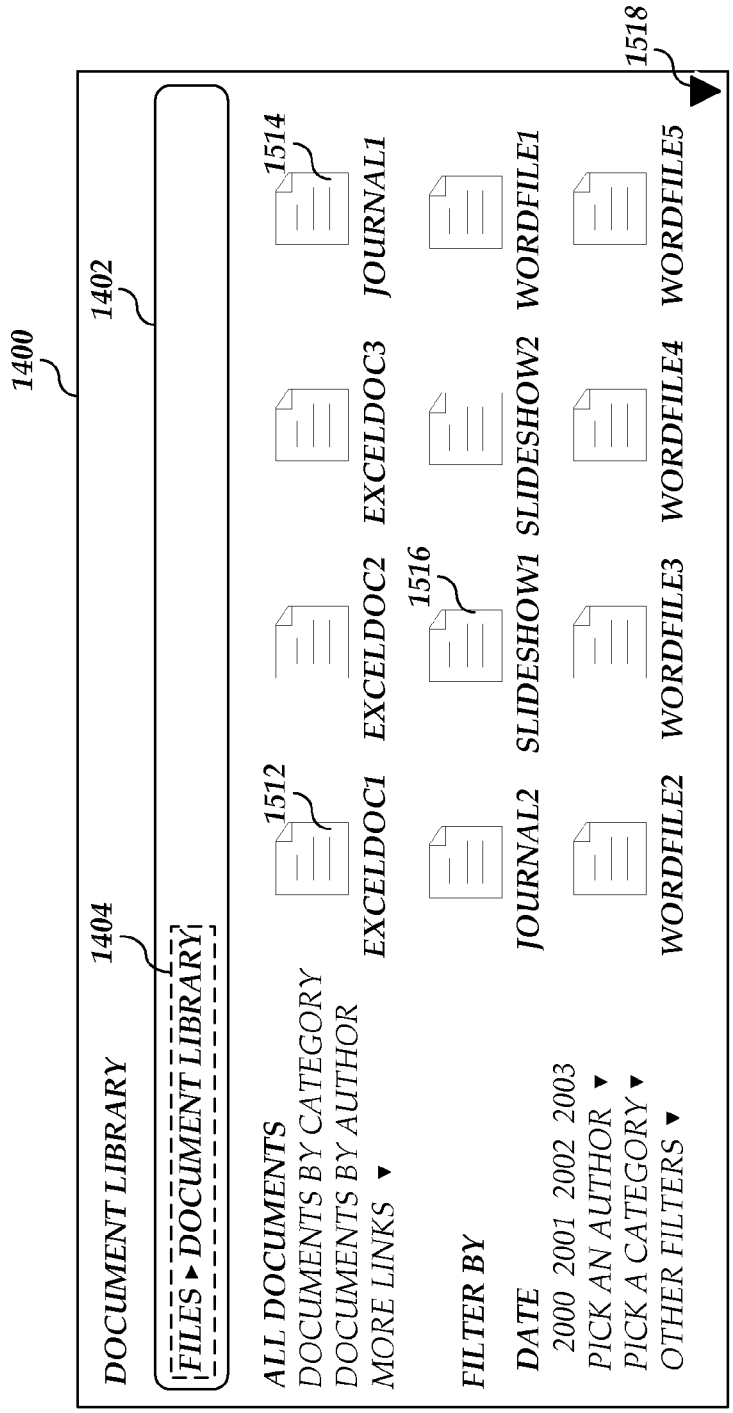
FIG. 44B is a pictorial diagram of the exemplary file viewer of FIG. 45A illustrating the results of selecting a segment of the virtual address in the virtual address bar.

FIG. 44B illustrates the results of selecting a segment 1504 in the virtual address bar 1402. By clicking on the segment 1504 in the virtual address bar 1402, the user is indicating a desire to navigate to that level in the virtual address. In effect, the user is trimming off those filters subsequent to the selected segment. For example, by clicking on segment 1504 "Document Library" (FIG. 44A), the resulting virtual address 1404 no longer contains segments 1506 "Word Documents" and 1508 "Author A" (FIG. 44A). Additionally, because the user has navigated to a less restrictive set of filters, the resulting virtual address 1404 in the virtual address bar 1402 is more inclusive. This is indicated by the addition of documents in the file viewer 1400 of FIG. 44B not previously found in the file viewer 1400 of FIG. 44A, including document 1512, document 1514, and document 1516, and by the presence of a scroll button 1518 indicating that additional files may be viewed that cannot be displayed in the file viewer 1400 (FIG. 44B) due to space limitations.

In addition to selecting segments in a virtual address bar to navigate to a less restrictive segment, a user may also wish to navigate to, or select, peer filters of current segments in a virtual address. A peer filter is an alternative filter that may be selected and applied to a given segment in the virtual address bar. For example, with reference to FIG. 44A, peer filters for segment 1506 "Word Documents" may include filters such as "Excel Documents," "Journals," and the like. Other types of filters, including specific file system locations, hardware devices, or computer services, may also be applied to a given segment in the virtual address bar. Peer filters may or may not be logically related to a given segment's current filter. Each segment in a virtual address bar may have peer filters. Selecting a peer filter of a segment in a virtual address bar is sometimes referred to as navigating laterally. Selecting peer filters of segments in a virtual address bar is described below in regard to FIGS. 45A-45D, and also in regard to FIG. 49.

Figure 45A:
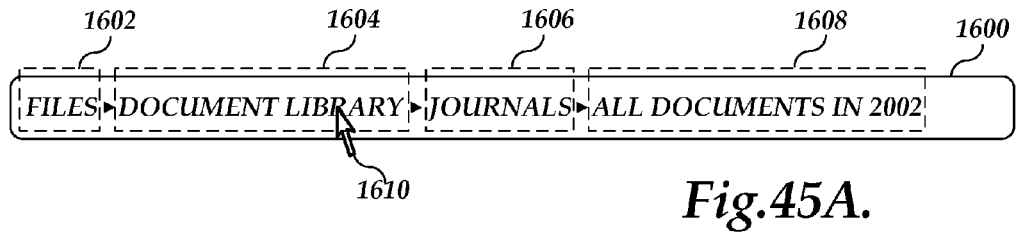
FIGS. 45A-45D are pictorial diagrams illustrating selecting a peer filter associated with a segment of a virtual address in a virtual address bar.

FIGS. 45A-45D are pictorial diagrams illustrating selecting a peer filter associated with a segment of virtual address in a virtual address bar 1600. As shown in FIG. 45A, virtual address bar 1600 has a virtual address comprising multiple segments, segments 1602-1608. In order to select a peer filter for a given interactive segment in a virtual address bar 1600, a user must make an alternative selection, or alternative manipulation, of that interactive segment. One way to make an alternative selection is to right click on a given segment. Right clicking is known in the art and refers to using a secondary button on a mouse, or other input device, where the secondary button is typically on the right-hand side of the mouse. Alternatively, because an interactive segment can monitor when a cursor is located over it, an alternative selection may be made by locating the cursor over an interactive segment and leaving the cursor in place for predetermined amount of time, sometimes referred to as hovering. However, while the present discussion describes alternatives for causing peer filters to be displayed, they are for illustration, and should not be construed as limiting upon the present invention. Those skilled in the art will recognize that there are numerous alternatives for generating an alternative selection.

Figure 45B:
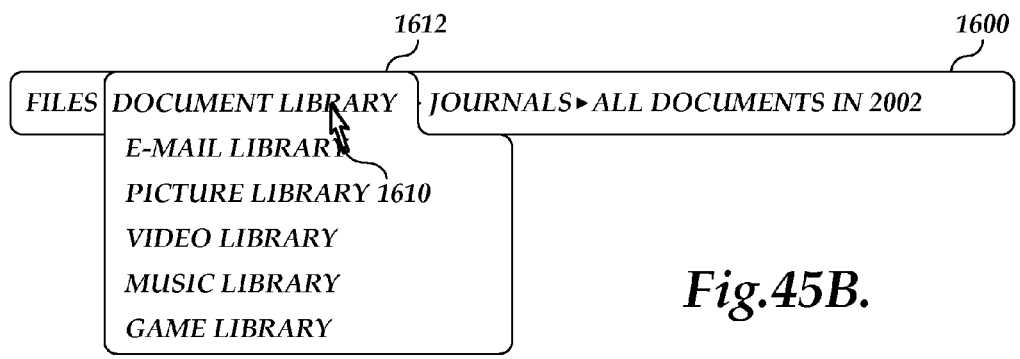

To illustrate alternatively selecting a segment, with reference to FIG. 45A, a user first places the cursor 1610 over segment 1604 "Document Library" for a predetermined amount of time, i.e., hovers over the segment, to select that segment. FIG. 45B demonstrates the results of alternatively selecting segment 1604 "Document Library" in the virtual address bar 1600. As shown in FIG. 45B, after alternatively selecting segment 1604 "Document Library," a peer filter view 1612 is displayed including peer filters corresponding to the selected segment. It should be understood that the peer filters presented in the peer filter view 1612 are for illustrative purposes only, and should not be construed as limiting upon the present invention.

Figure 45C:
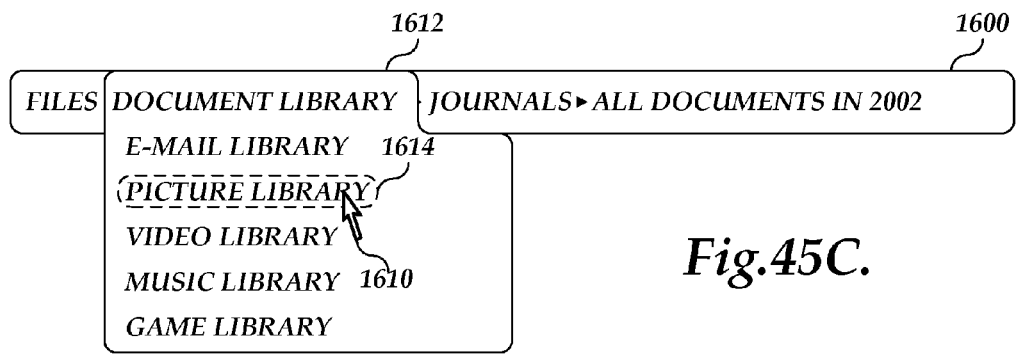
Figure 45D:
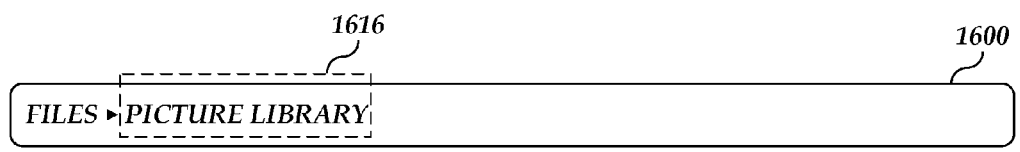

In order to select an alternative peer filter, as shown in FIG. 45C, the user positions the cursor 1610 over one of the filters presented in the peer filter view 1612, such as peer filter 1614, and selects the peer filter. As shown in FIG. 45D, after selecting the alternative peer filter 1614, the previously selected segment 1604 (FIG. 45A) is replaced with a new segment 1616 representing the selected alternative peer filter 1614. Additionally, those segments that followed the alternatively selected segment 1604 in the virtual address bar 1600 of FIG. 45A, specifically segments 1606 "Journals" and 1608 "All Documents in 2002", are removed from the virtual address bar 1600 in FIG. 45D. Although not shown, it follows that any files or content previously selected according to segments 1604 "Document Library", 1606 "Journals", and 1608 "All Documents In 2002" would no longer be displayed in a corresponding file viewer, and only those files or content selected according to segments 1602 "Files" and 1616 "Picture Library" would be displayed.

Segments may be added to a virtual address in a virtual address bar through various user interactions at the end of the existing segments. To add a filter to a virtual address in a virtual address bar, a user may manipulate an actionable control associated with a particular filter found on a window, or file viewer with the virtual address bar. For example, with reference to the file viewer 1400 of FIG. 43, a user may click on the actionable control 1412 "2003" to add a corresponding filter to the virtual address 1404 in the virtual address bar 1402. Alternatively (not shown), a user may manually enter in a known filter at the end of the virtual address by typing the filter's name. Numerous other ways of adding a filter to a virtual address exist, all of which are contemplated as falling within the scope of the present invention. Thus, it should be understood that the above examples are for illustration purposes, and should not be construed as limiting upon the present invention.

When a filter is added to a virtual address in a virtual address bar, a process is undertaken to ensure that the newly added filter does not conflict with any filters currently existing as part of the virtual address. If the newly added filter conflicts with an existing filter, the existing filter is removed. A newly added filter conflicts with an existing filter in a virtual address if the newly added filter varies from the breadth of the existing filter, being either more or less broad than the existing filter. Additionally, a newly added filter conflicts with an existing filter if the newly added filter is mutually exclusive to the existing filter. However, a newly added filter that is equivalent to an existing filter is not added because it has no effect. It should be understood that the above description of conflicts is given for illustration purposes, and should not be construed as limiting upon the present invention. Those skilled in the art will recognize that other conflicts between filters may exist that are contemplated as falling within the scope of the present invention.

Figure 46A:
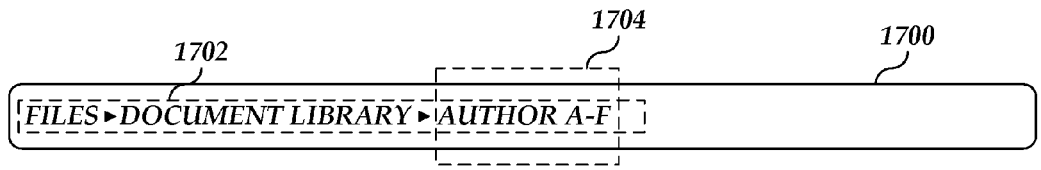
FIGS. 46A-46D are pictorial diagrams illustrating adding additional filters to a virtual address in a virtual address bar.
Figure 46B:

FIGS. 46A-46D are pictorial diagrams illustrating adding filters to a virtual address 1702 in a virtual address bar 1700, and removing conflicting existing filters. FIG. 46A illustrates an exemplary virtual address 1702 displayed in a virtual address bar 1700. As shown in FIG. 46B, a new filter, represented by segment 1706 "2002", is added to the virtual address 1702. As previously described, new filters are added to the end of the virtual address, as indicated by placing segment 1706 "2002" at the end of the segments in the virtual address bar 1700 of FIG. 46B. Thereafter, the process undertaken for adding segment 1706 "2002" determines that the added filter does not conflict with any current filters in the virtual address 1702. Thus, no existing filters are removed from the virtual address 1702.

Figure 46C:

As shown in FIG. 46C, another filter is added to the virtual address 1702, represented by segment 1708 "Author A." The process undertaken for adding this new filter determines that the new filter, "Author A," would conflict with the filter represented by segment 1704 "Author A-F" because the new filter, "Author A," is narrower than the existing filter. Accordingly, segment 1704 "Author A-F" is removed from the virtual address bar 1700, and segment 1708 "Author A" is added to the end of the segments in the virtual address bar.

Figure 46D:
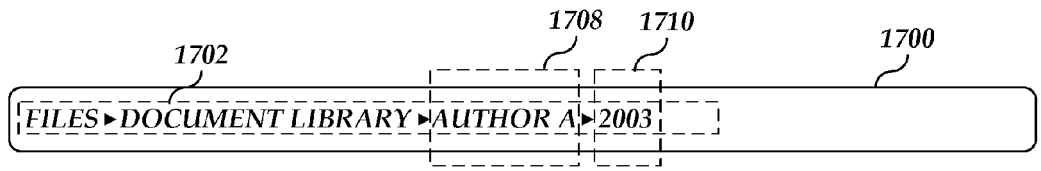

FIG. 46D illustrates the results of adding segment 1710 "2003" to the virtual address bar 1700 of FIG. 46C. Filters in a virtual address 1702 are restrictive, not cumulative. Each filter further restricts the selected content. Thus, mutually exclusive filters would prevent the virtual address 1702 from selecting any files or content, and therefore, create a conflict. As illustrated in FIG. 46D, segment 1706 "2002" (FIG. 46C) is removed from the virtual address bar 1700 because of a conflict as it is mutually exclusive with the newly added segment 1710 "2003."

When a virtual address bar, such as virtual address bar 1800 (FIG. 47A), cannot completely display the virtual address due to size limitations of the virtual address bar, a portion of the virtual address is displayed according to the size of the virtual address bar. However, the undisplayed portions of the virtual address may still be accessed by the user. More specifically, the virtual address bar displays actionable visual indicators to scroll the virtual path within the virtual address bar. FIGS.

Figure 47A:
FIGS. 47A and 47B are pictorial diagrams illustrating an exemplary virtual address bar displaying a virtual address where the virtual address exceeds the virtual address bar's display capacity.
Figure 47B:
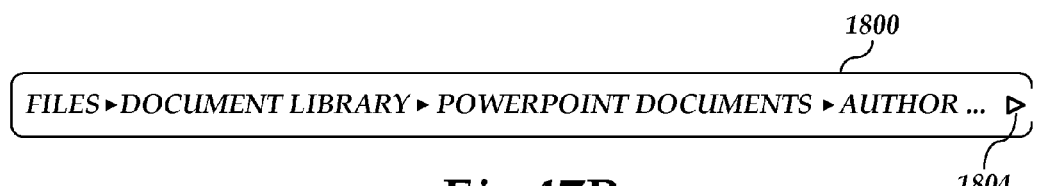

47A and 47B illustrate an exemplary virtual address bar 1800 displaying a virtual address where the virtual address exceeds the virtual address bar's display capacity. As shown in FIGS. 47A and 47B, scroll icons 1802 and 1804 indicate the direction the virtual address bar 1800 may scroll in order to display the previously undisplayed portions of the virtual address. However, while the illustrative diagrams demonstrate the use of scroll icons, it is for illustrative purposes only, and should not be construed as limiting on the present invention. Those skilled in the art will recognize that there are numerous other ways of scrolling the virtual address in a virtual address bar, all of which are contemplated as falling within the scope of the present invention.

Figure 48A:
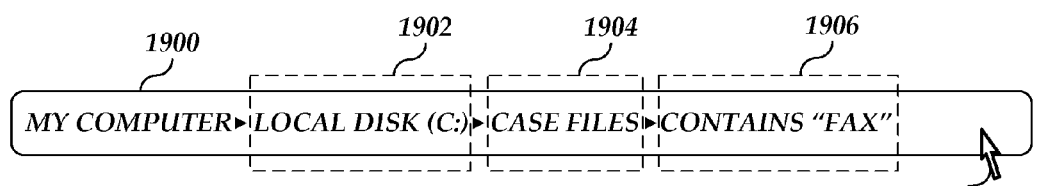
FIG. 48A is a pictorial diagram illustrating an exemplary virtual address bar having a virtual address with filters referencing both virtual and actual locations in a file system.

FIG. 48A is a block diagram illustrating a virtual address bar 1900 having segments referencing both virtual and actual locations in a file system. As previously discussed, a virtual address in a virtual address bar 1900 may contain segments referencing specific locations within a computer file system hierarchy, and also contain segments referencing virtual, or logical, locations within a computer file system. Files or content referenced by a virtual segment may be distributed among many physical locations. A virtual address bar 1900 may contain segments referencing physical locations and segments referencing virtual locations. For example, virtual address bar 1900 includes segment 1902 "Local Disk (C:)" referring to files or content contained in a specific area in the computer file system, in particular drive "C." Alternatively, segment 1904 "Case Files" of itself refers to files or content stored in multiple folders in the computer file system hierarchy associated with case files. However, in combination with segment 1902 "Local Disk (C:)", segment 1904 "Case Files" references only those case files found on local drive "C." Additionally, segment 1906 "Contains 'Fax'" further filters the files on local disk C: and associated with the case files according to whether they contain the word "Fax."

Figure 48B:
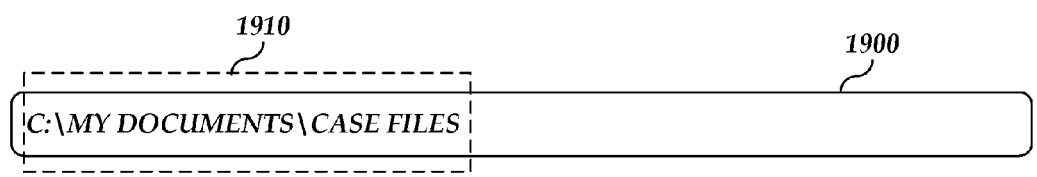
FIG. 48B is a pictorial diagram illustrating the exemplary virtual address bar of FIG. 48A as configured to display a conventional address bar.

As shown in FIG. 48B, a virtual address bar 1900 may be configured to function as a conventional address bar. For example, with reference to FIG. 48A, by placing a cursor 1908 in the empty space of the virtual address bar 1900 and clicking there, the virtual address bar 1900 switches from displaying segments representing a virtual address, to functioning as a conventional address bar displaying a conventional address 1910, as shown in FIG. 48B. The conventional address 1910 in the virtual address bar 1900 of FIG. 48B approximates the virtual address displayed in the virtual address bar 1900 of FIG. 48A. However, those filters in the virtual address bar 1900 of FIG. 48A that do not correspond to physical locations in a computer file system cannot be displayed and are removed from the conventional address 1910. Specifically, segment 1904 "Case Files" and segment 1906 "Contains 'Fax'" are not part of the conventional address 1910 (FIG. 48B).

In order to reconfigure a virtual address bar 1900, functioning as a conventional address bar, to function normally as a virtual address bar, the user must so indicate in a manner other than clicking on the empty area of the bar. When configured to function as a conventional address bar, a virtual address bar must permit the user to click in the empty area for address editing purposes. Clicking in the empty area of a conventional address bar places an editing cursor at the end of the address/path for editing purposes. Accordingly, to reconfigure the virtual address to again function in its normal manner as described above, a user must press a predefined key or key sequence, such as the Esc or Tab key, or by place the focus on another area of a window or view by clicking on another area of the window or view. Those skilled in the art will recognize that other user actions may also be utilized to reconfigure the virtual address bar 1900 to again function in its normal mode as described above, all of which are contemplated as falling within the scope of the present invention.

Figure 49:
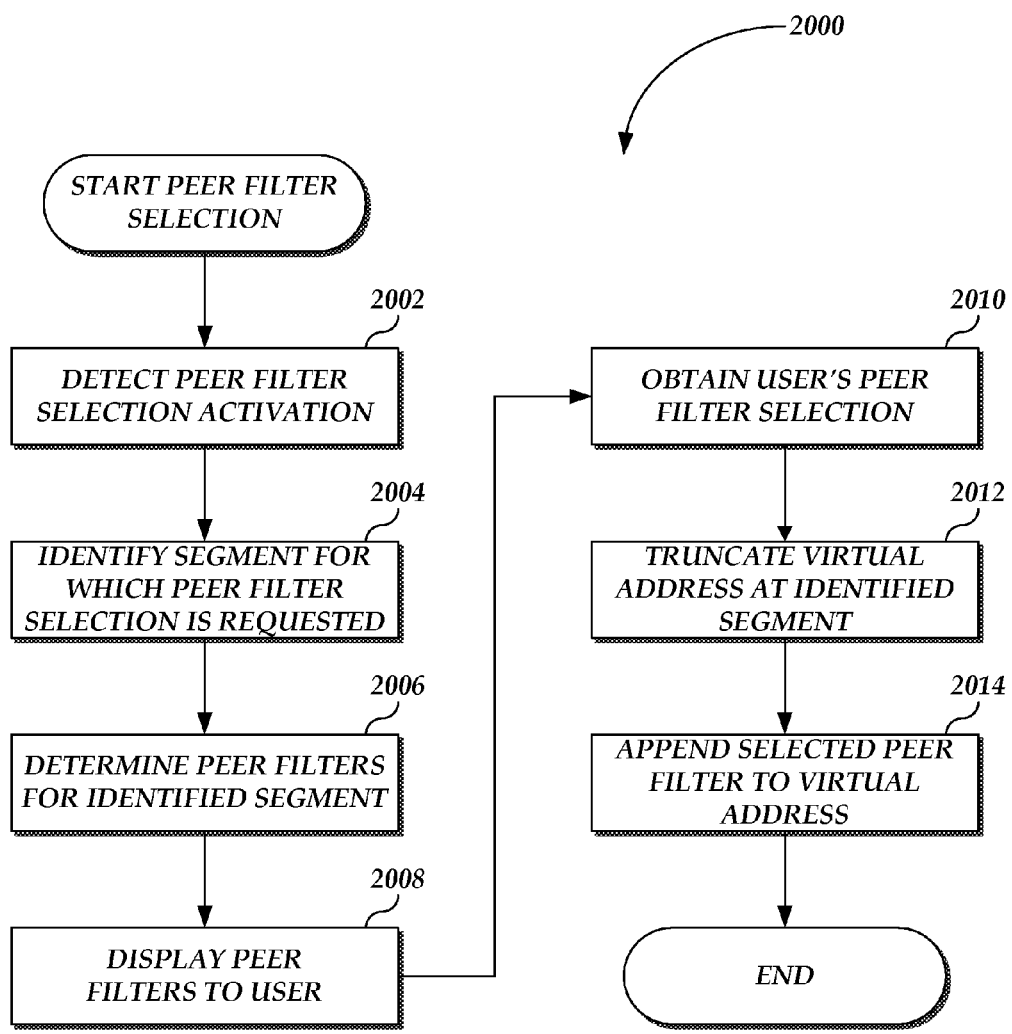
FIG. 49 is a flow diagram illustrative of an alternate filter selection routine for selecting alternate filters in a virtual address bar.

FIG. 49 is a flow diagram illustrative of a peer filter selection routine 2000 for selecting a peer filter for an identified segment in a virtual address bar. Beginning at block 2002, the routine 2000 detects a peer filter selection activation. Activating the peer filter selection process is described in above in regard to FIGS. 45A-45D. At block 2004, the segment for which the peer filter selection has been requested is identified. At block 2006, the peer filters for the identified segment are determined from a predetermined list of peer filters. At block 2008, the peer filters are displayed to the user. At block 2010, the user's peer filter selection from peer filters displayed is obtained. At block 2012, the virtual address is truncated by removing the identified segment from the virtual address bar, and any additional segments that follow the identified segment. At block 2014, a segment representing the selected peer filter is appended to the remaining segments in the virtual address bar. Thereafter, the routine 2000 terminates.

Figure 50:
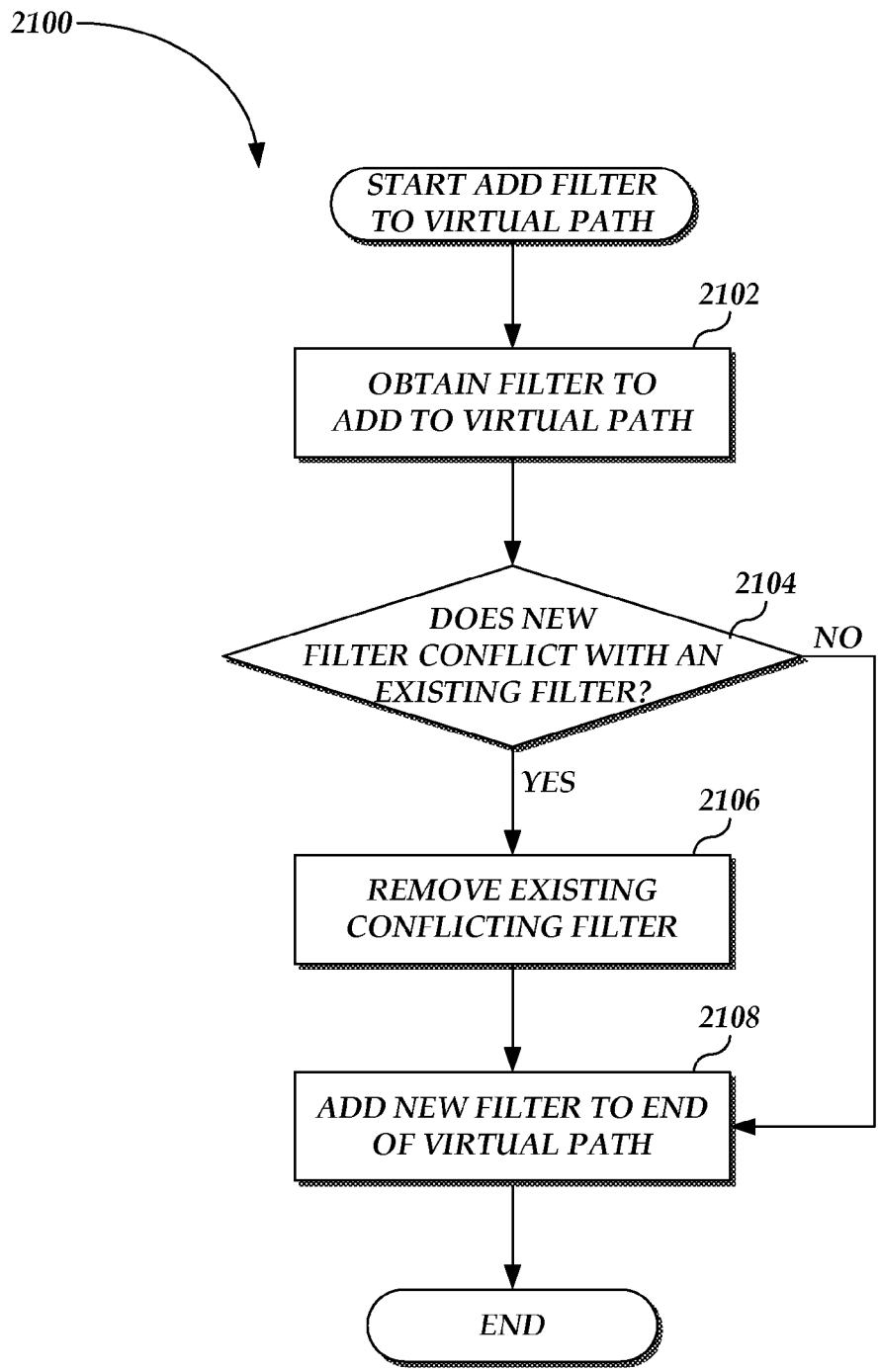
FIG. 50 is a flow diagram illustrating an exemplary add filter routine for adding a filter to a virtual address in a virtual address bar.

FIG. 50 is a flow diagram illustrating an exemplary add filter routine 2100 for adding a filter to a virtual address in a virtual address bar. Beginning at block 2102, the exemplary routine 2100 obtains the filter to be added to the virtual address. For example, as previously discussed in regard to FIG. 43, filters may be added to the virtual address according to user actions external to the virtual address bar, or alternatively, may be directly added to the virtual address bar by typing in the name of a predefined filter.

At block 2104, a determination is made whether the new filter conflicts with an existing filter already in the virtual address. As previously discussed in regard to FIGS. 46A-46D, a new filter may conflict with an existing filter by substantially narrowing or broadening the scope of the existing filter. Alternatively, a new filter may conflict with an existing filter because a new filter is mutually exclusive to an existing filter. If, at decision block 2104, the new filter conflicts with an existing filter, at block 2106, the existing filter is removed from the virtual address. Alternatively, at 2104, if the new filter does not conflict with an existing filter or, after removing the existing conflicting filter in block 2106, at block 2108, the new filter is added at the end of the virtual address. Thereafter, the exemplary routine 2100 terminates.

FIGS. 51-57 are diagrams related to a system and method in accordance with another aspect of the invention that provides an improved user experience within a shell browser. More specifically, a system and method are provided by which users can more readily identify an item based on the metadata associated with that item.

Turning to FIG. 51 A, a window 2200 represents a screen-size display area for a graphical user interface of a shell browser. The window 2200 contains a preview pane area 2202 and a view area 2204. The preview pane 2202 may include a preview control 2206, a user interface (UI) or edit control 2208, and a task control 2210. Typically, the preview control 2206 will provide the user with an image or other visual display of the item being previewed (e.g., a selected file). The preview control 2206 may also present the user with controls such as iterator buttons which allow the user to shift the focus from one item to the next by clicking a mouse button. Metadata corresponding to one or more items and/or metadata corresponding to the item container may be displayed in a variety of locations within the window 2200. For example, the edit control and metadata may be co-located within edit control area 2208 so that the edit control area not only includes a display of key properties of the previewed item but also presents the user with the option of making edits to the metadata.

The task control 2210 contains tasks relevant to the namespace and/or the selection.

For purposes of the present invention, the terms "metadata" and "user modifiable metadata" exclude the shell item name. The term "shell item name" refers to the property which is used for purposes of sorting and displaying the item within the shell browser. As mentioned above, one unique aspect of the present invention is the ability of a user to edit metadata within a shell browser.

Those skilled in the art will appreciate that the present invention contemplates the presence of optional features within the window 2200. For example, the preview control 2206 and the task control 2210 are not essential features for purposes of the present invention. Moreover, other non-essential features which are not shown in FIG. 51A, such as a toolbar which includes iterator buttons or a show/hide button so the user can open/close the preview pane, are also within the scope of the present invention. Nevertheless, these and other optional features may assist the user in readily locating a particular item in the shell browser.

The view area 2204 provides a listview of one or more items 2212, such as file system files or folders. The term "listview" refers to an enumeration or list of items within a container. The terms "item" and "shell item" are used interchangeably herein to refer to files, folders and other such containers, and other non-file objects which can be represented in a listview. Examples of non-file objects may include, but would not be limited to, contacts, favorites and email messages. The terms "shell browser" and "file system browser" are used interchangeably herein to refer to a browser which allows a user to navigate through various namespaces including files and other non-file items.

Those skilled in the art will appreciate that the present invention contemplates many possible designs and layouts for the window 2200. For example, the preview pane 2202 is shown above the view area 2204 in FIG. 51A. However, other layouts, such as placing the preview pane 2202 and the view area 2204 side-by-side, are clearly within the scope of the present invention. The location of the edit control 2208 is also independent of the location of the displayed metadata and independent of the location of any other controls. There are also many possible view types for the items depicted in listview area 2204, such as details, slide show, filmstrip, thumbnail, tiles, icons, etc.

Figure 51A:
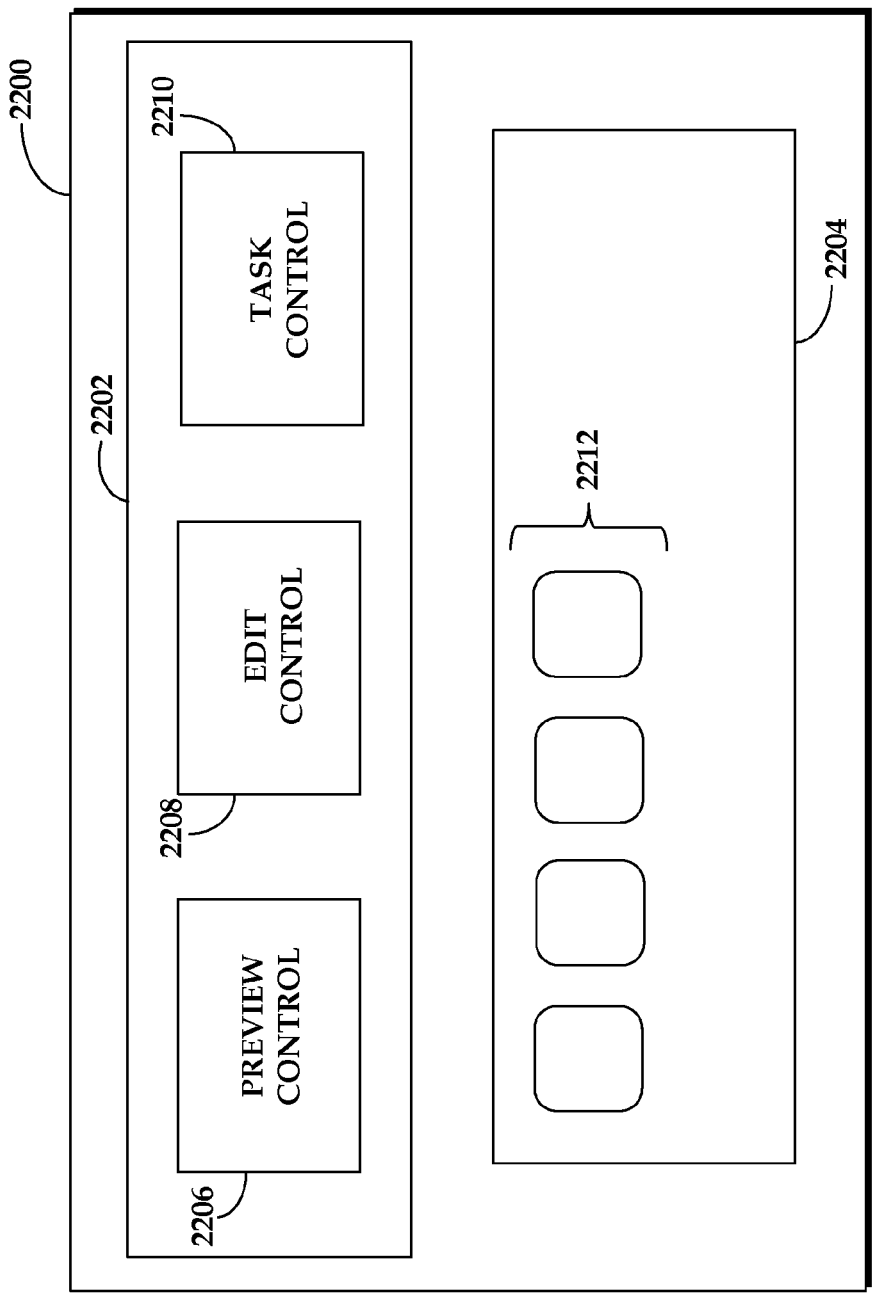
FIG. 51 A is a block diagram of an exemplary graphical user interface for a shell browser having an edit control in accordance with an embodiment of the present invention.
Figure 51B:
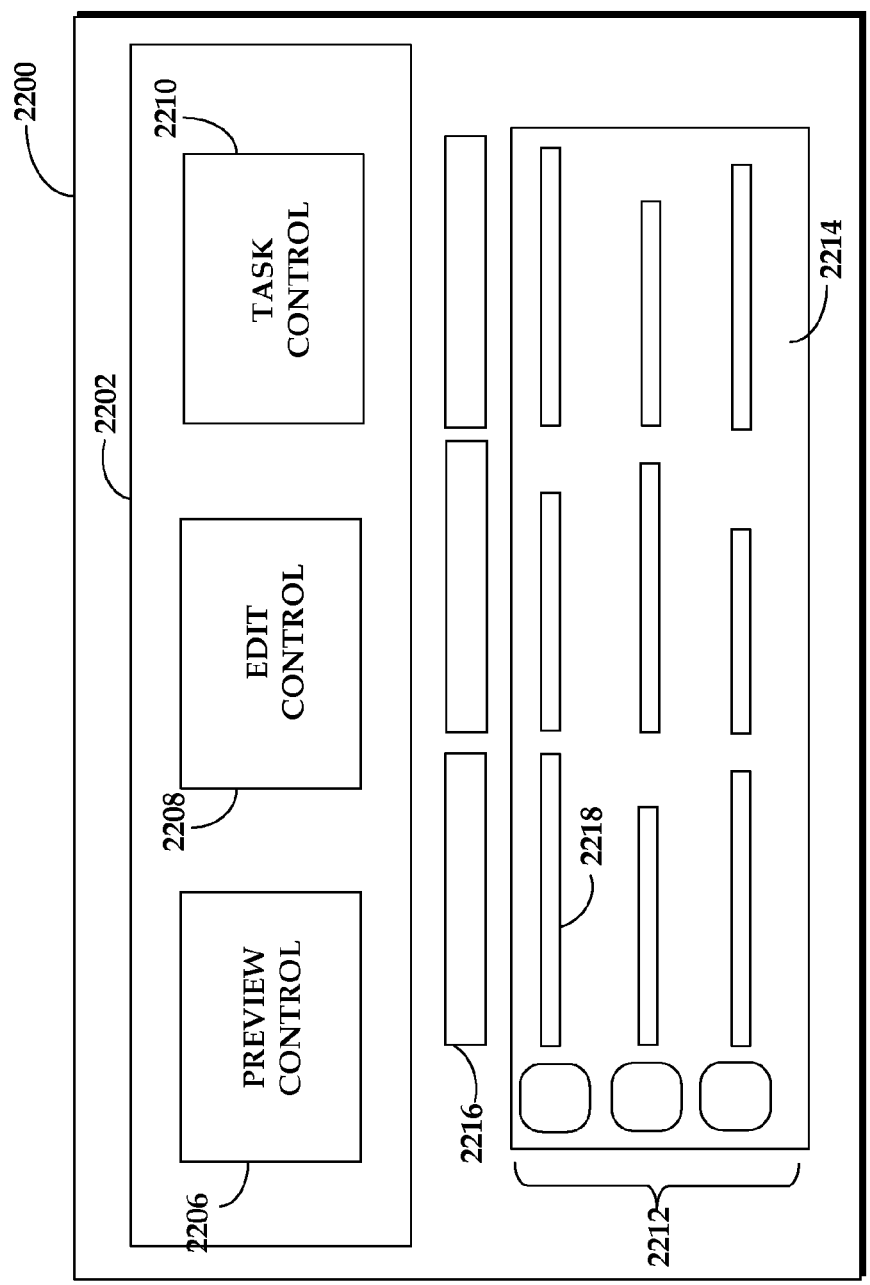

FIG. 51B is similar to FIG. 51A, except that the view area 2204 is replaced by a view area 2214 which displays the items 2212 in details mode. As is typical for shell items displayed in details mode, the items 2212 are aligned in a column at the left-hand side of view area 2214, and one or more column headings 2216 form the top row of a set of columns containing metadata 2218 relating to the corresponding item located in the same row. Importantly, the present invention contemplates the ability of a user to explicitly change a metadata value to another value through instantiation of one or more edit controls 2208 anywhere within the window 2200. For example, an edit control may be provided within the preview pane 2202 and/or within the view area 2214. For example, an edit control which is not initially visible to a user may be provided within the view area 2214. Such a control can be instantiated, for example, when the user hovers over the metadata 2218 and then clicks on it to enter an editing mode.

Figure 52:
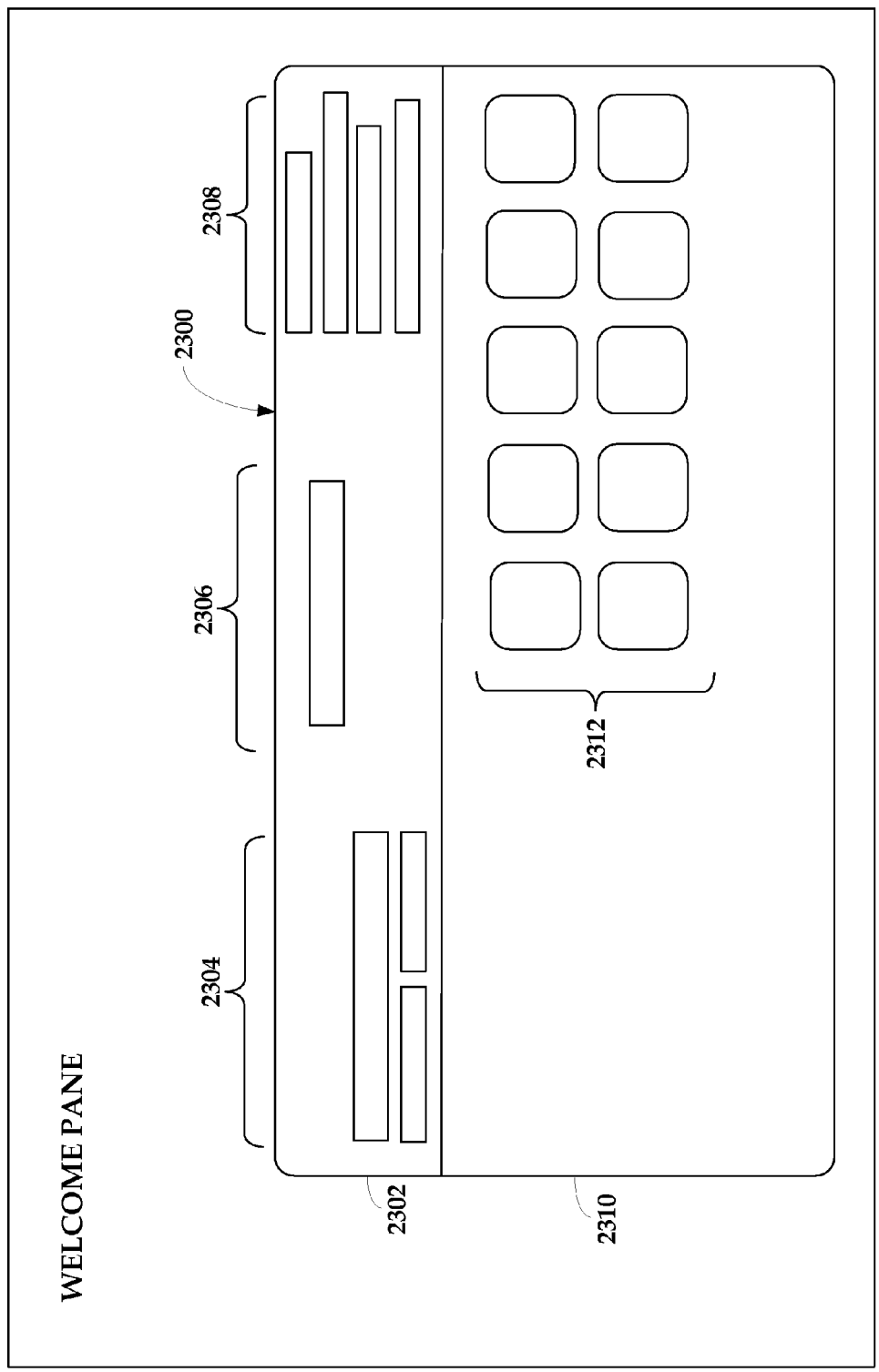
FIG. 52 is a schematic diagram of a welcome pane in a shell browser.

Referring next to FIG. 52, a schematic illustration is provided of a welcome pane 2300 in a shell browser. A welcome pane is sometimes referred to as a "null select" pane because it represents a namespace or container as opposed to a selection. If the user has not yet made a selection, a preview pane 2302 displays metadata 2304 and key tasks relating to the folder or shell library. If desired, the tasks may be separated into premiered tasks 2306 and other relevant tasks 2308. The welcome pane 2300 also includes a view area 2310, in which multiple files or other items 2312 may be viewed. The welcome pane metadata 2304 may include information such as properties of the container (e.g., MyPictures), in which case the metadata display may be static. Alternatively, the welcome pane metadata 2304 may include information such as a sampling of metadata from each of the items within the container, in which case the metadata display may change frequently. For example, the metadata display may be limited to properties of one item at a time by cycling from one item to the next every 30 seconds.

Figure 53:
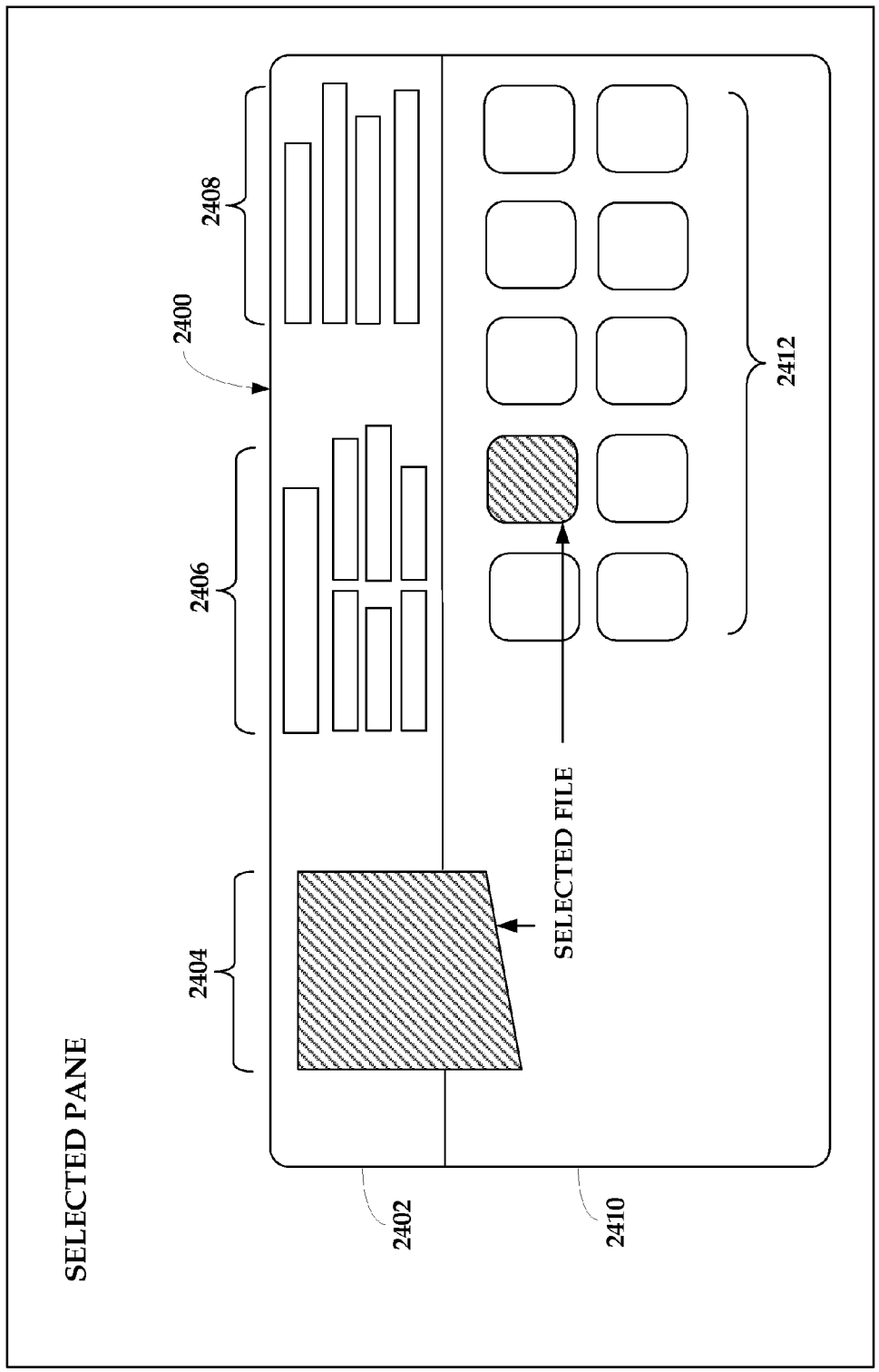
FIG. 53 is a schematic diagram of a selected pane in a shell browser.

FIG. 53 is a schematic illustration of a selected pane 2400 in a shell browser. As opposed to a welcome pane, a selected pane represents a selection by the user. If the user selects a container or folder, the selected pane need not be identical to the welcome pane for that container or folder. In FIG. 53, the selected pane 2400 includes a preview pane 2402 which contains a preview control 2404, a metadata display 2406 and a tasks display 2408. Like the welcome pane 2300 (in FIG. 52), the selected pane 2400 also includes a view area 2410, in which multiple files or other items 2412 may be viewed. In FIG. 53, however, the user has selected one of the files. Consequently, the preview control 2404 displays a preview image of the selected file, the metadata display 2406 shows properties of the selected file, and the tasks display 2408 provides a menu of relevant tasks for operating on the selected file.

Figure 54:
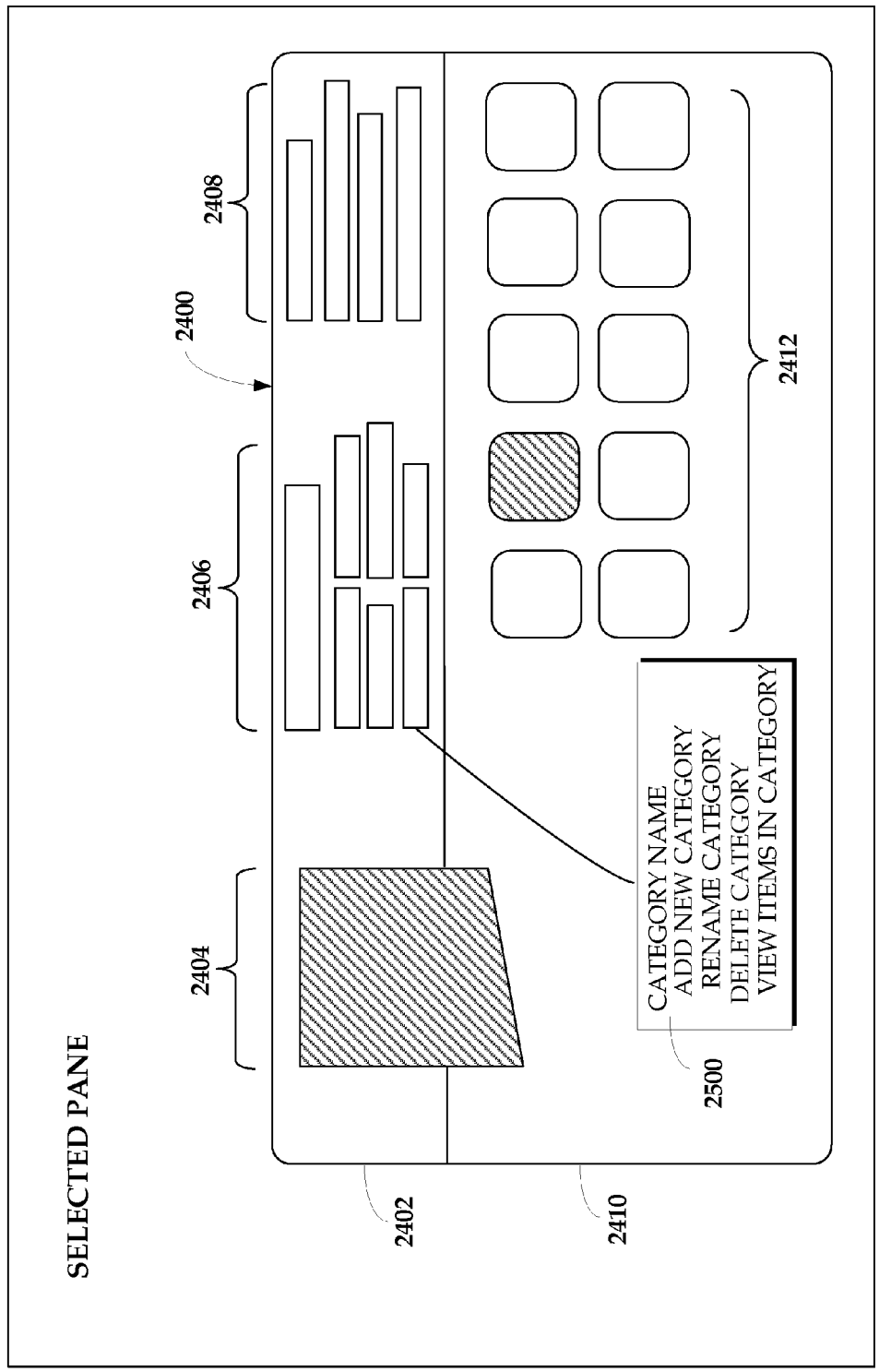
FIG. 54 is a schematic diagram of the selected pane of FIG. 53 including a context menu enabling a user to modify metadata in a shell browser in accordance with an embodiment of the present invention.

FIG. 54 is a schematic representation of the selected pane of FIG. 53 but which also includes a context menu 2500 to enable a user to modify metadata in a shell browser in accordance with an embodiment of the present invention. The context menu 2500 in FIG. 54 presents the user with several options for changing the selected metadata. The generic text shown in the menu 2500 is of course merely one example of the type of options which may be presented to a user for editing the displayed metadata. A context menu can be provided in any window, including a welcome pane, to improve the user experience. As those skilled in the art will appreciate, any number and variety of context menus could be supported by the present invention. For purposes of the present invention, one means for enabling user modifications to displayed metadata within a shell browser is to provide a context menu such as editable metadata context menu 2500. A user may summon the context menu, for example, by clicking on the corresponding text or object in the preview pane.

Those skilled in the art will appreciate that the present invention contemplates means other than context menus for enabling user modifications to displayed metadata within a shell browser. Another such means for is for the user to click on the metadata to enter an editing mode. By contrast, a user could enter an editing mode by hovering over the relevant text or object in the preview pane. Numerous alternative means are available and within the scope of the present invention.

Figure 55:
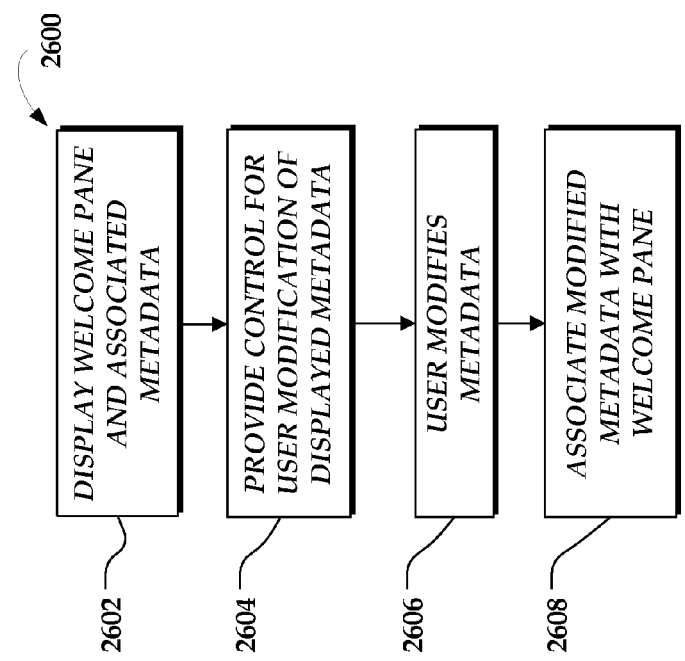
FIG. 55 is a flow diagram illustrating a method for enabling a user to modify metadata displayed in a welcome pane within a shell browser in accordance with an embodiment of the present invention.

FIG. 55 is a flow diagram illustrating a method 2600 for enabling a user to modify metadata displayed in a welcome pane within a shell browser in accordance with an embodiment of the present invention. The method 2600 includes displaying a welcome pane and metadata associated with the welcome pane at 2602. Then, at 2604, the method provides a control for user modification of the displayed metadata. When the user manipulates the control to modify the displayed metadata at 2606, the method then associates the modified metadata with the welcome pane at 2608 so that the modified metadata will be displayed the next time the welcome pane is displayed.

Figure 56:
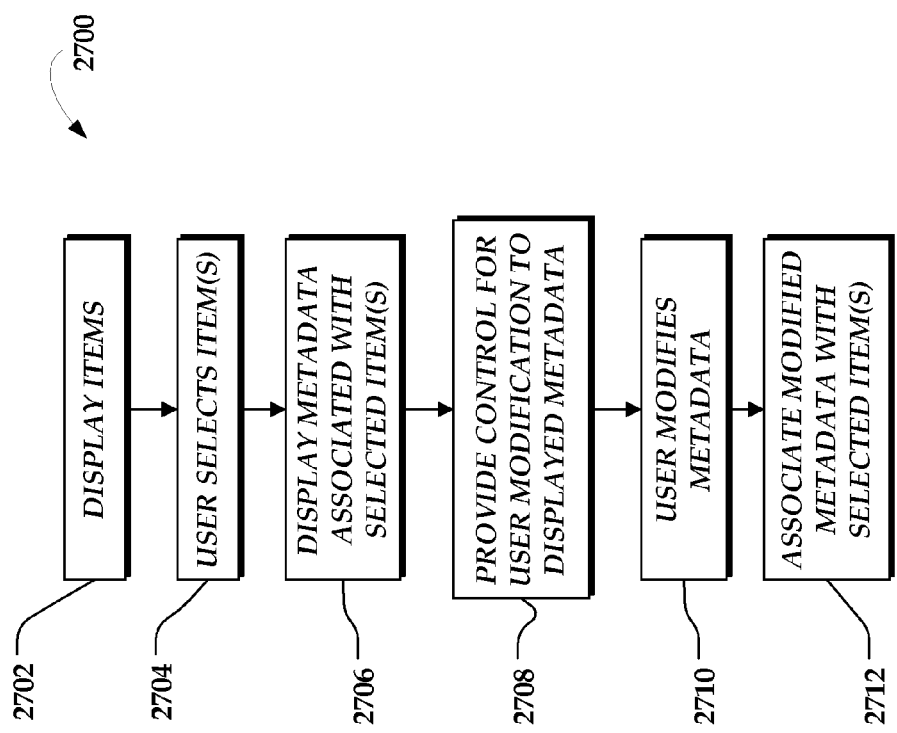
FIG. 56 is a flow diagram illustrating a method for enabling a user to modify metadata displayed in a selected pane within a shell browser in accordance with an embodiment of the present invention.

FIG. 56 is a flow diagram illustrating a method 2700 for enabling a user to modify metadata displayed in a selected pane within a shell browser in accordance with an embodiment of the present invention. At 2702, the method 2700 first displays a number of items, such as items in a welcome pane or items in a selected container. When the user selects one or more of the items at 2704, the method displays metadata associated with the selected item(s) at 2706. At 2708, the method provides a control for user modification of the displayed metadata. When the user manipulates the control to modify the displayed metadata at 2710, the method then associates the modified metadata with the selected item(s) at 2712 so that the modified metadata will be displayed the next time the selected item(s) is/are displayed.

In the event a user selects multiple items at 2704, the displayed metadata may include intersecting properties of the selected items, a union of properties, or perhaps a new property relevant to the selected items. Alternatively, the displayed metadata may include a rotating sample of metadata from each of the selected items (e.g., cycling from one selected item's metadata to the next selected item's metadata every 30 seconds). It is possible for the display of metadata which would result from a selection of all of the items to be identical to the display of metadata which would result from a null select.

Figure 57:
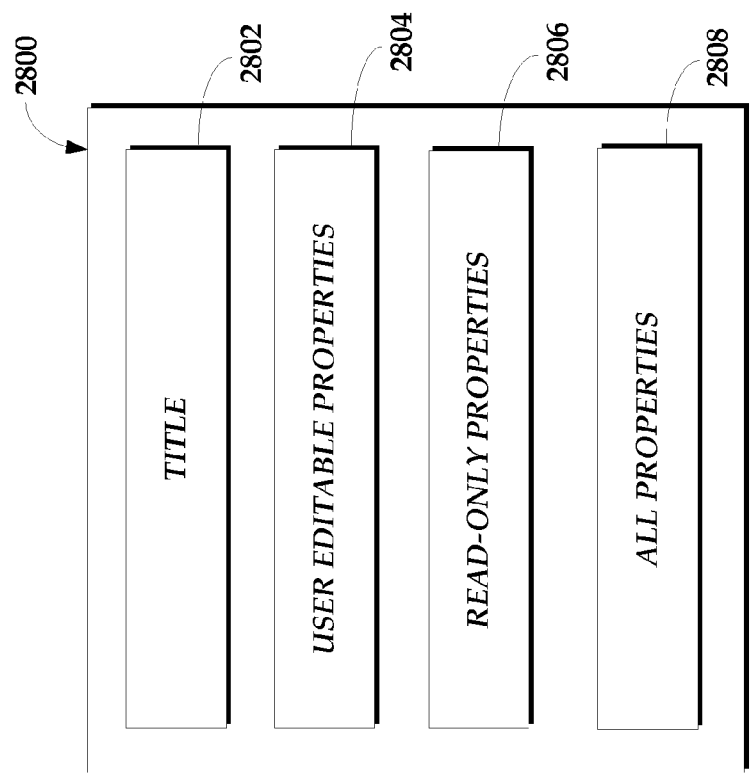
FIG. 57 is a block diagram of a data structure containing user modifiable metadata associated with an item displayed in a shell browser.

FIG. 57 is a block diagram of a data structure 2800 containing user modifiable metadata associated with an item displayed in a shell browser. The data structure 2800 includes a title field 2802 which indicates the name of the item. In the case of non-file items, the title field 2802 may contain the name of whatever property is used to alphabetize that item in a listview. The data structure 2800 includes a user editable properties field 2804 containing one or more properties associated with the displayed item, wherein the user editable properties are displayed in the shell browser with the displayed item. The data structure 2800 may optionally include a read-only properties field 2806 which contains any read-only properties associated with the displayed item and worthy of display in the shell browser. Given the size constraints of the metadata display in the shell browser, the number of properties in fields 2804 and 2806 may be limited. Consequently, the data structure 2800 may optionally include an all properties field 2808, which contains a link or pointer to a location (e.g., a property page) which contains all of the properties or metadata associated with the displayed item. Of course, the all properties field 2808 would not be necessary in the event that fields 2804 and 2806 contain all of the properties associated with the displayed item. The data structure 2800 is stored on one or more computer-readable media, such as in a file system or shell, to provide rich storage views, and thus an improved user experience, within the shell browser.

The present invention enables a number of scenarios which were not possible with conventional shell browsers. As a first example, a student can manage her projects using the preview pane. When she obtains new documents as part of a project she is working on, she can select those documents in her document library and enter the name of the document author and the name of the project into keyword fields using the edit control. Now the new documents will show up in her favorite view: "Documents Grouped by Keyword and Listed by Author." A second example of a new scenario enabled by the present invention involves an employee looking for materials for an upcoming ad campaign. As he browses through his employer's stock collection of photos using the shell browser, he selects a couple of pictures and, from the preview pane, adds a new keyword "Summer 2003 Campaign." Having updated the metadata for a multiple selection, the employee then pivots by keyword and can view all of the "Summer 2003 Campaign" files grouped together. Many other scenarios which take advantage of the present invention would be apparent to those skilled in the art.

FIGS. 58-66 are diagrams related to a system and method for extending the functionality of an object previewer in a shell browser configured to display a plurality of items representing multiple item types. As will be described in more detail below, a shell browser is provided which includes a default previewer and an extensibility mechanism. The default previewer provides a standard level of functionality for multiple item types. The extensibility mechanism enables functionality beyond the standard level provided by the default previewer for one or more of the item types.

Figure 58:
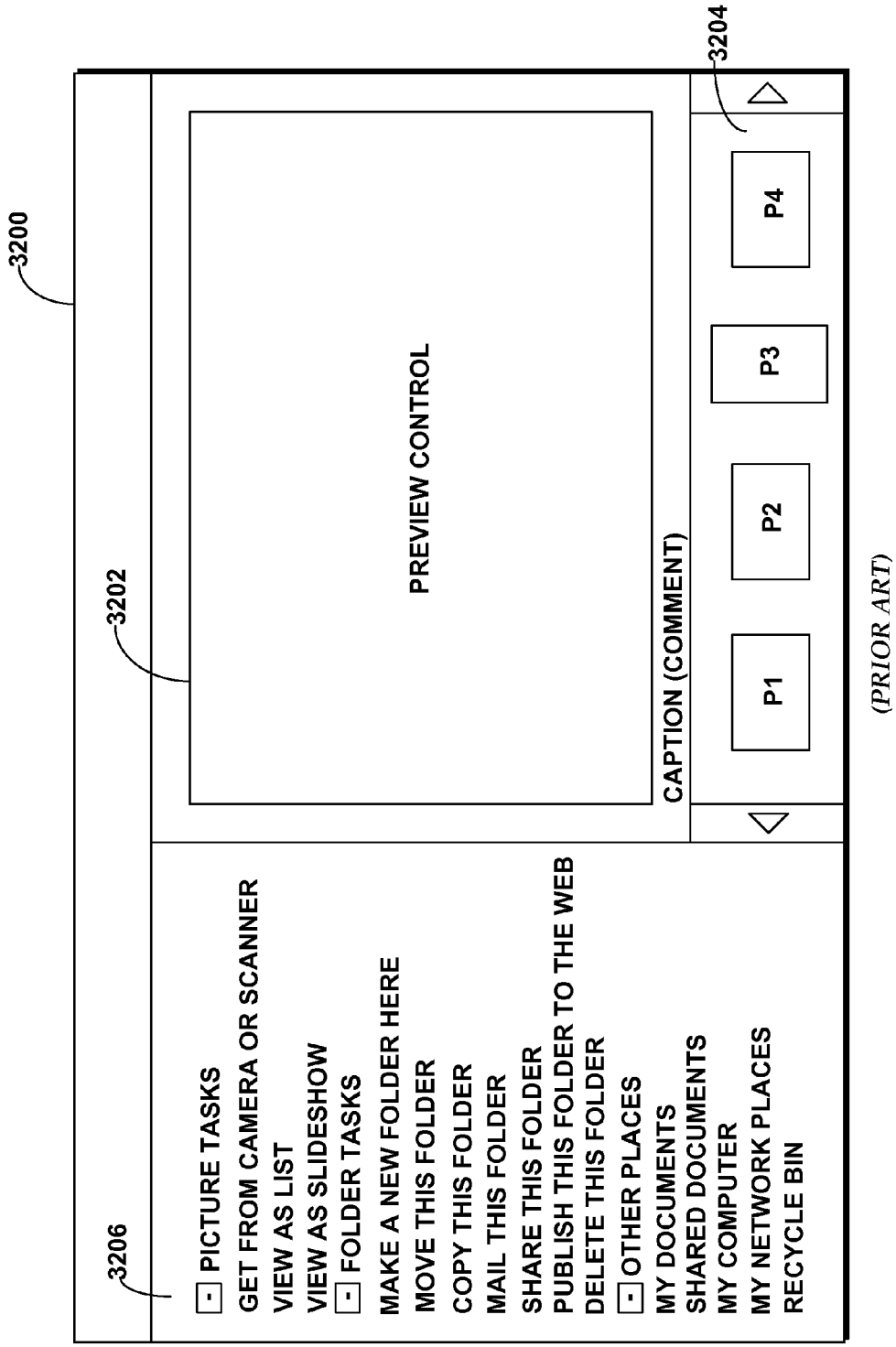
FIG. 58 is a schematic diagram of a prior art graphical user interface for browsing pictures stored in a folder within a shell browser environment which is used for viewing other non-pictorial files and folders.

FIG. 58 is a schematic diagram of a prior art graphical user interface for browsing pictures stored in a folder within a shell browser environment which is used for viewing other non-pictorial files and folders. As stated above, the need to readily identify items that are stored in a computing environment such as a PC is dramatically increasing. With respect to digital pictures, users traditionally had to invoke a third party software program in order to view a specific file on the PC. FIG. 58 illustrates a prior solution, a film strip view, which allows users to more readily view and identify the image associated with a given file within the graphical operating environment. The goal of film strip view was to alleviate the need for other software programs when browsing a folder of pictures by providing a quick iterative process that allows a user to preview a sizeable image of one or more picture files within the folder.

FIG. 58 relates to a system for browsing pictures stored in a folder, wherein a series of folder pictures is presented as a single row of thumbnails within an environment that is utilized for viewing other non-pictorial files and folders (i.e., a shell browser). It further allows a user to selectively cursor through the thumbnails, as it displays an enlarged preview image of a user selected thumbnail. FIG. 58 is a diagram of a representative window on a user's screen. As shown, the window 3200 is divided into several areas including a header region, a task option area 3206, a preview control area 3202, a caption or comment area and a filmstrip area 3204. The task option area 3206 contains a list of tasks that can be selected by a user in order to perform a wide variety of operations relating to the management of files and folders, as well as other system choices. Some of these operations are specific to the pictures in the filmstrip area 3204 and the preview control area 3202. The preview control area 3202 is a space in which an enlarged preview image of a user selected picture will be displayed. This space can also contain navigational icons to assist a user in iterating through a series of pictures. Immediately below the preview control area is a caption or comment area that can be utilized to display a variety of textual information. A film strip area 3204, provides a space to display a single row of thumbnail images P1, P2, P3, P4 of the picture files contained within a given folder. In addition, the film strip area 3204 also contains cursors to allow a user to scroll through a folder for the picture files. It should be noted that the filmstrip area 3204 can contain and display thumbnail images in mixed orientation. For instance, as shown in FIG. 58, P1, P2 and P4 are in landscape while P3 is in portrait.

A user can select any one of the thumbnail images, which will cause a larger preview image of the user thumbnail selection image to be displayed within the preview control area. In addition, user selection of a thumbnail image will also allow the user to select and perform any one of the tasks listed in the task option area 3206, with respect to the selected image. A first control button allows a user to quickly and successively preview an enlarged image of each of the thumbnail images within a given folder, by iterating in one direction. In other words, a user would not have to specifically "click" on each and every successive thumbnail image in order to preview the picture. Instead the user will merely click on the first control button repeatedly to move through the folder. A second control button performs a similar iteration function but only in the opposite direction.

Figure 59:
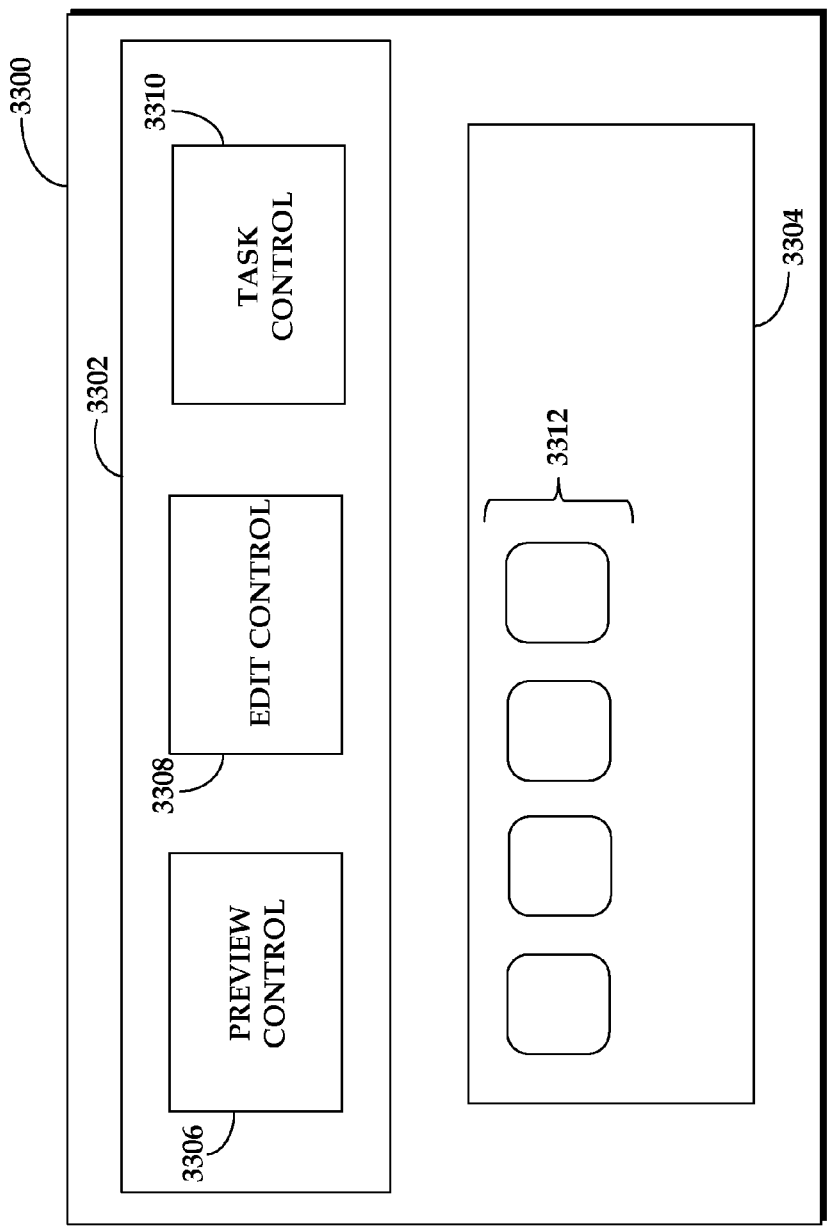
FIG. 59 is a block diagram of an exemplary graphical user interface for a shell browser.

Turning to FIG. 59, a window 3300 represents a screen-size display area for a graphical user interface of a general purpose shell browser. The window 3300 contains a preview pane area 3302 and a view area 3304. The preview pane 3302 may include a preview control 3306, an edit or metadata control 3308, and a task control 3310. Typically, the preview control 3306 will provide the user with an image or other visual display of the item being previewed (e.g., a selected file). The preview control 3306 may also present the user with controls such as iterator buttons which allow the user to shift the focus from one item to the next by clicking a mouse button. The edit control 3308 not only includes a display of key properties of the previewed item, it also presents the user with a control for making edits to the metadata. The task control 3310 contains tasks relevant to the namespace and/or the selection.

Those skilled in the art will appreciate that the present invention contemplates the presence of optional features within the window 3300. For example, the metadata control 3208 and the task control 3210 are not essential features for purposes of the present invention. Moreover, other non-essential features which are not shown in FIG. 59, such as a toolbar which includes iterator buttons or a show/hide button so the user can open/close the preview pane, are also within the scope of the present invention. Nevertheless, these and other optional features may assist the user in readily locating a particular item in the shell browser.

The view area 3304 provides a listview of one or more items 3312, such as file system files or folders. The term "listview" refers to an enumeration or list of items within a container. The terms "item" and "shell item" are used interchangeably herein to refer to files, folders and other such containers, and other non-file objects which can be represented in a listview. Similarly, "shell item" refers to an item in a shell library. Examples of non-file objects may include, but would not be limited to, contacts, favorites and email messages. The terms "shell browser" and "file system browser" are used interchangeably herein to refer to a browser which allows a user to navigate through various namespaces including files and other non-file items.

Those skilled in the art will appreciate that the present invention contemplates many possible designs and layouts for the window 3300. For example, the preview pane 3302 is shown above the view area 3304 in FIG. 59. However, other layouts, such as placing the preview pane 3302 and the view area 3304 side-by-side, are clearly within the scope of the present invention. There are also many possible views for the items depicted in view area 3304, such as details, slide show, filmstrip, thumbnail, tiles, icons, etc.

Figure 60:
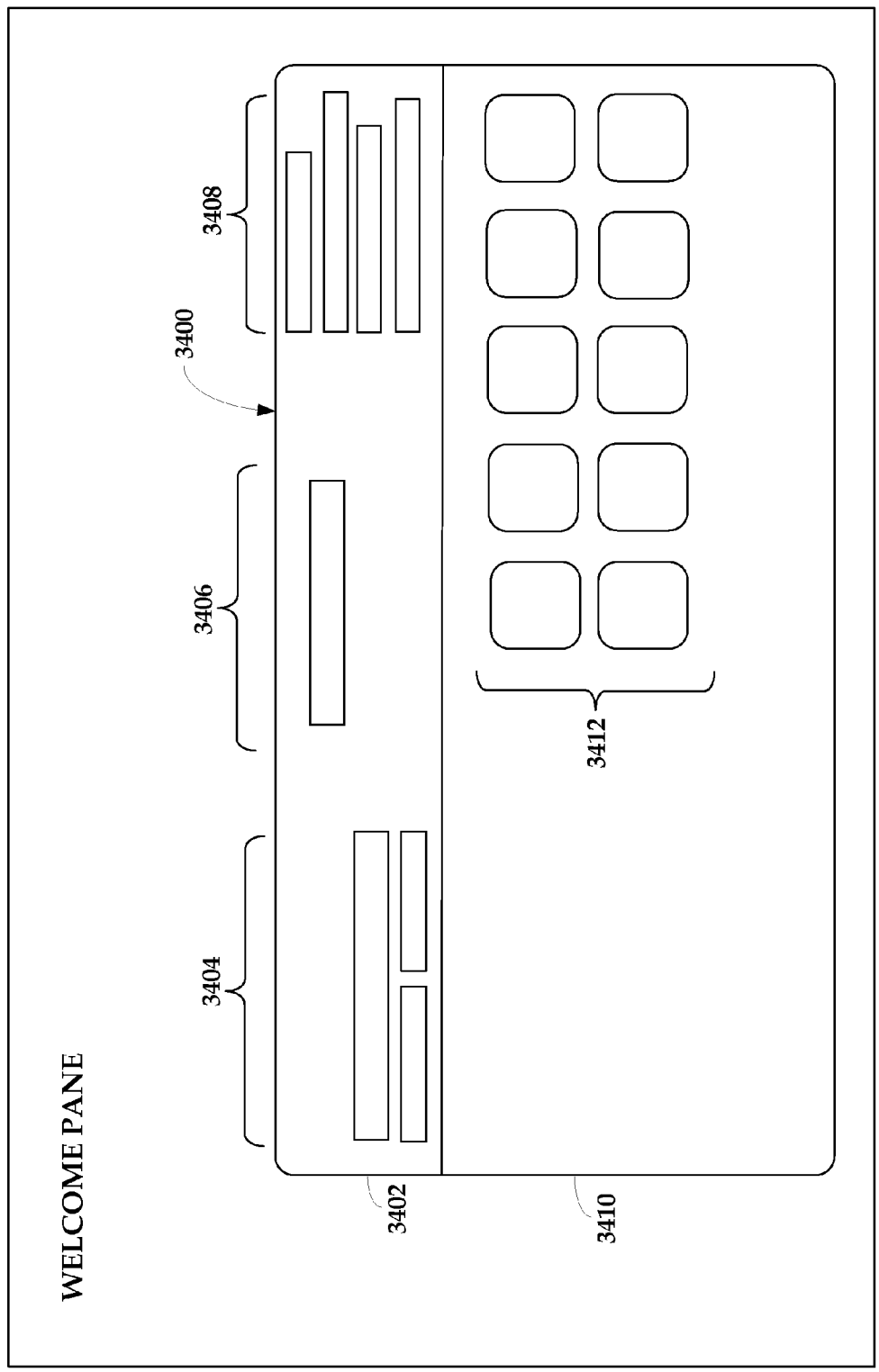
FIG. 60 is a schematic diagram of a welcome pane in a shell browser.

Referring next to FIG. 60, a schematic illustration is provided of a welcome pane 3400 in a shell browser. A welcome pane is sometimes referred to as a "null select" pane because it represents a namespace or container as opposed to a selection. If the user has not yet made a selection, a preview pane 3402 displays metadata 3404 and key tasks relating to the folder or shell library. If desired, the tasks may be separated into premiered tasks 3406 and other relevant tasks 3408. The welcome pane 3400 also includes a view area 3410, in which multiple files or other items 3412 may be viewed. The welcome pane metadata 3404 may include information such as properties of the container (e.g., MyPictures), in which case the metadata display may be static. Alternatively, the welcome pane metadata 3404 may include information such as a sampling of metadata from each of the items within the container, in which case the metadata display may change frequently. For example, the metadata display may be limited to properties of one item at a time by cycling from one item to the next every 30 seconds.

Figure 61:
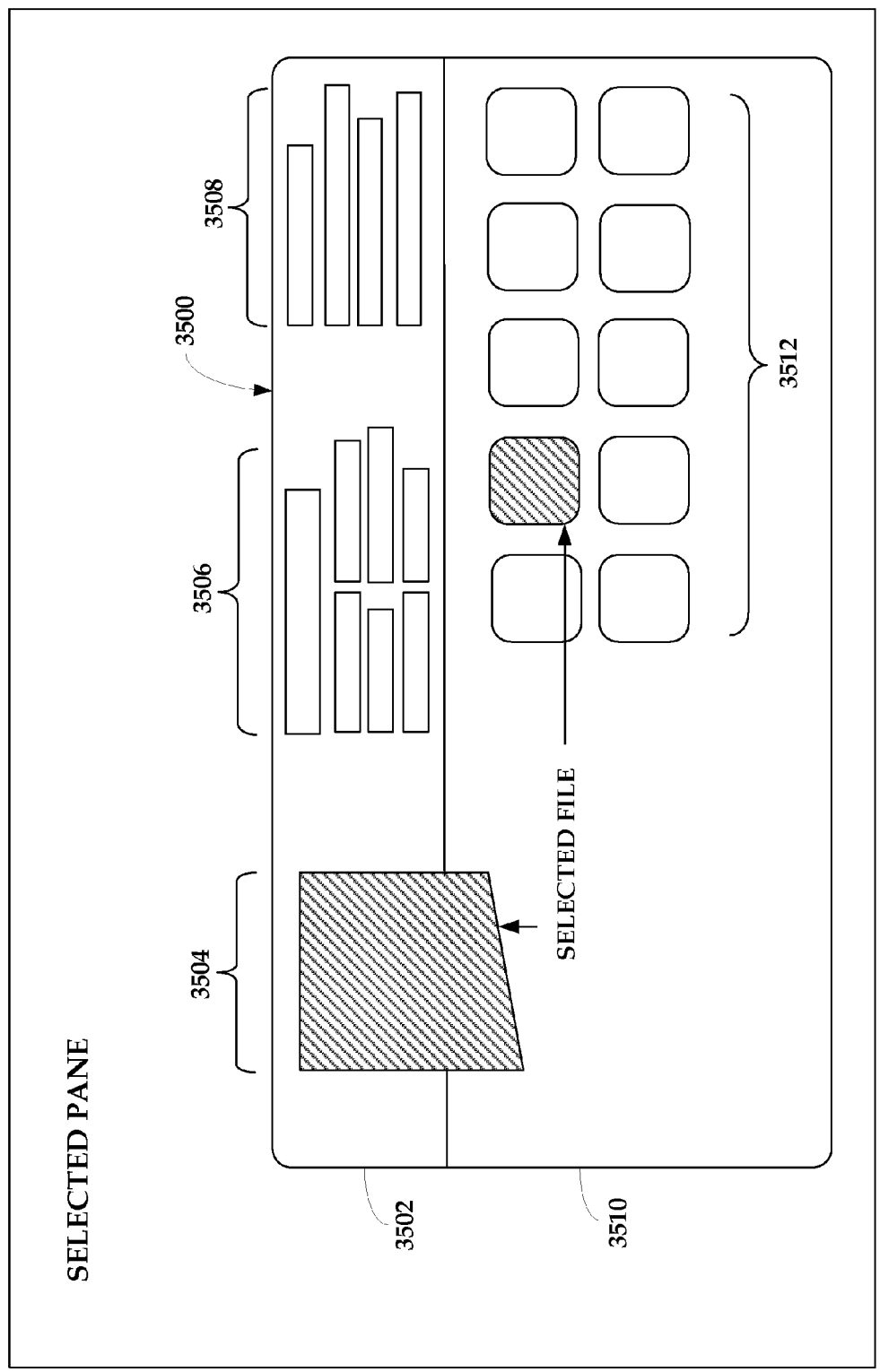
FIG. 61 is a schematic diagram of a selected pane in a shell browser.

FIG. 61 is a schematic illustration of a selected pane 3500 in a shell browser. As opposed to a welcome pane, a selected pane represents a selection by the user. If the user selects a container or folder, the selected pane need not be identical to the welcome pane for that container or folder. In FIG. 61, the selected pane 3500 includes a preview pane 3502 which contains a preview control 3504, a metadata display 3506 and a tasks display 3508. Like the welcome pane 3400 (in FIG. 60), the selected pane 3500 also includes a view area 3510, in which multiple files or other items 3512 may be viewed. In FIG. 61, however, the user has selected one of the files. Consequently, the preview control 3504 displays a preview image of the selected file, the metadata display 3506 shows properties of the selected file, and the tasks display 3508 provides a menu of relevant tasks for operating on the selected file.

Figure 62:
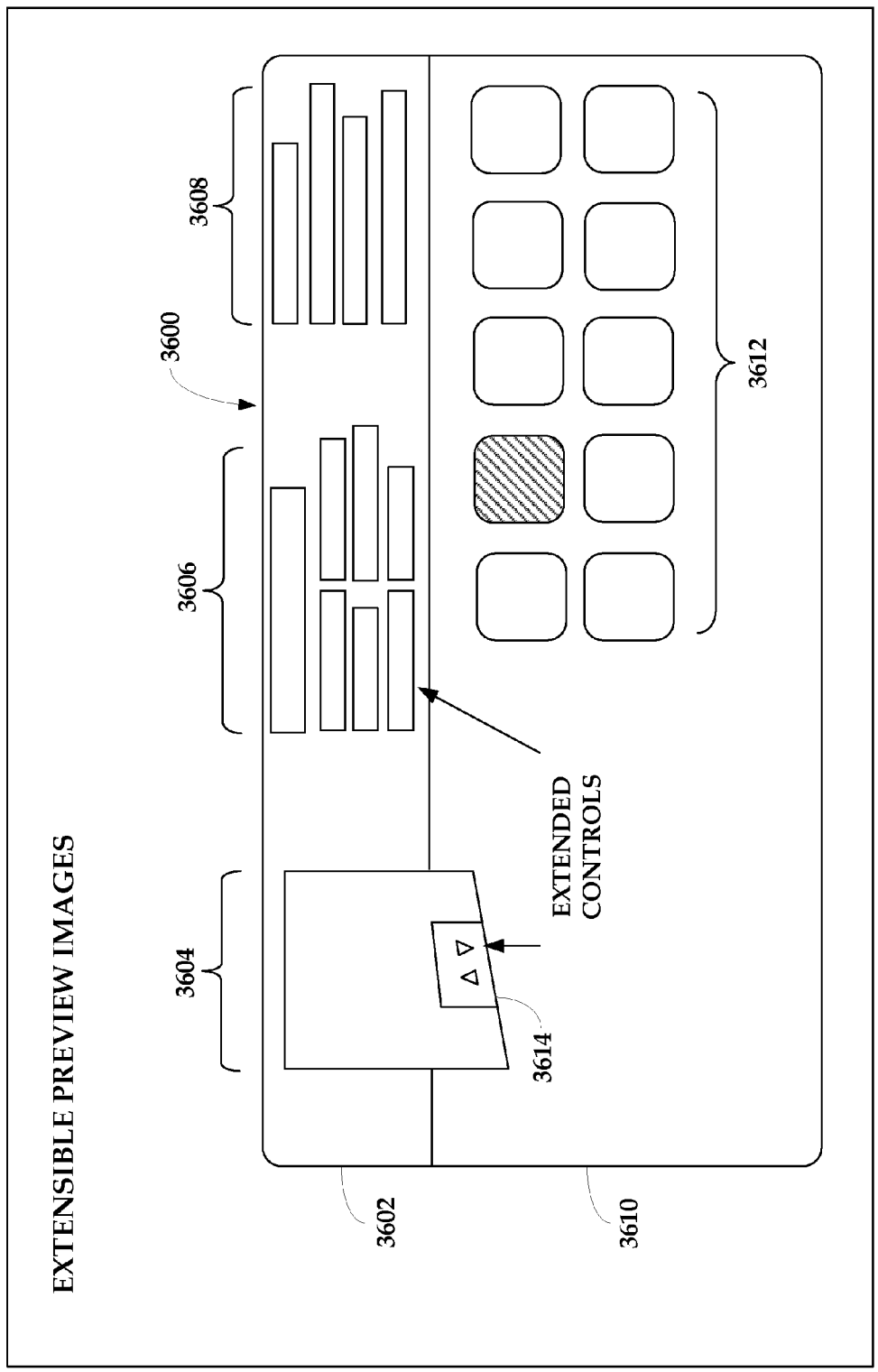
FIG. 62 is a schematic diagram of a selected pane in a shell browser with extended controls in accordance with an embodiment of the present invention.

FIG. 62 is a schematic diagram of a selected pane similar to the selected pane of 3500 of FIG. 61 but with extended controls in accordance with an embodiment of the present invention. The selected pane 3600 includes a preview pane 3602 which contains a preview control 3604 having extended controls 3614, a metadata display 3606 and a tasks display 3608. The selected pane 3600 also includes a view area 3610, in which multiple files or other items 3612 may be viewed. The user has selected one of the files 3612, so the preview control 3604 displays a preview image of the selected file, the metadata display 3606 shows properties of the selected file, and the tasks display 3608 provides a menu of relevant tasks for operating on the selected file.

The extended controls 3614 represent a level of functionality beyond what is typically available from a shell browser. For example, a default preview pane or preview control, such as those shown in FIGS. 58 and 61, may simply display a preview image of a selected item. If the item is a word processing document or slide presentation, the default preview image may be the first page of the document or slide deck. However, by extending the functionality of the preview image to make it more interactive, a user can quite easily manipulate extended controls 3614 to page through the document or slide presentation. This enhanced level of functionality improves the user experience because it allows the user to more comprehensively browse the previewed item without opening it, which is particularly useful for files that are not readily identifiable based on the first page alone.

Extended controls 3614 can be made available to the user as part of an alternative previewer in a shell browser. The term "previewer" can refer to a preview control or to the a preview pane which includes a preview control. The present invention contemplates a shell browser which provides the user with a default previewer offering a standard level of functionality for multiple item types and one or more alternative previewers offering a different level of functionality for particular item types to enhance the user experience. Opening up the development of alternative previewers to independent software vendors (ISVs) and other third party developers adds value to the file browsing experience by showing relevant aspects of the file in an easily recognizable way. The present invention contemplates custom previewers for numerous file types and non-file item types including, but not limited to, image files, video files, contacts, games, scanners, video cameras, document files, spreadsheet files, slide presentation files, drawing files and tablet ink files.

The present invention enables a number of scenarios which were not possible with conventional shell browsers, some of which have been described above. Third parties are allowed to describe and demonstrate their file types by providing code that can look inside the file type and provide a meaningful image that a user will understand. For example, Apple could implement a QuickTime™ preview control, which would be displayed when the user selects a QuickTime™ file in the shell browser. This preview control could provide an alternative or extended level of functionality beyond the default previewer in the shell of an operating system, including functionality such as showing the first five seconds of a QuickTime™ movie and/or offering buttons and controls for the user to launch the QuickTime™ player. An alternative previewer for a music file could provide similar extended functionality. As those skilled in the art will appreciate, the possibilities for extended functionality in an alternative previewer are unlimited.

Figure 63:
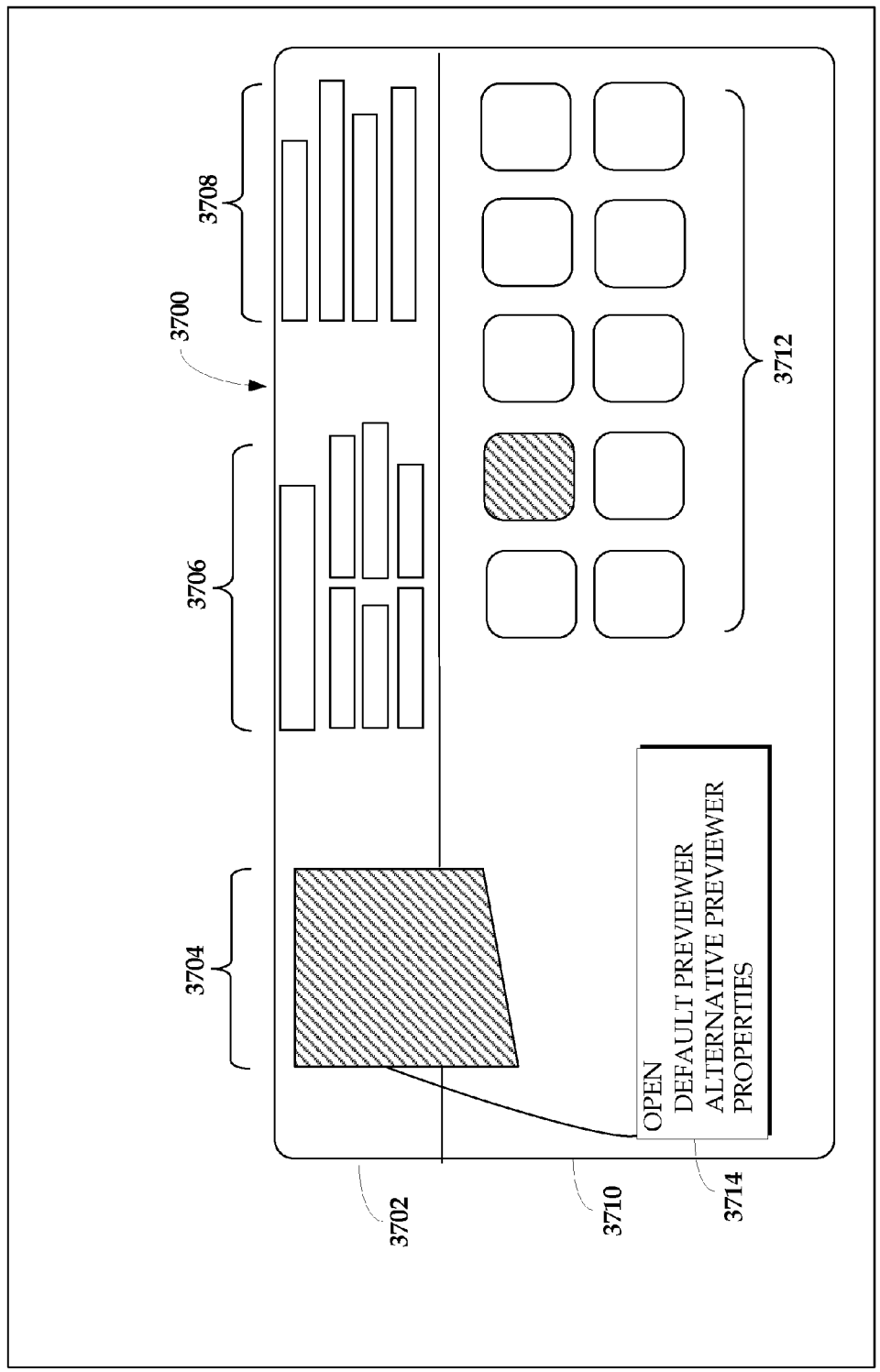
FIG. 63 is a schematic diagram of a selected pane similar to FIG. 61 but including a context menu enabling a user to select a previewer in a shell browser in accordance with an embodiment of the present invention.

FIG. 63 is a schematic representation of a selected pane similar to FIG. 61 but which also includes a context menu 3714 to enable a user to modify metadata in a shell browser in accordance with an embodiment of the present invention. The selected pane 3700 includes a preview pane 3702 which contains a preview control 3704, a metadata display 3706 and a task control 3708. The selected pane 3700 also includes a view area 3710, in which multiple files or other items 3712 may be viewed. Those skilled in the art will appreciate that, for purposes of the present invention, the metadata control 3706 and the task control 3708 are not essential features. The present invention contemplates the presence of these and/or other optional features which may assist the user in readily locating a particular item in the shell browser or otherwise enhance the user experience.

The context menu 3714 in FIG. 63 presents the user with several options, including the choice of selecting either the default previewer or an alternative previewer for the selected item. The generic text shown in the menu 3714 is of course merely one example of the type of options which may be presented to a user for selecting a previewer. A context menu can be provided in any window, including a welcome pane, to improve the user experience. As those skilled in the art will appreciate, any number and variety of context menus could be supported by the present invention. For purposes of the present invention, one means for enabling user selection of a previewer within a shell browser is to provide a context menu such as context menu 3714. A user may summon the context menu, for example, by clicking on the corresponding text or object in the preview pane.

Those skilled in the art will appreciate that the present invention contemplates means other than context menus for selecting a previewer for the displayed items from a plurality of available previewers within a shell browser. Another such means is for the user to click on the preview control to enter a selection mode. Similarly, the user may be prompted to select a previewer by right-clicking within the preview pane. By contrast, a user could enter a selection mode by hovering over relevant text or over a relevant object in the preview pane. Numerous alternative means are available and within the scope of the present invention.

Figure 64A:
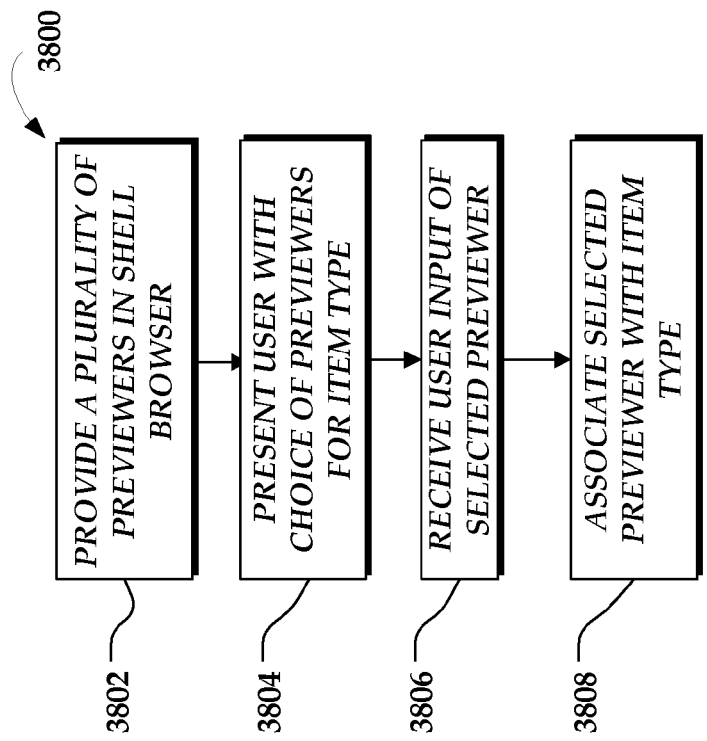
FIG. 64A is a flow diagram illustrating a method for enabling a user to select a previewer in a shell browser in accordance with an embodiment of the present invention.

FIG. 64A is a flow diagram illustrating a method 3800 for enabling a user to select a previewer in a shell browser which supports multiple item types in accordance with an embodiment of the present invention. The method 3800 provides a plurality of previewers in the shell browser at 3802. The plurality of previewers may include a default previewer for multiple item types and one or more alternative previewers for particular item types. These alternative previewers may include installed applications developed by a third party. At 3804, the method 3800 presents the user with a choice of two or more previewers for a particular item type. The prompt to select a previewer may be initiated by the shell browser (e.g., upon displaying a new item type) and/or by the user (e.g., by clicking on an object to display a context menu). Upon receiving an input from the user at 3806 indicating a selection of one of the previewers for the particular item type, the method 3800 then associates the selected previewer with the particular item type at 3808. The selected previewer will remain in use until the user selects a different one. However, if the selected previewer is an installed application, uninstalling the application will also terminate the use of the selected previewer.

Figure 64B:
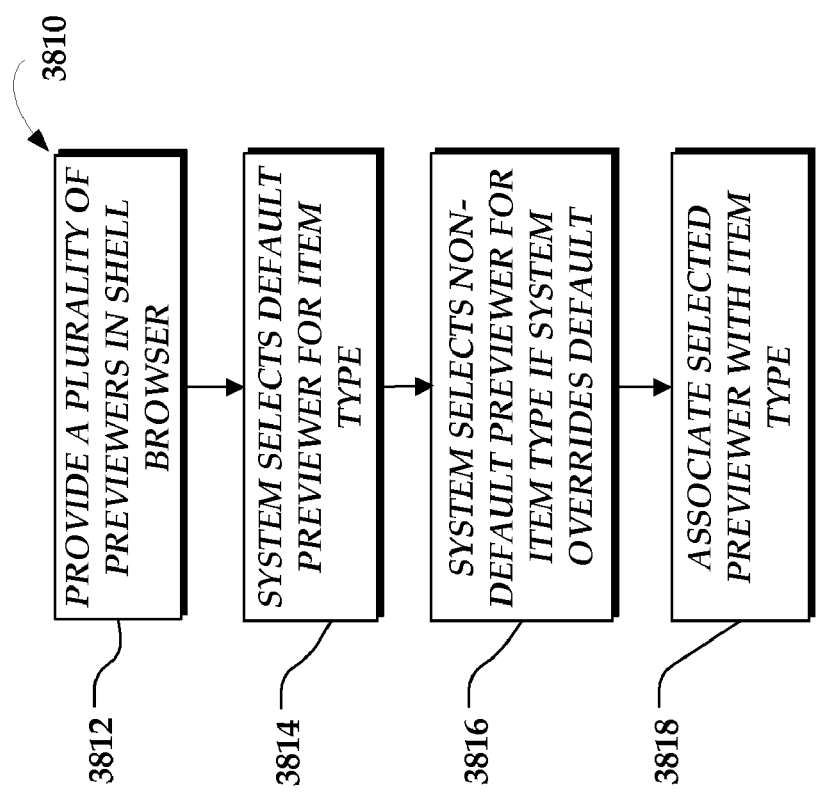
FIG. 64B is a flow diagram illustrating a method for enabling the system to select a previewer in a shell browser in accordance with an embodiment of the present invention.

FIG. 64B is a flow diagram illustrating a method 3810 for automatically selecting a previewer in a shell browser which supports multiple item types in accordance with an embodiment of the present invention. The method 3810 provides a plurality of previewers in the shell browser at 3812. The plurality of previewers may include a default previewer for multiple item types and one or more alternative previewers for particular item types. These alternative previewers may include installed applications developed by a third party.

At 3814, the system (as opposed to the user) automatically and transparently selects a default previewer from two or more available previewers for a particular item type. The system may select a previewer in response to an event such as display of a new item type or the presence of an alternative previewer. The system is configured to select a default previewer based on logical rules. Under exceptional circumstances, the system may decide at 3816 to override the rules and select a previewer that would not have been selected under the applicable rules. For example, if the rule is to select a newly available previewer over the current default previewer, an installed application may generally have the authority to change the default previewer to the previewer now available from the installed application. However, the shell browser, for example, may reserve the right to override the change proposed by the newly installed application. For instance, an override may be appropriate when the newly installed application cannot be authenticated as a proper owner of the item type in question.

In any event, the method 3810 then associates the selected previewer with the particular item type at 3818. The selected previewer will remain in use until a different one is selected. However, if the selected previewer is an installed application, uninstalling the application will also terminate the use of the selected previewer.

Referring next to FIG. 65, a flow diagram illustrates a method 3900 for enabling the use of third party previewers in a shell browser which supports multiple item types in accordance with an embodiment of the present invention. The method 3900 includes providing a shell browser having a default previewer for the multiple item types at 3902. The method 3900 further includes providing an extensibility mechanism for third party development of an alternative previewer for at least one of the multiple item types at 3904. The alternative previewer may be registered in the shell browser at 3906. In the case of an installed application, registration may occur substantially at the time of installation. For example, if the application is installed by an OEM, the alternative previewer may be registered before the user has acquired the computer. Alternatively, the user may install the application locally or remotely.

There are many possible approaches for the extensibility mechanism referenced above in 3904. One such approach involves exposing a set of application program interfaces (APIs) so that independent software vendors (ISVs) and other third party developers may develop alternative previewers. With the API approach, a registration mechanism exists which allows an ISV to associate their preview control with an item type owned by the ISV. When an item or file of that type is selected in the shell browser, the ISV's preview control is instantiated via this registration mechanism and the extensibility API. The API provides data to the preview control: data representing the selected item(s) in the view and data representing the parent container of the items in the view. The preview control operates on this data and provides a user interface through the API which is presented in the shell browser. The user may provide input with keystrokes and mouse events which are passed by the shell browser to the preview control which can operate on those user input events.

Those skilled in the art will appreciate that many approaches are possible in the context of the extensibility mechanism of the present invention. In addition to the API approach, similar functionality may be achieved via user configuration, a pointer to HTML or hosting a flash. Moreover, the extensibility model may require that only one application that owns the item type selected may provide only one alternative previewer. In other words, the number of available previewers may be limited to a default previewer and one alternative previewer to avoid a poor user experience in which multiple registered, extended previewers are in competition with one another. However, another model would be to allow any application that can handle the selected item type to provide one additional previewer. An alternative model would allow any running code to provide one additional previewer for any item type. It may also be desirable under certain circumstances to allow replacement or removal of the default previewer. Many other models are possible and are contemplated by the present invention.

Figure 66:
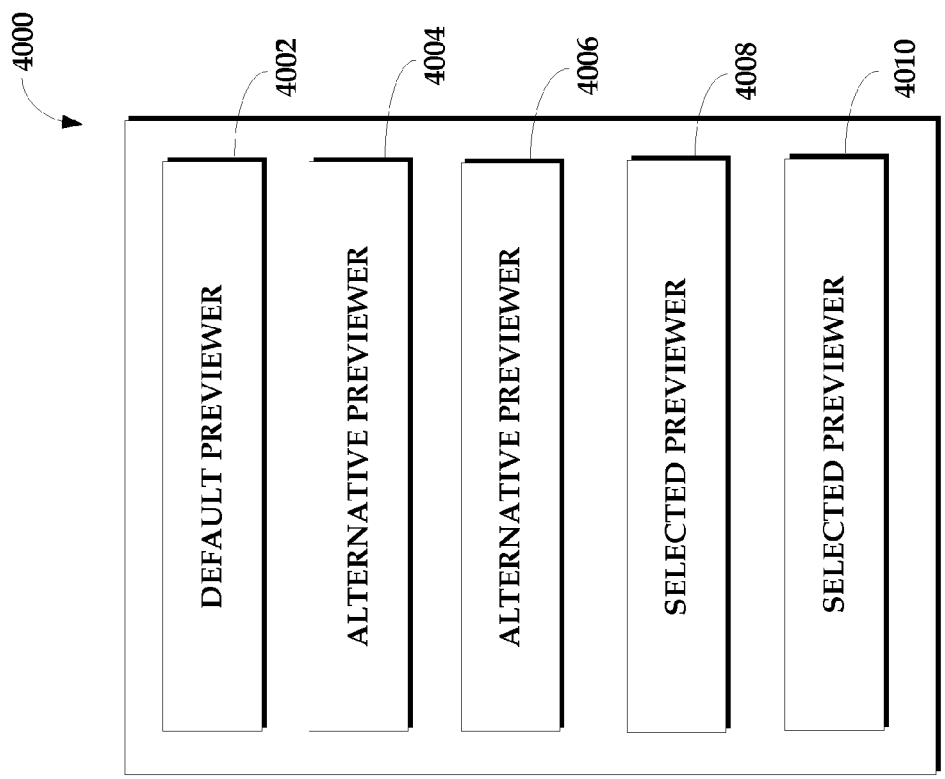
FIG. 66 is a block diagram of a data structure containing information indicative of multiple previewers in a shell browser.

FIG. 66 is a block diagram of a data structure 4000 which is stored on one or more computer-readable media and which contains information indicative of a plurality of previewers in a shell browser. The data structure 4000 includes a default previewer field 4002 containing information indicative of a default previewer which supports multiple item types. An alternative previewer field 4004 contains information indicative of an alternative previewer for a first item type. Another alternative previewer field 4006 may contain information indicative of a second alternative previewer for the first item type, or it may contain information indicative of an alternative previewer for a second item type. Those skilled in the art will appreciate that in some cases there may only be one alternative previewer field, and in other cases there may be two or more alternative previewer fields. The selected previewer field 4008 contains information indicative of whether to invoke the default previewer or an alternative previewer when items of a particular item type are displayed in the shell browser. In the event that field 4006 contains information indicative of an alternative previewer for a second item type, a selected previewer field 4010 may contain information indicative of whether to invoke the default previewer or the alternative previewer when one or more items of the second item type are displayed in the shell browser. The information contained in fields 4002, 4004 and/or 4006 may comprise the previewer code which is configured to run when a user selects an object of that type.

While the preferred embodiment of the invention has been illustrated and described, it will be appreciated that various changes can be made therein without departing from the spirit and scope of the invention. For example, it will be appreciated that the locations of the various UI features that are shown herein are illustrative and may be altered, and that different placements of the various UI features will still fall within the spirit and scope of the invention. Furthermore, the different aspects of the invention described herein may be formed in various combinations, also without departing from the spirit and scope of the invention.

The invention claimed is:

1. In a computer system with a display and a memory for storing items, a method for presenting collections of the items, comprising:

creating a library to contain items with one or more specified metadata properties;

automatically grouping items with the one or more specified metadata properties into the library into a plurality of groups;

providing one or more tools for manipulating items in the library, wherein the groups of items are each contained within a different virtual folder associated with respective ones of the specified metadata properties, and the one or more tools includes a tool configured to copy additional items into one of the virtual folders responsive to associating another metadata property with the virtual folder; and a virtual address bar method for providing a virtual path to items stored in a computer file system using a virtual address bar, the virtual address bar method comprising:

displaying a virtual address bar operable to include a first interactive segment, wherein the first interactive segment references items on the computer file system according to a corresponding filter for selecting items; and adding one or more additional interactive segment to the virtual address bar, wherein each additional interactive segment further restricts the items referenced by the preceding interactive segments;

wherein the first interactive segment and the one or more additional interactive segments comprise a virtual path.

2. The method of claim 1, further comprising a shell browser method for enabling a user to modify metadata within a shell browser, the shell browser method comprising:

displaying a plurality of items;

receiving a first input from the user representing a selection of at least one displayed item;

displaying metadata associated with the at least one selected item; and providing a control for user modification of the displayed metadata.

3. The method of claim 1, further comprising providing a shell browser, the shell browser comprising:

a window which displays a group of items, wherein the window also displays metadata values associated with one or more of the displayed items; and an edit control which permits user modification of at least a portion of the metadata values displayed in the window.

4. The method of claim 1, further comprising a previewer method for enabling the use of third party previewers in a shell browser which supports multiple item types, the previewer method comprising:

providing a shell browser having a default previewer for the multiple item types; and providing an extensibility mechanism which enables a third party to develop an alternative previewer for at least one of the multiple item types.

5. The method of claim 1, further comprising providing a shell browser configured to display a plurality of items representing multiple item types, the shell browser comprising:
  a default previewer which provides a standard level of functionality for multiple item types; and
  an extensibility mechanism which enables functionality beyond the standard level provided by the default previewer for one or more of the multiple item types.

6. The method of claim 1, further comprising providing a virtual address bar user interface control for selecting items accessible to a computer system for display, the virtual address bar comprising:
  a plurality of interactive segments, wherein each interactive segment corresponds to a filter for selecting items for display.

7. The method of claim 1, further comprising a method of filtering items, the method of filtering items comprising:
  providing a plurality of display objects on the display that each represent one or more items;
  filtering the items represented by the display objects based on a filter term; and
  modifying the display objects that are provided on the display so as to represent the items that remain after the filtering of the items.

8. The method of claim 1, further comprising a method for displaying items, the method for displaying items comprising:
  defining a scope of the physical memory locations from which items are to be drawn, the scope comprising a present computer memory and at least one other physical location;
  receiving a query, and in response to the query, drawing items from the physical locations as defined in the scope; and
  presenting the items drawn from the query in a view on the display.

9. The method of claim 1, further comprising a method for representing the items to a user, the method for representing the items to the user comprising:
  providing a database that allows both non-file items and file items to be searched by a query;
  receiving a query, and in response to the query drawing both non-file items and file items that match the query; and
  presenting both the non-file items and file items that match the query on the display.

10. A system for exposing items that are stored in a memory to a user, comprising:
  a folder processor that obtains queries from a user;
  a relational database for storing information about items, wherein:
    the folder processor obtains a query from a user and passes the query to the relational database, wherein the query is a default query identified in a registry;
    the relational database provides results back to the folder processor; and
    based on the results from the relational database, the folder processor provides the results to the user as virtual folders; and
  a virtual address bar for providing a virtual path to items stored in a computer file system, the virtual address bar comprising:
    a virtual address bar operable to include a first interactive segment, wherein the first interactive segment references items on the computer file system according to a corresponding filter for selecting items; and
    one or more additional interactive segments of the virtual address bar, wherein each additional interactive segment further restricts the items referenced by the preceding interactive segments;
    wherein the first interactive segment and the one or more additional interactive segments comprise a virtual path.

11. The system of claim 10, further comprising a shell browser method for enabling a user to modify metadata within a shell browser, the shell browser method comprising:
  displaying a plurality of items;
  receiving a first input from the user representing a selection of at least one displayed item;
  displaying metadata associated with the at least one selected item; and
  providing a control for user modification of the displayed metadata.

12. The system of claim 10, further comprising a shell browser, the shell browser comprising:
  a window which displays a group of items, wherein the window also displays metadata values associated with one or more of the displayed items; and
  an edit control which permits user modification of at least a portion of the metadata values displayed in the window.

13. The system of claim 10, further comprising a previewer for enabling the use of third party previewers in a shell browser which supports multiple item types, the previewer comprising:
  a shell browser having a default previewer for the multiple item types; and
  an extensibility mechanism which enables a third party to develop an alternative previewer for at least one of the multiple item types.

14. The system of claim 10, further comprising a shell browser configured to display a plurality of items representing multiple item types, the shell browser comprising:
  a default previewer which provides a standard level of functionality for multiple item types; and
  an extensibility mechanism which enables functionality beyond the standard level provided by the default previewer for one or more of the multiple item types.

15. The system of claim 10, further comprising a virtual address bar user interface control for selecting items accessible to a computer system for display, the virtual address bar comprising:
  a plurality of interactive segments, wherein each interactive segment corresponds to a filter for selecting items for display.

16. The system of claim 10, further comprising a method of filtering items, the method of filtering items comprising:
  providing a plurality of display objects on the display that each represent one or more items;
  filtering the items represented by the display objects based on a filter term; and
  modifying the display objects that are provided on the display so as to represent the items that remain after the filtering of the items.

17. The system of claim 10, further comprising a method for presenting collections of the items, the method of presenting collections of the items comprising:
  creating a library to contain items with one or more specified metadata properties;
  automatically grouping items with the one or more specified metadata properties into the library; and
  providing one or more tools for manipulating items in the library.

18. The system of claim 10, further comprising a method for displaying items, the method for displaying items comprising:
- defining a scope of the physical memory locations from which items are to be drawn, the scope comprising a present computer memory and at least one other physical location;
- receiving a query, and in response to the query, drawing items from the physical locations as defined in the scope; and
- presenting the items drawn from the query in a view on the display.

19. In a computer system having a display and a memory for storing items, the items having associated metadata properties, a method of exposing the items to a user, the method comprising:
- responsive to a user opening a first virtual folder, selecting a first metadata property based on default information corresponding to the user;
- searching for items that have the selected first metadata property;
- providing the first virtual folder display object that represents the collection of items that have the first metadata property; and
- a virtual address bar method for providing a virtual path to items stored in a computer file system using a virtual address bar, the virtual address bar method comprising:
  - displaying a virtual address bar operable to include a first interactive segment, wherein the first interactive segment references items on the computer file system according to a corresponding filter for selecting items; and
  - adding one or more additional interactive segment to the virtual address bar, wherein each additional interactive segment further restricts the items referenced by the preceding interactive segments;
  - wherein the first interactive segment and the one or more additional interactive segments comprise a virtual path.

20. The method of claim 19, further comprising a shell browser method for enabling a user to modify metadata within a shell browser, the shell browser method comprising:
- displaying a plurality of items;
- receiving a first input from the user representing a selection of at least one displayed item;
- displaying metadata associated with the at least one selected item; and
- providing a control for user modification of the displayed metadata.

21. The method of claim 19, further comprising providing a shell browser, the shell browser comprising:
- a window which displays a group of items, wherein the window also displays metadata values associated with one or more of the displayed items; and
- an edit control which permits user modification of at least a portion of the metadata values displayed in the window.

22. The method of claim 19, further comprising a previewer method for enabling the use of third party previewers in a shell browser which supports multiple item types, the previewer method comprising:
- providing a shell browser having a default previewer for the multiple item types; and
- providing an extensibility mechanism which enables a third party to develop an alternative previewer for at least one of the multiple item types.

23. The method of claim 19, further comprising providing a shell browser configured to display a plurality of items representing multiple item types, the shell browser comprising:
- a default previewer which provides a standard level of functionality for multiple item types; and
- an extensibility mechanism which enables functionality beyond the standard level provided by the default previewer for one or more of the multiple item types.

24. The method of claim 19, further comprising providing a virtual address bar user interface control for selecting items accessible to a computer system for display, the virtual address bar comprising:
- a plurality of interactive segments, wherein each interactive segment corresponds to a filter for selecting items for display.

25. The method of claim 19, further comprising a method of filtering items, the method of filtering items comprising:
- providing a plurality of display objects on the display that each represent one or more items;
- filtering the items represented by the display objects based on a filter term; and
- modifying the display objects that are provided on the display so as to represent the items that remain after the filtering of the items.

26. The method of claim 19, further comprising a method for presenting collections of the items, the method of presenting collections of the items comprising:
- creating a library to contain items with one or more specified metadata properties;
- automatically grouping items with the one or more specified metadata properties into the library; and
- providing one or more tools for manipulating items in the library.

27. The method of claim 19, further comprising a method for displaying items, the method for displaying items comprising:
- defining a scope of the physical memory locations from which items are to be drawn, the scope comprising a present computer memory and at least one other physical location;
- receiving a query, and in response to the query, drawing items from the physical locations as defined in the scope; and
- presenting the items drawn from the query in a view on the display.

28. In a computer system having a display and a memory for storing items, a method for manipulating the items, comprising:
- representing groups of items as virtual folders;
- providing at least a first defined action that can be performed for direct manipulation of a virtual folder, wherein when the first defined action is performed, the virtual folder is manipulated as directed by the performed action, wherein the first defined action is adding a metadata property to the virtual folder, and wherein in response to performance of the first defined action additional items having the metadata property are copied to the virtual folder; and
- a virtual address bar method for providing a virtual path to items stored in a computer file system using a virtual address bar, the virtual address bar method comprising:
  - displaying a virtual address bar operable to include a first interactive segment, wherein the first interactive segment references items on the computer file system according to a corresponding filter for selecting items; and adding one or more additional interactive segment to the virtual address bar, wherein each additional interactive segment further restricts the items referenced by the preceding interactive segments;

wherein the first interactive segment and the one or more additional interactive segments comprise a virtual path.

29. The method of claim 28, further comprising a shell browser method for enabling a user to modify metadata within a shell browser, the shell browser method comprising:
displaying a plurality of items;
receiving a first input from the user representing a selection of at least one displayed item;
displaying metadata associated with the at least one selected item; and
providing a control for user modification of the displayed metadata.

30. The method of claim 28, further comprising providing a shell browser, the shell browser comprising:
a window which displays a group of items, wherein the window also displays metadata values associated with one or more of the displayed items; and
an edit control which permits user modification of at least a portion of the metadata values displayed in the window.

31. The method of claim 28, further comprising a previewer method for enabling the use of third party previewers in a shell browser which supports multiple item types, the previewer method comprising:
providing a shell browser having a default previewer for the multiple item types; and
providing an extensibility mechanism which enables a third party to develop an alternative previewer for at least one of the multiple item types.

32. The method of claim 28, further comprising providing a shell browser configured to display a plurality of items representing multiple item types, the shell browser comprising:
a default previewer which provides a standard level of functionality for multiple item types; and
an extensibility mechanism which enables functionality beyond the standard level provided by the default previewer for one or more of the multiple item types.

33. The method of claim 28, further comprising providing a virtual address bar user interface control for selecting items accessible to a computer system for display, the virtual address bar comprising:
a plurality of interactive segments, wherein each interactive segment corresponds to a filter for selecting items for display.

34. The method of claim 28, further comprising a method of filtering items, the method of filtering items comprising:
providing a plurality of display objects on the display that each represent one or more items;
filtering the items represented by the display objects based on a filter term; and
modifying the display objects that are provided on the display so as to represent the items that remain after the filtering of the items.

35. The method of claim 28, further comprising a method for presenting collections of the items, the method of presenting collections of the items comprising:
creating a library to contain items with one or more specified metadata properties;
automatically grouping items with the one or more specified metadata properties into the library; and
providing one or more tools for manipulating items in the library.

36. The method of claim 28, further comprising a method for displaying items, the method for displaying items comprising:
defining a scope of the physical memory locations from which items are to be drawn, the scope comprising a present computer memory and at least one other physical location;
receiving a query, and in response to the query, drawing items from the physical locations as defined in the scope; and
presenting the items drawn from the query in a view on the display.

37. In a computer system having a display and a memory for storing items with metadata properties, a method of filtering items, the method comprising:
providing a plurality of display objects on the display that each represent one or more items;
filtering the items represented by the display objects based on a filter term;
modifying the display objects that are provided on the display so as to represent the items that remain after the filtering of the items, including displaying a time-rotating sample of a plurality of metadata associated with the items; and
a virtual address bar method for providing a virtual path ti items stored in a computer file system using a virtual address bar, the virtual address bar method comprising:
displaying a virtual address bar operable to include a first interactive segment, wherein the first interactive segment references items on the computer file system according to a corresponding filter for selecting items; and
adding one or more additional interactive segment to the virtual address bar, wherein each additional interactive segment further restricts the items referenced by the preceding interactive segments;
wherein the first interactive segment and the one or more additional interactive segments comprise a virtual path.

38. The method of claim 37, further comprising a shell browser method for enabling a user to modify metadata within a shell browser, the shell browser method comprising:
displaying a plurality of items;
receiving a first input from the user representing a selection of at least one displayed item;
displaying metadata associated with the at least one selected item; and
providing a control for user modification of the displayed metadata.

39. The method of claim 37, further comprising providing a shell browser, the shell browser comprising:
a window which displays a group of items, wherein the window also displays metadata values associated with one or more of the displayed items; and
an edit control which permits user modification of at least a portion of the metadata values displayed in the window.

40. The method of claim 37, further comprising a previewer method for enabling the use of third party previewers in a shell browser which supports multiple item types, the previewer method comprising:
providing a shell browser having a default previewer for the multiple item types; and providing an extensibility mechanism which enables a third party to develop an alternative previewer for at least one of the multiple item types.

41. The method of claim 37, further comprising providing a shell browser configured to display a plurality of items representing multiple item types, the shell browser comprising:
a default previewer which provides a standard level of functionality for multiple item types; and
an extensibility mechanism which enables functionality beyond the standard level provided by the default previewer for one or more of the multiple item types.

42. The method of claim 37, further comprising providing a virtual address bar user interface control for selecting items accessible to a computer system for display, the virtual address bar comprising:
a plurality of interactive segments, wherein each interactive segment corresponds to a filter for selecting items for display.

43. The method of claim 37, further comprising a method of filtering items, the method of filtering items comprising:
providing a plurality of display objects on the display that each represent one or more items;
filtering the items represented by the display objects based on a filter term; and
modifying the display objects that are provided on the display so as to represent the items that remain after the filtering of the items.

44. The method of claim 37, further comprising a method for presenting collections of the items, the method of presenting collections of the items comprising:
creating a library to contain items with one or more specified metadata properties; automatically grouping items with the one or more specified metadata properties into the library; and
providing one or more tools for manipulating items in the library.

45. The method of claim 37, further comprising a method for displaying items, the method for displaying items comprising:
defining a scope of the physical memory locations from which items are to be drawn, the scope comprising a present computer memory and at least one other physical location;
receiving a query, and in response to the query, drawing items from the physical locations as defined in the scope; and
presenting the items drawn from the query in a view on the display.

46. In a computer system having a display and a memory for storing items, a method of viewing selected items, the method comprising:
receiving a user input defining a search term;
searching the stored items based on the search term;
displaying representations of the items found from the search;
storing a link to a collection of the items found from the search;
presenting the link on the display such that by clicking on the link a user can return to the view of the desired collection of items, and
a virtual address bar method for providing a virtual path to items stored in a computer file system using a virtual address bar, the virtual address bar method comprising:
displaying a virtual address bar operable to include a first a interactive segment, wherein the first interactive segment references items on the computer file system according to a corresponding filter for selecting items; and
adding one or more additional interactive segment to the virtual address bar, wherein each additional interactive segment further restricts the items referenced by the preceding interactive segments;
wherein the first interactive segment and the one or more additional interactive segments comprise a virtual path.

47. The method of claim 46, further comprising a shell browser method for enabling a user to modify metadata within a shell browser, the shell browser method comprising:
displaying a plurality of items;
receiving a first input from the user representing a selection of at least one displayed item;
displaying metadata associated with the at least one selected item; and
providing a control for user modification of the displayed metadata.

48. The method of claim 46, further comprising providing a shell browser, the shell browser comprising:
a window which displays a group of items, wherein the window also displays metadata values associated with one or more of the displayed items; and
an edit control which permits user modification of at least a portion of the metadata values displayed in the window.

49. The method of claim 46, further comprising a previewer method for enabling the use of third party previewers in a shell browser which supports multiple item types, the previewer method comprising:
providing a shell browser having a default previewer for the multiple item types; and
providing an extensibility mechanism which enables a third party to develop an alternative previewer for at least one of the multiple item types.

50. The method of claim 46, further comprising providing a shell browser configured to display a plurality of items representing multiple item types, the shell browser comprising:
a default previewer which provides a standard level of functionality for multiple item types; and
an extensibility mechanism which enables functionality beyond the standard level provided by the default previewer for one or more of the multiple item types.

51. The method of claim 46, further comprising providing a virtual address bar user interface control for selecting items accessible to a computer system for display, the virtual address bar comprising:
a plurality of interactive segments, wherein each interactive segment corresponds to a filter for selecting items for display.

52. The method of claim 46, further comprising a method of filtering items, the method of filtering items comprising:
providing a plurality of display objects on the display that each represent one or more items;
filtering the items represented by the display objects based on a filter term; and
modifying the display objects that are provided on the display so as to represent the items that remain after the filtering of the items.

53. The method of claim 46, further comprising a method for presenting collections of the items, the method of presenting collections of the items comprising:
creating a library to contain items with one or more specified metadata properties;

automatically grouping items with the one or more specified metadata properties into the library; and providing one or more tools for manipulating items in the library.

54. The method of claim 46, further comprising a method for displaying items, the method for displaying items comprising:

defining a scope of the physical memory locations from which items are to be drawn, the scope comprising a present computer memory and at least one other physical location;

receiving a query, and in response to the query, drawing items from the physical locations as defined in the scope; and presenting the items drawn from the query in a view on the display.

55. In a computer system with a display and a memory for storing items, a method for representing the items to a user, comprising:

providing a database that allows both non-file items and file items to be searched by a query;

receiving a query, wherein the query is a default query identified in a registry, and in response to the query drawing both non-file items and file items that match the query;

presenting both the non-file items and file items that match the query on the display; and a virtual address bar method for providing a virtual path to items stored in a computer file system using a virtual address bar, the virtual address bar method comprising:

displaying a virtual address bar operable to include a first interactive segment, wherein the first interactive segment references items on the computer file system according to a corresponding filter for selecting items; and adding one or more additional interactive segment to the virtual address bar, wherein each additional interactive segment further restricts the items referenced by the preceding interactive segments;

wherein the first interactive segment and the one or more additional interactive segments comprise a virtual path.

56. The method of claim 55, further comprising a shell browser method for enabling a user to modify metadata within a shell browser, the shell browser method comprising:

displaying a plurality of items;

receiving a first input from the user representing a selection of at least one displayed item;

displaying metadata associated with the at least one selected item; and providing a control for user modification of the displayed metadata.

57. The method of claim 55, further comprising providing a shell browser, the shell browser comprising:

a window which displays a group of items, wherein the window also displays metadata values associated with one or more of the displayed items; and an edit control which permits user modification of at least a portion of the metadata values displayed in the window.

58. The method of claim 55, further comprising a previewer method for enabling the use of third party previewers in a shell browser which supports multiple item types, the previewer method comprising:

providing a shell browser having a default previewer for the multiple item types; and providing an extensibility mechanism which enables a third party to develop an alternative previewer for at least one of the multiple item types.

59. The method of claim 55, further comprising providing a shell browser configured to display a plurality of items representing multiple item types, the shell browser comprising:

a default previewer which provides a standard level of functionality for multiple item types; and an extensibility mechanism which enables functionality beyond the standard level provided by the default previewer for one or more of the multiple item types.

60. The method of claim 55, further comprising providing a virtual address bar user interface control for selecting items accessible to a computer system for display, the virtual address bar comprising:

a plurality of interactive segments, wherein each interactive segment corresponds to a filter for selecting items for display.

61. The method of claim 55, further comprising a method of filtering items, the method of filtering items comprising:

providing a plurality of display objects on the display that each represent one or more items;

filtering the items represented by the display objects based on a filter term; and modifying the display objects that are provided on the display so as to represent the items that remain after the filtering of the items.

62. The method of claim 55, further comprising a method for presenting collections of the items, the method of presenting collections of the items comprising:

creating a library to contain items with one or more specified metadata properties;

automatically grouping items with the one or more specified metadata properties into the library; and providing one or more tools for manipulating items in the library.

63. The method of claim 55, further comprising a method for displaying items, the method for displaying items comprising:

defining a scope of the physical memory locations from which items are to be drawn, the scope comprising a present computer memory and at least one other physical location;

receiving a query, and in response to the query, drawing items from the physical locations as defined in the scope; and presenting the items drawn from the query in a view on the display.

64. A method for providing a virtual path to items stored in a computer file system using a virtual address bar, the method comprising:

displaying a virtual address bar operable to include a first interactive segment, wherein the first interactive segment references items on the computer file system according to a corresponding filter for selecting items;

adding one or more additional interactive segments to the virtual address bar, wherein each additional interactive segment further restricts the items referenced by the preceding interactive segments; and displaying a plurality of user-selectable quick links, separate from the virtual address bar, wherein each quick link is associated with a different subset of the items; and responsive to a user selecting one of the quick links, displaying the subset of items associated with the selected quick link, wherein the first interactive segment and the one or more additional interactive segments comprise a virtual path.

65. The method of claim 64, wherein a filter is provided on the display that can be selected by a user to filter items based on the metadata property specified by the filter.

66. The method of claim 64, wherein a library is provided that includes a collection of items and a set of tools for manipulating the items of the library.

67. The method of claim 64, wherein the items in a virtual folder may be physically stored in memories at different physical locations.

68. The method of claim 67, wherein the different physical locations comprise a present computer and at least one of a different computer, a location on a network, and an external storage device.

69. The method of claim 64, wherein the items comprise both file items and non-file items.

70. The method of claim 69, wherein the non-file items comprise at least one of contacts or e-mails.

71. The method of claim 64, further comprising a shell browser method for enabling a user to modify metadata within a shell browser, the shell browser method comprising:
    displaying a plurality of items;
    receiving a first input from the user representing a selection of at least one displayed item;
    displaying metadata associated with the at least one selected item; and
    providing a control for user modification of the displayed metadata.

72. The method of claim 64, further comprising a previewer method for enabling the use of third party previewers in a shell browser which supports multiple item types, the previewer method comprising:
    providing a shell browser having a default previewer for the multiple item types; and
    providing an extensibility mechanism which enables a third party to develop an alternative previewer for at least one of the multiple item types.

73. A computer-implemented method for enabling a user to modify metadata within a shell browser, the method comprising:
    displaying a plurality of items;
    receiving a first input from the user representing a selection of at least one displayed item;
    displaying metadata associated with the at least one selected item;
    displaying, in response to a user hover input, a control for user modification of the displayed metadata; and
    a virtual address bar method for providing a virtual path to items stored in a computer file system using a virtual address bar, the virtual address bar method comprising:
        displaying a virtual address bar operable to include a first interactive segment, wherein the first interactive segment references items on the computer file system according to a corresponding filter for selecting items; and
        adding one or more additional interactive segment to the virtual address bar, wherein each additional interactive segment further restricts the items referenced by the preceding interactive segments;
        wherein the first interactive segment and the one or more additional interactive segments comprise a virtual path.

74. The method of claim 73, wherein a filter is provided on the display that can be selected by a user to filter items based on the metadata property specified by the filter.

75. The method of claim 73, wherein a quick link is provided on the display that can be selected by a user to view a specified collection of items.

76. The method of claim 73, wherein a library is provided that includes a collection of items and a set of tools for manipulating the items of the library.

77. The method of claim 73, wherein the items in a virtual folder may be physically stored in memories at different physical locations.

78. The method of claim 77, wherein the different physical locations comprise a present computer and at least one of a different computer, a location on a network, and an external storage device.

79. The method of claim 73, wherein the items comprise both file items and non-file items.

80. The method of claim 79, wherein the non-file items comprise at least one of contacts or e-mails.

81. The method of claim 73, further comprising providing a virtual address bar user interface control for selecting items accessible to a computer system for display, the virtual address bar comprising:
    a plurality of interactive segments, wherein each interactive segment corresponds to a filter for selecting items for display.

82. A computer-implemented method for enabling the use of third party previewers in a shell browser which supports multiple item types, the method comprising:
    providing an operating system with a shell browser having a default previewer for the multiple item types;
    providing an extensibility mechanism which enables a third party to develop an alternative previewer that operates in the shell browser for at least one of the multiple item types; and
    a virtual address bar method for providing a virtual path to items stored in a computer file system using a virtual address bar, the virtual address bar method comprising:
        displaying a virtual address bar operable to include a first interactive segment, wherein the first interactive segment references items on the computer file system according to a corresponding filter for selecting items; and
        adding one or more additional interactive segment to the virtual address bar, wherein each additional interactive segment further restricts the items referenced by the preceding interactive segments;
        wherein the first interactive segment and the one or more additional interactive segments comprise a virtual path.

83. The method of claim 82, wherein a filter is provided on the display that can be selected by a user to filter items based on the metadata property specified by the filter.

84. The method of claim 82, wherein a quick link is provided on the display that can be selected by a user to view a specified collection of items.

85. The method of claim 82, wherein a library is provided that includes a collection of items and a set of tools for manipulating the items of the library.

86. The method of claim 82, wherein the items in a virtual folder may be physically stored in memories at different physical locations.

87. The method of claim 86, wherein the different physical locations comprise a present computer and at least one of a different computer, a location on a network, and an external storage device.

88. The method of claim 82, wherein the items comprise both file items and non-file items.

89. The method of claim 88, wherein the non-file items comprise at least one of contacts or e-mails.

90. The method of claim 82, further comprising providing a virtual address bar user interface control for selecting items accessible to a computer system for display, the virtual address bar comprising:
   a plurality of interactive segments, wherein each interactive segment corresponds to a filter for selecting items for display.

91. In a computer system with a display and a memory for storing items, the items being of a plurality of different types, a method for presenting libraries of the items, comprising:
   providing libraries for containing items of similar types;
   providing a similar set of UI features for each of the libraries, wherein the set of UI features includes a control for modifying metadata of one of the items that is displayed in response to a user hover input, and wherein the set UI features further includes a control that displays a time-rotating sample of a plurality of metadata associated with at least some of the items; and
   a virtual address bar method for providing a virtual path to items stored in a computer file system using a virtual address bar, the virtual address bar method comprising:
      displaying a virtual address bar operable to include a first interactive segment, wherein the first interactive segment references items on the computer file system according to a corresponding filter for selecting items; and
      adding one or more additional interactive segment to the virtual address bar, wherein each additional interactive segment further restricts the items referenced by the preceding interactive segments;
      wherein the first interactive segment and the one or more additional interactive segments comprise a virtual path.

92. The method of claim 91, wherein the different types comprise at least two of documents, images and music.

93. The method of claim 91, wherein the similar set of UI features includes a feature for creating new categories.

94. The method of claim 91, wherein the similar set of UI features includes a feature for altering a way that the items are displayed.

95. The method of claim 91, wherein in addition to containing items of similar types, the libraries may also contain items of different types.

96. The method of claim 91, further comprising providing a shell browser, the shell browser comprising:
   a window which displays a group of items, wherein the window also displays metadata values associated with one or more of the displayed items; and
   an edit control which permits user modification of at least a portion of the metadata values displayed in the window.

97. The method of claim 91, further comprising a previewer method for enabling the use of third party previewers in a shell browser which supports multiple item types, the previewer method comprising:
   providing a shell browser having a default previewer for the multiple item types; and
   providing an extensibility mechanism which enables a third party to develop an alternative previewer for at least one of the multiple item types.

98. The method of claim 91, further comprising providing a shell browser configured to display a plurality of items representing multiple item types, the shell browser comprising:
   a default previewer which provides a standard level of functionality for multiple item types; and
   an extensibility mechanism which enables functionality beyond the standard level provided by the default previewer for one or more of the multiple item types.

99. The method of claim 91, further comprising providing a virtual address bar user interface control for selecting items accessible to a computer system for display, the virtual address bar comprising:
   a plurality of interactive segments, wherein each interactive segment corresponds to a filter for selecting items for display.

100. The method of claim 91, further comprising a method of filtering items, the method of filtering items comprising:
   providing a plurality of display objects on the display that each represent one or more items;
   filtering the items represented by the display objects based on a filter term; and
   modifying the display objects that are provided on the display so as to represent the items that remain after the filtering of the items.

101. The method of claim 91, further comprising a method for displaying items, the method for displaying items comprising:
   defining a scope of the physical memory locations from which items are to be drawn, the scope comprising a present computer memory and at least one other physical location;
   receiving a query, and in response to the query, drawing items from the physical locations as defined in the scope; and
   presenting the items drawn from the query in a view on the display.

102. The method of claim 91, further comprising a method for representing the items to a user, the method for representing the items to the user comprising:
   providing a database that allows both non-file items and file items to be searched by a query;
   receiving a query, and in response to the query drawing both non-file items and file items that match the query; and
   presenting both the non-file items and file items that match the query on the display.

* * * * *

UNITED STATES PATENT AND TRADEMARK OFFICE
CERTIFICATE OF CORRECTION

| | | |
|---|---|---|
| PATENT NO. | : 7,409,644 B2 | |
| APPLICATION NO. | : 10/440431 | |
| DATED | : August 5, 2008 | |
| INVENTOR(S) | : Moore et al. | |

It is certified that error appears in the above-identified patent and that said Letters Patent is hereby corrected as shown below:

In column 50, line 28, in Claim 37, delete "ti" and insert -- to --, therefor.

In column 51, line 62, in Claim 46, delete "items," and insert -- items; --, therefor.

In column 51, line 67, in Claim 46, after "first" delete "a".

Signed and Sealed this
Third Day of May, 2011

David J. Kappos
*Director of the United States Patent and Trademark Office*